(12) United States Patent
Kim et al.

(10) Patent No.: US 12,149,988 B2
(45) Date of Patent: *Nov. 19, 2024

(54) METHOD AND APPARATUS FOR TRANSMITTING AND RECEIVING RANDOM ACCESS PREAMBLE IN WIRELESS CELLULAR COMMUNICATION SYSTEM

(71) Applicant: Samsung Electronics Co., Ltd., Suwon-si (KR)

(72) Inventors: Donghan Kim, Osan-si (KR); Seunghoon Choi, Seongnam-si (KR); Cheolkyu Shin, Suwon-si (KR); Younsun Kim, Seongnam-si (KR); Youngwoo Kwak, Suwon-si (KR); Hoondong Noh, Suwon-si (KR); Yongjun Kwak, Yongin-si (KR); Jeongho Yeo, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/317,469

(22) Filed: May 15, 2023

(65) Prior Publication Data

US 2023/0284098 A1    Sep. 7, 2023

Related U.S. Application Data

(63) Continuation of application No. 17/539,627, filed on Dec. 1, 2021, now Pat. No. 11,653,272, which is a
(Continued)

(30) Foreign Application Priority Data

Jul. 13, 2016 (KR) .................. 10-2016-0088789
Nov. 3, 2016 (KR) .................. 10-2016-0145639
(Continued)

(51) Int. Cl.
*H04W 28/26* (2009.01)
*H04L 5/14* (2006.01)
(Continued)

(52) U.S. Cl.
CPC ........... *H04W 28/26* (2013.01); *H04L 5/1469* (2013.01); *H04W 72/0446* (2013.01);
(Continued)

(58) Field of Classification Search
CPC ............ H04W 72/04; H04W 72/0406; H04W 72/042; H04W 72/0413; H04W 72/044;
(Continued)

(56) References Cited

U.S. PATENT DOCUMENTS

2010/0054161 A1    3/2010  Montojo et al.
2012/0099519 A1    4/2012  Kim et al.
(Continued)

FOREIGN PATENT DOCUMENTS

CN    102238747 A    11/2011
CN    102316595 A    1/2012
(Continued)

OTHER PUBLICATIONS

Extended European Search Report dated Sep. 15, 2023, issued in European Patent Application No. 23180437.8.
(Continued)

*Primary Examiner* — Peter Chen
(74) *Attorney, Agent, or Firm* — Jefferson IP Law, LLP

(57) ABSTRACT

Disclosed are a communication method for merging, with an IoT technology, a 5G communication system for supporting
(Continued)

a data transmission rate higher than that of a 4G system, and a system therefor. The present disclosure can be applied to an intelligent service (for example, smart home, smart building, smart city, smart car or connected car, healthcare, digital education, retail business, security and safety-related services, and the like) on the basis of a 5G communication technology and an IoT-related technology. Disclosed are a method and an apparatus for supporting a reservation resource, and according to the present invention, a method for a base station in a communication system comprises a step of transmitting reservation resource-related information to a terminal, determining, on the basis of the reservation-related information, whether a first signal is mapped to the reservation resource and a resource, in which the first signal to be transmitted to the terminal is overlapped, and transmitting the first signal to the terminal on the basis of the determination.

16 Claims, 38 Drawing Sheets

Related U.S. Application Data continuation of application No. 16/317,999, filed as application No. PCT/KR2017/007513 on Jul. 13, 2017, now Pat. No. 11,202,235.

(30) Foreign Application Priority Data

Mar. 3, 2017 (KR) .................. 10-2017-0027535
May 4, 2017 (KR) .................. 10-2017-0056935

(51) Int. Cl.
| | |
|---|---|
| H04W 72/044 | (2023.01) |
| H04W 72/0446 | (2023.01) |
| H04W 72/0453 | (2023.01) |
| H04W 72/23 | (2023.01) |
| H04W 74/04 | (2009.01) |
| H04W 74/0833 | (2024.01) |
| H04W 80/08 | (2009.01) |
| H04W 88/02 | (2009.01) |
| H04W 88/10 | (2009.01) |

(52) U.S. Cl.
CPC ..... *H04W 72/0453* (2013.01); *H04W 72/046* (2013.01); *H04W 72/23* (2023.01); *H04W 74/04* (2013.01); *H04W 74/0833* (2013.01); *H04W 80/08* (2013.01); *H04W 88/023* (2013.01); *H04W 88/10* (2013.01)

(58) Field of Classification Search
CPC ......... H04W 72/0446; H04W 72/0453; H04W 72/046; H04W 72/0466; H04W 72/1278; H04W 72/1289; H04W 74/02; H04W 74/006; H04W 74/04; H04W 74/08; H04W 74/0833; H04W 88/02; H04W 88/023; H04W 88/10; H04W 88/08; H04W 80/08; H04W 28/26; H04L 5/0048; H04L 5/005; H04L 5/0051; H04L 5/0053; H04L 5/14; H04L 5/1469
See application file for complete search history.

(56) References Cited

U.S. PATENT DOCUMENTS

| | | | |
|---|---|---|---|
| 2013/0343312 | A1 | 12/2013 | Lv et al. |
| 2014/0086197 | A1 | 3/2014 | Yang et al. |
| 2014/0112289 | A1 | 4/2014 | Kim et al. |
| 2014/0198663 | A1 | 7/2014 | Xu et al. |
| 2015/0078190 | A1 | 3/2015 | Cheng et al. |
| 2015/0289292 | A1 | 10/2015 | Sun et al. |
| 2015/0296513 | A1 | 10/2015 | Nogami et al. |
| 2015/0341912 | A1 | 11/2015 | Kim et al. |
| 2016/0219547 | A1 | 7/2016 | Seo et al. |
| 2016/0269872 | A1 | 9/2016 | Kim et al. |
| 2017/0303220 | A1 | 10/2017 | Sadeghi et al. |
| 2019/0089436 | A1 | 3/2019 | Wei et al. |
| 2019/0123869 | A1 | 4/2019 | Kakishima et al. |

FOREIGN PATENT DOCUMENTS

| | | |
|---|---|---|
| CN | 102651678 A | 8/2012 |
| CN | 104798429 A | 7/2015 |
| CN | 105099627 A | 11/2015 |
| CN | 105531949 A | 4/2016 |
| KR | 10-2011-0083608 A | 7/2011 |
| KR | 10-2014-0072834 A | 6/2014 |
| KR | 10-2015-0115685 A | 10/2015 |
| WO | 2010/151086 A1 | 12/2010 |
| WO | 2013-006006 A2 | 1/2013 |
| WO | 2014/038218 A1 | 3/2014 |
| WO | 2015-037881 A1 | 3/2015 |
| WO | 2015-060646 A1 | 4/2015 |

OTHER PUBLICATIONS

Extended European Search Report dated , Jan. 17, 2020, issued in a counterpart European Application No. 17827969.1-1215 / 3471491.
SAMSUNG: "Discussion on forward compatibility for 5G new radio interface", 3GPP Draft; R1-162173 Forward Compatibility Final, 3rd Generation Partnership Project (3GPP), Mobile Competence Centre; 650, Route Des Lucioles; F-06921 Sophia-Antipolis Cedex; France vol. RAN WG1, No. XP051079508; Apr. 1, 2016, Busan, Korea.
SAMSUNG: "General design principles for 5G new radio interface: system operations", 3GPP Draft; R1-162171, 3rd Generation Partnership Project (3GPP), Mobile Competence Centre; 650, Route Des Lucioles; F-06921 Sophia-Antipolis Cedex; France vol. RAN WG1, No. XP051079506; Apr. 1, 2016, Busan, Korea.
Chinese Office Action dated Aug. 3, 2022, issued in a counterpart Chinese Application No. 201780043580.4.
LG Electronics; Beamformed CSI-RS enhancements including aperiodic CSI-RS; 3GPP TSG RAN WG1 Meeting #85; R1-164523; May 14, 2016, Nanjing, China.
Ericsson; Allocation of uplink control resources; TSG-RAN WG1 #50; R1-073733; Aug. 15, 2007, Athens.
Ku et al.: Resource Allocation and Link Adaption in LTE and LTE Advance: A Tutorial, IEEE Communications Surveys & Tutorials, vol. 17, No. 3, Third Quarter 2015, pp. 1605 to 1633, Dec. 18, 2014.
Wang et al.: The Evolution of LTE Physical Layer Control Channels, IEEE Communications Surveys & Tutorials, vol. 18, No. 2, Second Quarter 2016, pp. 1336 to 1354, Dec. 18, 2015.

FIG. 24
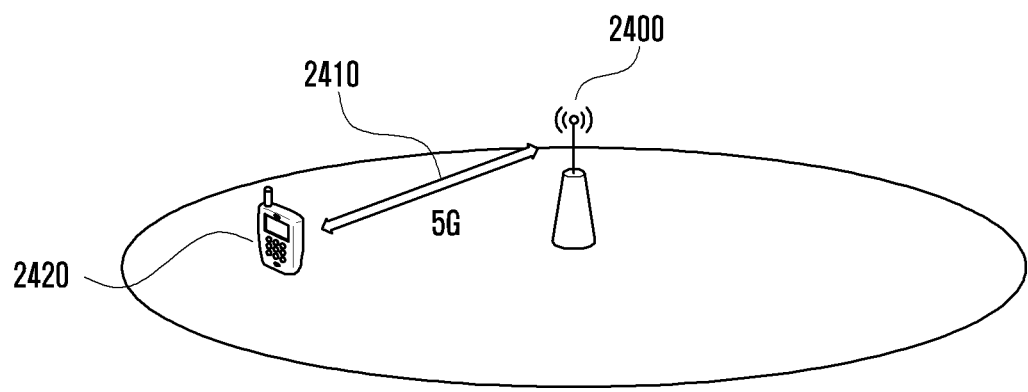
(a)
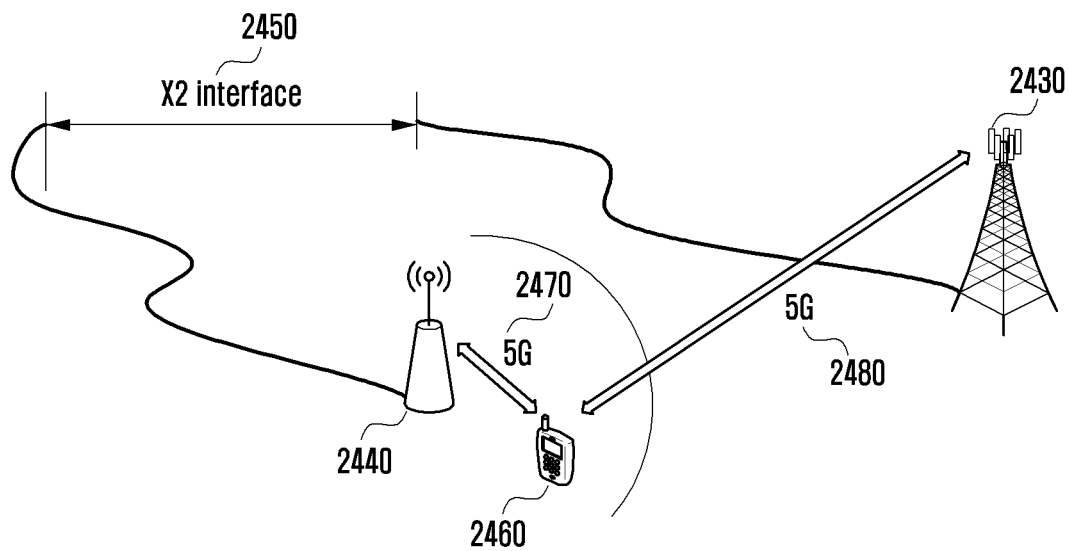
(b)

FIG. 25
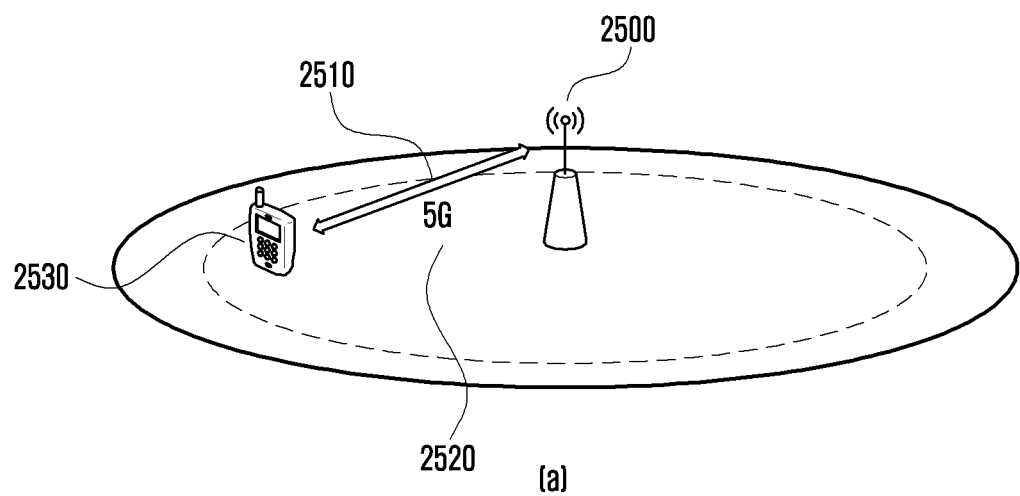
(a)
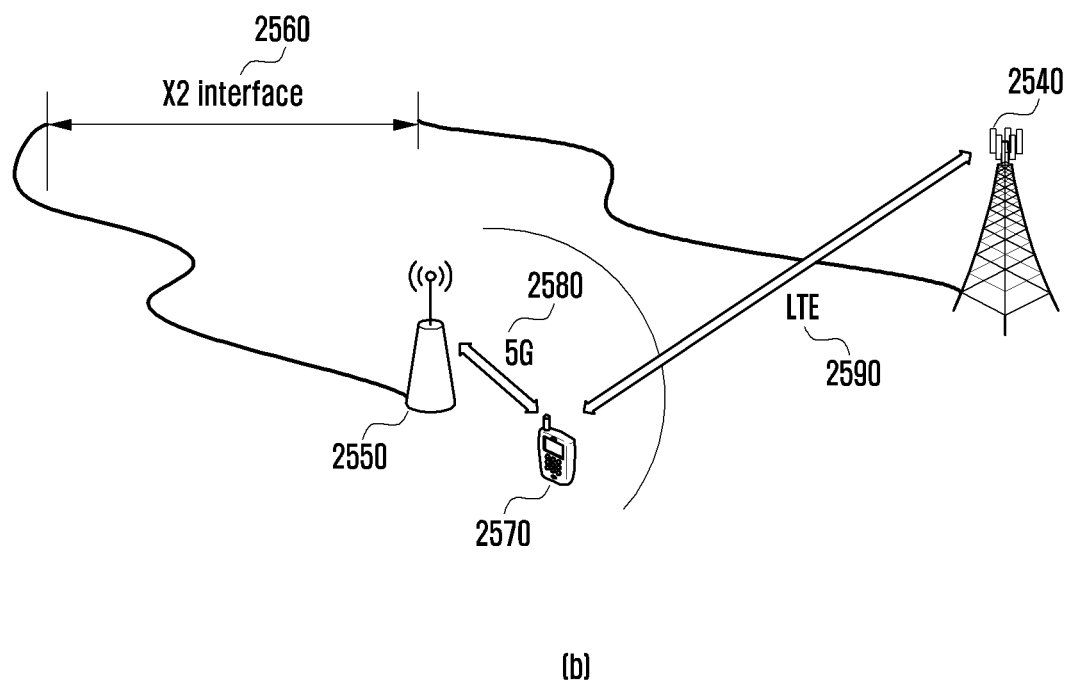
(b)

METHOD AND APPARATUS FOR TRANSMITTING AND RECEIVING RANDOM ACCESS PREAMBLE IN WIRELESS CELLULAR COMMUNICATION SYSTEM

CROSS-REFERENCE TO RELATED APPLICATION(S)

This application is a continuation application of prior application Ser. No. 17/539,627 filed on Dec. 1, 2021, which will be issued as U.S. Pat. No. 11,653,272 on May 16, 2023; which is a continuation application of prior application Ser. No. 16/317,999 filed on Jan. 15, 2019, which has issued as U.S. Pat. No. 11,202,235 on Dec. 14, 2021; which is a U.S. National Stage application under 35 U.S.C. § 371 of an International application number PCT/KR2017/007513 filed on Jul. 13, 2017, and is based on and claims priority under 35 U.S.C § 119(a) of a Korean patent application number 10-2016-0088789 filed on Jul. 13, 2016 in the Korean Intellectual Property Office, of a Korean patent application number 10-2016-0145639 filed on Nov. 3, 2016 in the Korean Intellectual Property Office, of a Korean patent application number 10-2017-0027535 filed on Mar. 3, 2017 in the Korean Intellectual Property Office, and of a Korean patent application number 10-2017-0056935 filed on May 4, 2017 in the Korean Intellectual Property Office, the disclosure of each of which is incorporated by reference herein in its entirety.

TECHNICAL FIELD

The present invention relates to a wireless communication system and, in particular, to a method and apparatus for allowing a terminal to make an initial access to a network in a next generation mobile communication system.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected cars, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

In order to meet various user and service qualities requirements in a new radio (NR) communication system (which is interchangeably referred to as NR system and 5G system), it is important to design the system to support different transmission/reception schemes and services being provided with various transmission/reception parameters and remove restrictions of the current system that may limit the services to be added in the future in consideration of forward compatibility. In order to increase data rates in the NR system, consideration is being given to transmitting signals in a broad frequency band above 6 GHz, for which there is a need of a method and apparatus for performing a directional beam-based random access operation effectively. Further, there is a need of a resource allocation method and apparatus that supports the forward compatibility for 5G and beyond services in the NR system. Furthermore, there is a need of new reference signals for estimating a phase noise in consideration that that NR system operates in both the high and low frequency bands.

DISCLOSURE OF INVENTION

Technical Problem

The present invention aims to provide a directional beam-based random access method and apparatus for use in a frequency band above 6 GHz.

The present invention also aims to provide a data transmission/reception method for 5G-oriented communication services and, in particular, to provide a data transmission/reception method and apparatus of a terminal for use on the resources allocated in consideration of the forward compatibility for the 5G and beyond services in the future.

The present invention also aims to provide a method for transmitting a time-contiguous reference signal.

Solution to Problem

In accordance with an aspect of the present invention, a method of a base station in a communication system includes transmitting information on reserved resources to a terminal, determining whether to map a first signal to be transmitted to the terminal where the reserved resources are overlapped with resources for transmitting the first signal to the terminal based on the reserved resource information, and transmitting the first signal to the terminal based on the determination result. Preferably, the first signal is at least one of data or a reference signal. Preferably, the reserved resource information comprises information indicating at least one of time and frequency resources of the reserved resources and information instructing rate matching or puncturing be applied on the overlapped resources, and the method of the base station further includes transmitting information indicating whether to use the reserved resources to the terminal.

In accordance with another aspect of the present invention, a method of a terminal in a communication system includes receiving information on reserved resources from a base station and receiving a first signal from the base station on resources excepting for the resources overlapped with the reserved resources based on the reserved resource information.

In accordance with another aspect of the present invention, a base station of a communication system includes a transceiver configured to transmit and receive signals and a controller connected to the transceiver and configured to control to transmit information on reserved resources to a terminal, determine whether to map a first signal to be transmitted to the terminal where the reserved resources are overlapped with resources for transmitting the first signal to the terminal based on the reserved resource information, and transmit the first signal to the terminal based on the determination result.

In accordance with still another aspect of the present invention, a terminal of a communication system includes a transceiver configured to transmit and receive signals and a controller connected to the transceiver and configured to control to receive information on reserved resources from a base station and receive a first signal from the base station on resources excepting for the resources overlapped with the reserved resources based on the reserved resource information.

Advantageous Effects of Invention

The random access method of the present invention for use in a communication system supporting dynamic TDD operations is advantageous in terms of improving frequency utilization efficiency through the dynamic TDD operation and, simultaneously, allowing a terminal to perform a random access procedure effectively in an idle mode. As described above, the present invention is also advantageous in terms of allowing a terminal unaware of its status to perform a beam-based random access procedure to secure coverage such as a frequency band above 6 GHz in a system supporting beam-based data transmission/reception.

The data transmission/reception method and apparatus of the present invention is advantageous in terms of supporting 5G-oriented communication services. In particular, the data transmission/reception method and apparatus of the present invention is advantageous in terms of making it possible for a terminal to operate on resources allocated in consideration of the forward compatibility for the 5G and beyond services in the future.

The time-contiguous reference signal transmission method of the present invention is advantageous in terms of making it possible to perform a channel estimation effectively in a 5G wireless communication operating in both high and low frequency bands.

BRIEF DESCRIPTION OF DRAWINGS

FIGS. 24 and 25 are diagrams illustrating communication systems according to embodiments 3-1 and 3-2 of the present invention.

MODE FOR THE INVENTION

Figure 1:
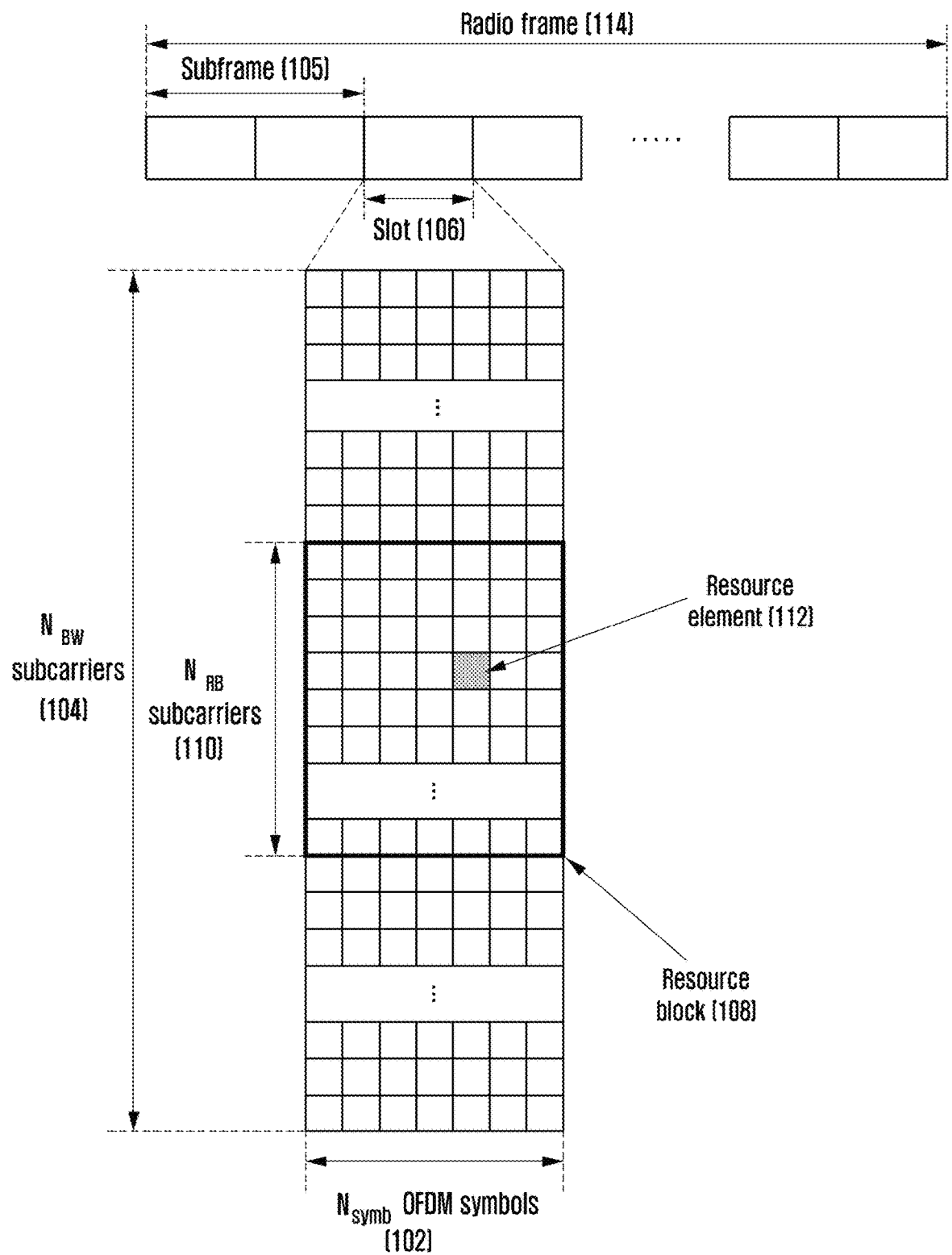
FIG. 1 is a diagram illustrating a basic time-frequency resource structure for transmitting downlink data or control channels in LTE and LTE-A systems.

Exemplary embodiments of the present invention are described in detail with reference to the accompanying drawings.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that disclosure of this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present invention, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card. A module may include one or more processors.

Embodiment 1

The present invention relates to a wireless communication system and, in particular, to a method and apparatus for transmitting a time-contiguous reference signal.

In the wireless communication system, a base station has to transmit a reference signal for use by a terminal in estimating a channel. The terminal may perform demodulation on a signal received over the channel estimated based on the reference signal. The terminal may check a channel status based on the reference signal and report the channel status to the base station. Typically, the reference signal is transmitted at a frequency-time resources interval that is determined in consideration of a maximum delay spread and maximum Doppler spread of the channel. If the frequency-time resources interval for transmitting the reference signal becomes narrow, this may improve the channel estimation performance and thus the signal demodulation performance but negatively may also increase a reference signal overhead which limits the data rate.

The legacy 4G LTE system operating in the frequency band of 2 GHz uses reference signals such as a cell-specific reference signal (CRS) and a demodulation reference signal (DMRS). If a reference signal is transmitted with a spacing of m subcarriers in each orthogonal frequency division multiplexing (OFDM) symbol in the frequency domain at an interval of n OFDM symbols in the time domain under the assumption of use of a normal cyclic prefix (CP), the frequency-time resources interval of the CRS of antenna ports 1 and 2 may be expressed as (m,n)=(3,4). Assuming the use of the normal CP, the frequency-time resources interval of the DMRS may be expressed as (m,n)=(5,7).

For a 5G wireless communication system, unlike the LTE system, a system operating in frequency bands above 6 GHz is being considered in addition to the system operating below 6 GHz. The 5G system should be designed in consideration of the channel characteristics, which vary with the frequency band. There are also demanding requirements such as low latency and high mobility to be met for 5G wireless communication. It is also important to minimize interference and overhead caused by the reference signals in the 5G system; thus, there is a need of a method for minimizing all-the-time transmission of the reference signals. In order to accomplish the above objects, the present invention proposes a method for a terminal to perform channel estimation effectively by employing a time-contiguous reference signal (TCRS).

The mobile communication system has evolved to a high-speed, high-quality packet data communication system (such as High Speed Packet Access (HSPA), LTE (or evolved universal terrestrial radio access (E-UTRA)), and LTE-Advanced (LTE-A) defined in the 3$^{rd}$ Generation Partnership Project (3GPP), High Rate Packet Data (HRPD) defined in the 3$^{rd}$ Generation Partnership Project-2 (3GPP2), and 802.16e defined in the IEEE) capable of providing data and multimedia services beyond the early voice-oriented services. Meanwhile, 5G or NR standardization is in progress for 5G wireless communication systems.

The LTE system as one of the representative broadband wireless communication systems uses orthogonal frequency division multiplexing (OFDM) in the downlink (DL) and single carrier frequency division multiple access (SC-FDMA) in the uplink (UL). The term "uplink" denotes a radio link for transmitting data or control signals from a terminal that is interchangeably referred to as user equipment (UE) and mobile station (MS) to a base station (BS) that is interchangeably referred to as evolved node B (eNB), and the term "downlink" denotes a radio link for transmitting data or control signals from a base station to a terminal. Such multiple access schemes are characterized by allocating the time-frequency resources for transmitting user-specific data and control information without being overlapped with each other, i.e., maintaining orthogonality, so as to distinguish among user-specific data and control information.

FIG. 1 is a diagram illustrating a basic time-frequency resource structure for transmitting downlink data or control channels in LTE and LTE-A systems.

In FIG. 1, the horizontal axis denotes the time, and the vertical axis denotes the frequency. The smallest transmission unit in the time domain is an OFDM symbol, and $N_{symb}$ OFDM symbols 102 form a slot 106, and 2 slots form a subframe 105. Each slot spans 0.5 ms, and each subframe spans 1.0 ms. A radio frame 114 is a time unit consisting of 10 subframes. In the frequency domain, the smallest transmission unit is a subcarrier, and the total system transmission bandwidth consists of $N_{BW}$ subcarriers 104.

In the time-frequency resource structure, the basic resource unit is a Resource Element (RE) indicated by an OFDM symbol index and a subcarrier index. A Resource Block (RB) (or Physical Resource Block (PRB)) 108 is defined by $N_{symb}$ consecutive OFDM symbols 102 in the time domain and $N_{RB}$ consecutive subcarriers 110 in the frequency domain. That is, one RB 108 consists of $N_{symb} \times N_{RB}$ REs 112. Typically, the RB is the smallest data transmission unit. Typically, in the LTE system, $N_{symb}=7$, $N_{RB}=12$, and $N_{BW}$ and $N_{RB}$ are proportional to the system transmission bandwidth. The data rate increases in proportion to the number of RBs scheduled for the terminal.

For the LTE system, 6 transmission bandwidths are defined. In the case of an FDD system in which downlink and uplink are separated in frequency, the downlink transmission bandwidth and uplink transmission bandwidth may differ from each other. The channel bandwidth denotes an RF bandwidth in comparison with the system transmission bandwidth. Table 1 shows the relationship between the system transmission bandwidth and channel bandwidth defined in the LTE standard. For example, an LTE system having 10 MHz channel bandwidth uses the transmission bandwidth of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Figure 2:
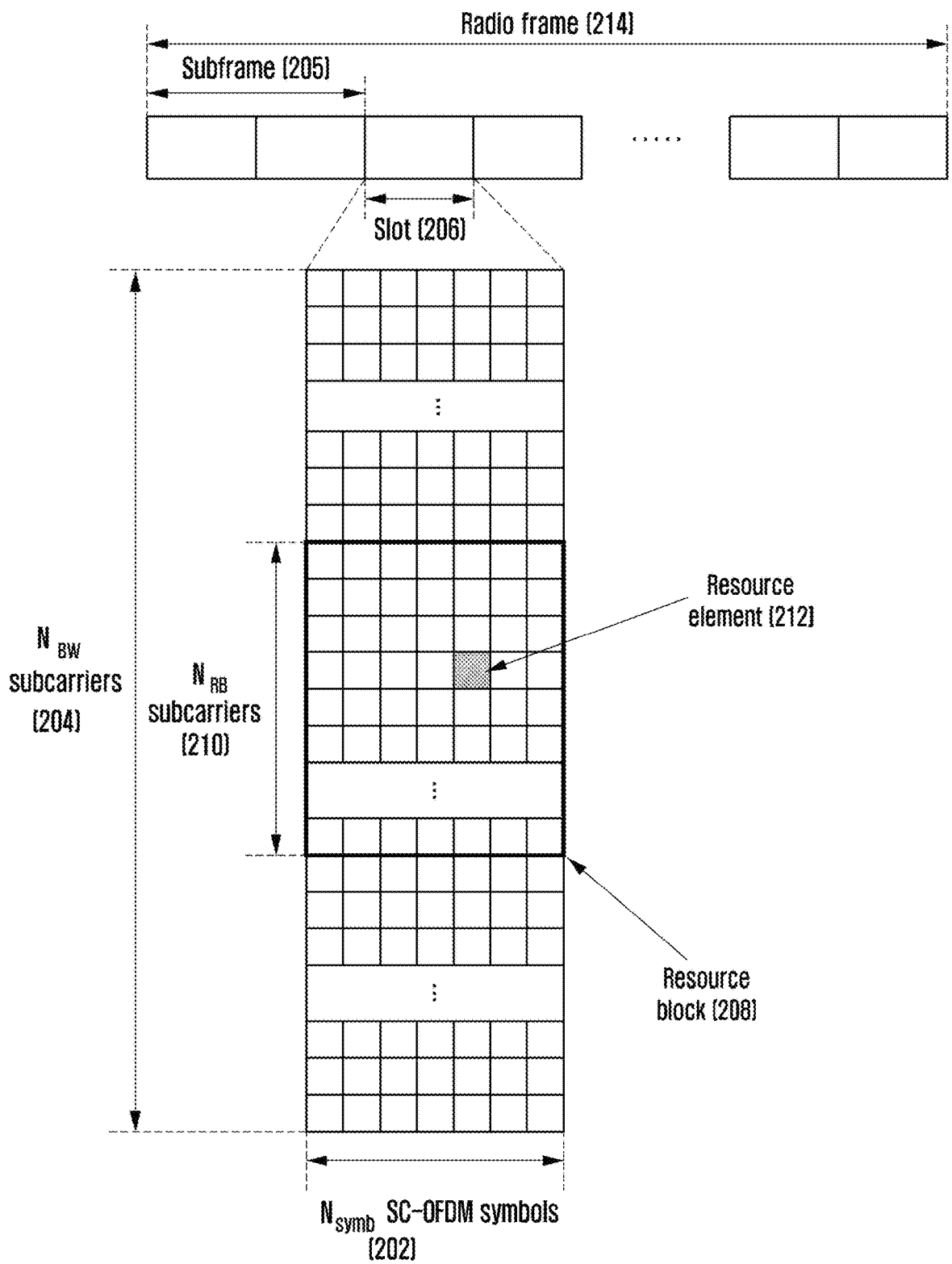
FIG. 2 is a diagram illustrating a basic time-frequency resource structure for transmitting uplink data or control channels in LTE and LTE-A systems.

FIG. 2 is a diagram illustrating a basic time-frequency resource structure for transmitting uplink data or control channels in LTE and LTE-A systems.

In FIG. 2, the horizontal axis denotes the time, and the vertical axis denotes the frequency. The smallest transmission unit in the time domain is an SC-FDMA symbol, and $N_{symb}$ SC-FDMA symbols 202 form a slot 206. Two slots 204 form a subframe 205. The smallest transmission unit in the frequency domain is a subcarrier, and the total system transmission bandwidth consists of $N_{BW}$ subcarriers 204. $N_{BW}$ is proportional to the system transmission bandwidth.

In the time-frequency domain, the basic resource unit is RE 212, and each RE is defined by one SC-FDMA symbol index and one subcarrier index. An RB 208 is defined by $N_{symb}$ consecutive SC-FDMA symbols in the time domain and $N_{symb}$ consecutive subcarriers in the frequency domain. Accordingly, one RB consists of $N_{symb} \times N_{symb}$ REs. Typically, the smallest data or control information transmission unit is an RB. A physical uplink control channel (PUCCH) is mapped to a frequency region corresponding to one RB and transmitted during a time period of one subframe.

Figure 3:
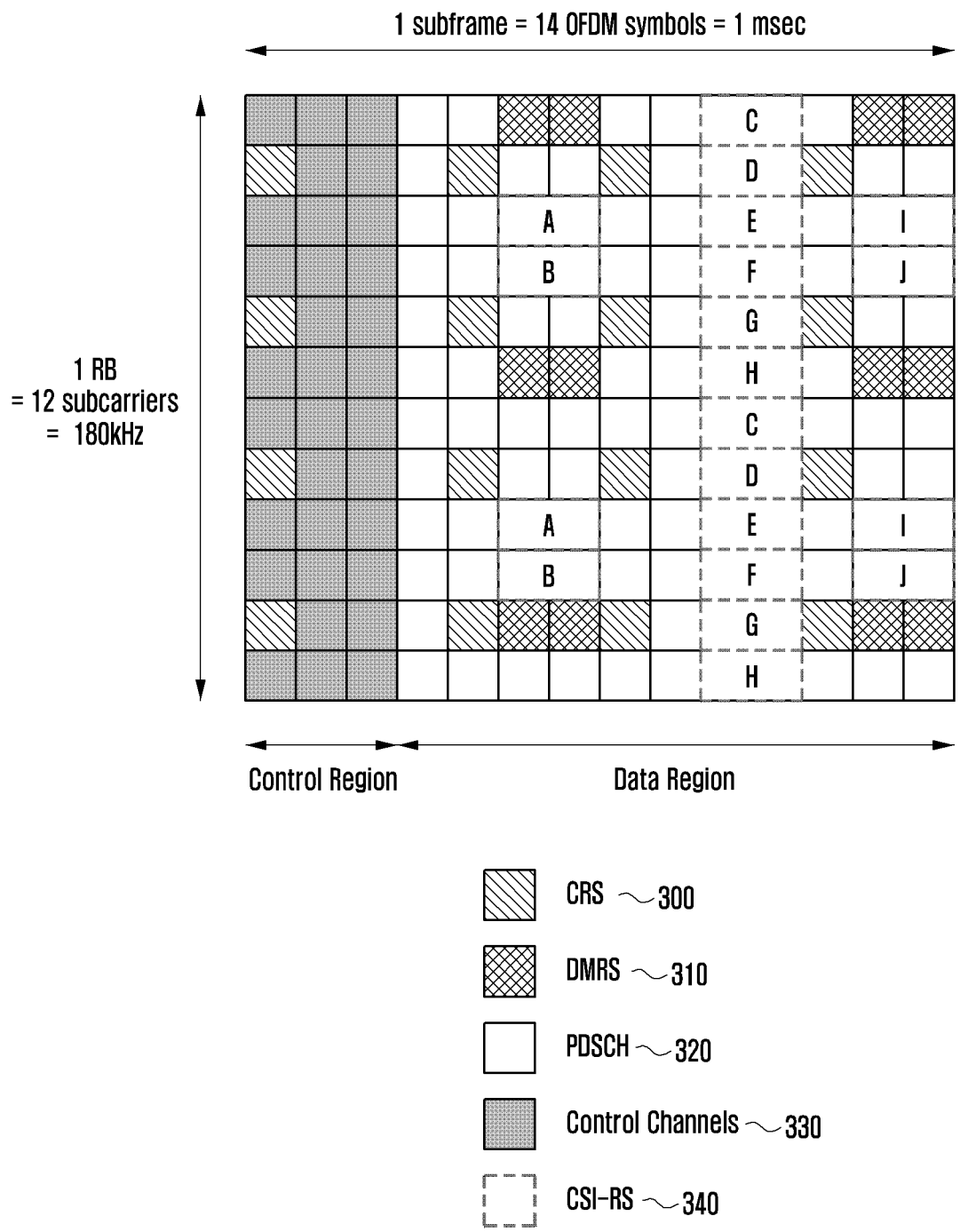
FIG. 3 is a diagram illustrating radio resources of 1 RB as the smallest downlink scheduling unit in LTE and LTE-A systems.

FIG. 3 is a diagram illustrating radio resources of 1 RB as the smallest downlink scheduling unit in LTE and LTE-A systems. As shown in FIG. 3, it may be possible to transmit different types of signals on the radio resource as follows.

1. Cell-specific Reference Signal (CRS): This is a reference signal broadcast periodically for use commonly by all UEs within one cell.

2. Demodulation Reference Signal (DMRS): This is a reference signal transmitted for a specific UE and used only for transmitting data to a corresponding UE. It may be possible to support up to 8 DMRS antenna ports. In LTE-A, antenna ports 7 to 14 are allocated for DMRS and these ports maintain orthogonality with Code Division Multiplexing (CDM) or Frequency Division Multiplexing (FDM) to avoid interference to each other.
3. Physical Downlink Shared Channel (PDSCH): This is a downlink channel for use in transmitting traffic from an eNB to a UE using REs to which no reference signal is mapped in the data region.
4. Channel Status Information Reference Signal (CSI-RS): This is a reference signal transmitted for use by UEs within a cell in channel status measurement. It may be possible that multiple CSI-RSs are transmitted within a cell.
5. Other control channels: These include Physical Hybrid-ARQ Indicator Channel (PHICH), Physical Control Format Indicator Channel (PCFICH), and Physical Downlink Control Channel (PDCCH); an eNB may provide a UE with control information for use in receiving data on a PDSCH or transmit HARQ ACK/NACK corresponding to data transmitted in uplink.

Considering that the CRS and DMRS, among the aforementioned signals, are reference signals for use in demodulating a signal received through channel estimation and channel estimation performance affects demodulation performance directly, the frequency-time resources interval for transmitting the reference signals is maintained.

For a 5G wireless communication system, unlike the LTE system, a system operating in frequency bands above 6 GHz is being considered in addition to the system operating below 6 GHz. The 5G system should be designed in consideration of the channel characteristics, which vary with the frequency band. There are also demanding requirements such as low latency and high mobility to be met for 5G wireless communication. It is also important to minimize interference and overhead caused by the reference signals in the 5G system; thus, there is a need of a method for minimizing a transmission-ON time of the reference signals. In order to accomplish this object, the present invention provides a method for a terminal to perform channel estimation effectively by employing a time-contiguous reference signal (TCRS).

Exemplary embodiments of the present invention are described in detail with reference to the accompanying drawings. Although the description is directed to an LTE or LTE-A system, the present invention can be applied even to other communication systems having a similar technical background and channel format. Examples of such systems may include the 5G mobile communication technology (new radio (NR)). In this case, the basic structures of the time-frequency resources for downlink and uplink transmissions may differ from those depicted in FIGS. 1 and 2. The signals being transmitted in downlink and uplink may also differ in type from those described with reference to FIG. 3. It will be understood by those skilled in the art that the present invention can be applied to other communication systems with a slight modification, without departing from the spirit and scope of the present invention.

Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification. In the following description, the term "base station (BS)" denotes an entity for allocating resources to terminals and is intended to include at least one of a Node B, an evolved Node B (eNB), a radio access unit, a base station controller, and a network node. The term "terminal" is intended to include a user equipment (UE), a mobile station (MS), a cellular phone, a smartphone, a computer, and a multimedia system with a communication function.

In the following description, the time-contiguous reference signal is substituted by its acronym TCRS for convenience of explanation. However, what the term TCRS intends may be expressed with different terms according to the intention of a user and the purpose of use of the reference signal. For example, the term "TCRS" may be substituted by another term such as "channel tracking reference signal (CTRS)", "phase noise reference signal (PNRS)", "phase noise compensation reference signal (PCRS)', and "phase reference signal (PRS)". The description is made with the specific term "TCRS" to help explain and understand the present invention rather than to limit the scope of the present invention. It is obvious to those skilled in the art that a reference signal can be practiced based on the technical spirit of the present invention.

Embodiment 1-1 of the present invention is directed to a structure and location of the TCRS in the time-frequency domain. Embodiment 1-2 of the present invention is directed to a method for a base station to configure the TCRS. Embodiment 1-3 of the present invention is directed to a UE operation based on the configured TCRS.

Embodiment 1-1

Embodiment 1-1 is directed to the structure and location of the TCRS, as a reference signal proposed in the present invention, in the time-frequency domain.

Figure 4:
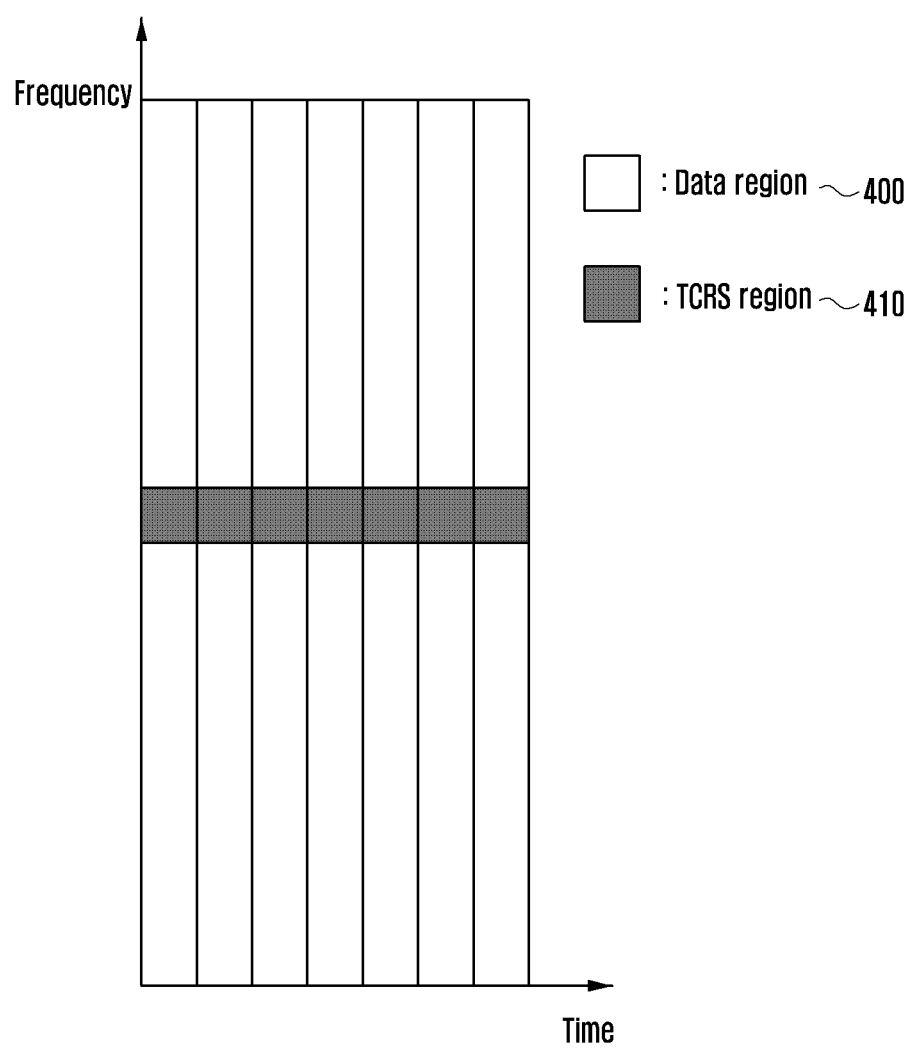
FIG. 4 is a diagram illustrating a structure of a TCRS.

FIG. 4 is a diagram illustrating a structure of a TCRS. As shown in FIG. 4, the TCRS 410 is transmitted on part of a data region 400 and contiguous on the time axis in the time-frequency domain. In detail, the TCRS may be transmitted contiguously (i.e., at all symbols) or in a closely arranged manner on the time axis. The TCRS may be transmitted at a specific frequency region or in a spread manner on the frequency axis as shown in FIG. 4.

Figure 5:
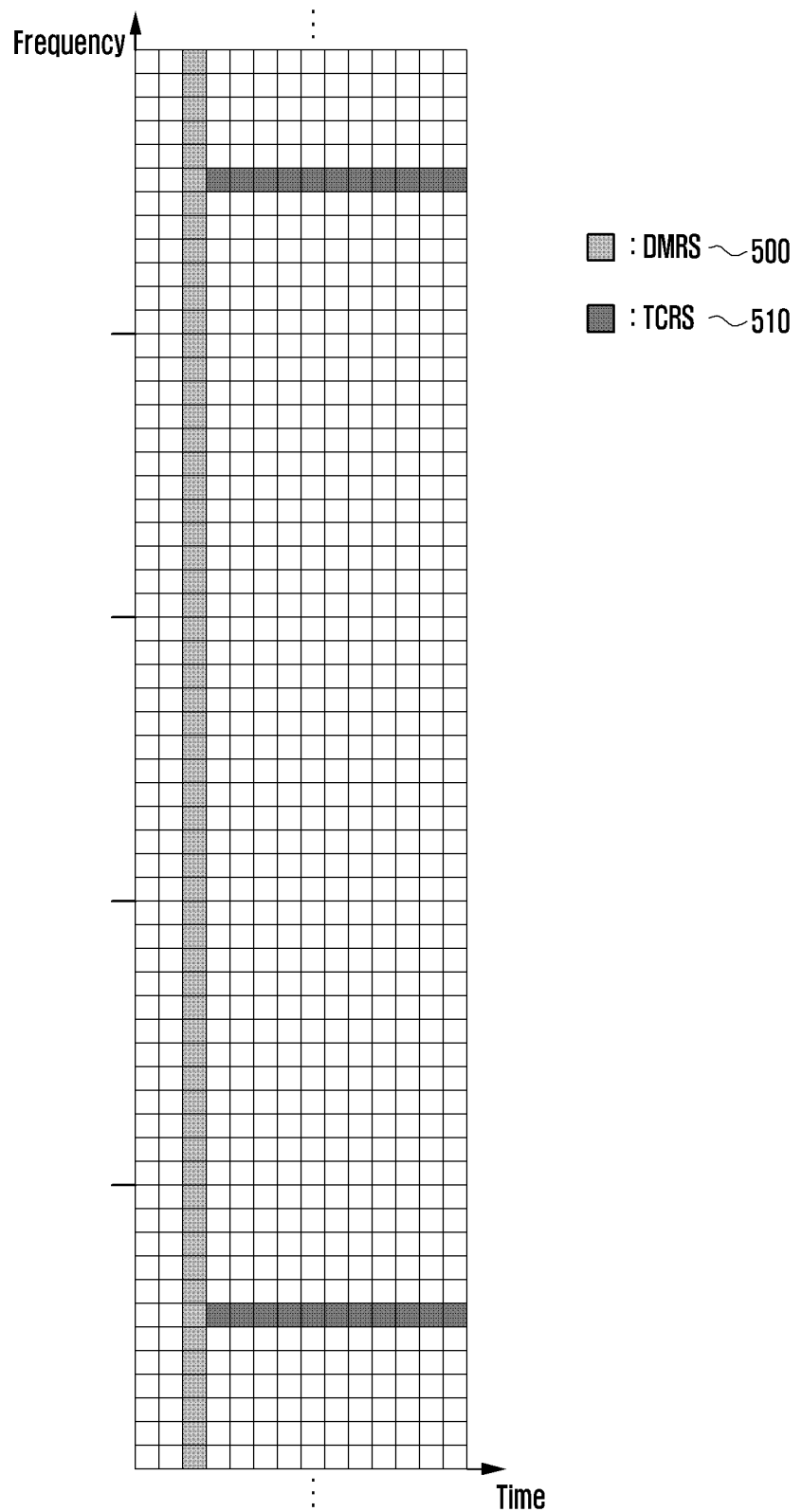
FIG. 5 is a diagram illustrating locations of a DMRS and a TCRS proposed in the present invention in the time-frequency domain.

FIG. 5 is a diagram illustrating locations of a DMRS and a TCRS proposed in the present invention in the time-frequency domain. As described above, in order to make it possible to perform channel estimation quickly in consideration of the low latency requirement of 5G wireless communication, the DMRS as a reference signal for use in demodulation is arranged at a beginning region of a subframe as shown in FIG. 5, unlike the case of FIG. 3. However, it may be difficult to guarantee channel estimation performance in a low SNR area (−10~0 dB) only with the DMRS located at the beginning region of the subframe. This structure also has a drawback of failing to track channel variation on the time axis in a high mobility situation. This problem may be solved through channel tracking on the symbols to which the TCRS is mapped as shown in FIG. 5. The TCRS may also be used for the purpose of compensating for a phase noise in the 5G system operating in a high frequency band.

Although the TCRS occupies one subcarrier every 4 RBs in the frequency domain in FIG. 5 according to embodiment 1-1, the present invention is not limited to such an arrangement, and it includes embodiments in which the TCRS is arranged at different locations in the frequency domain. For example, the TCRS may be mapped so as to be repeated every X RBs (X≥1) as shown in FIG. 5 or mapped to all subcarriers of an RB located at a predetermined region in the frequency domain as shown in FIG. 4. Although the TCRS is arranged to follow the DMRS in the time domain in FIG. 5, the present invention is not limited to such an arrangement, and it includes embodiments in which the TCRS is arranged at different locations in the time domain. For example, the TCRS may be mapped to the OFDM symbols following the DMRS as shown in FIG. 5 or, if the 5G system differs in basic time-frequency resource structure from the LTE and LTE-A systems, other OFDM symbols in the time domain. Assuming that a self-contained subframe (subframe in which both data and ACK/NACK corresponding to the data are scheduled) is used in the 5G system, if the last X (X≥1) OFDM symbols of the subframe are in use for uplink transmission, the corresponding region may not be used for TCRS transmission. If the TCRS is overlapped with other reference signals, the TCRS may preferentially be configured.

Although embodiment 1-1 is directed to the structure and locations of the TCRS for downlink in the time-frequency domain, if the 5G system uses the OFDMA even in uplink, the structure and locations of the TCRS that have been described in embodiment 1-1 may be identically used for both the downlink and uplink in the time-frequency domain.

Embodiment 1-2

Embodiment 1-2 is directed to a method for a base station to configure a TCRS as a reference signal proposed in the present invention. It may be possible to configure the TCRS to be common for all UEs within a cell (sector or transmission/reception point (TRP)) or per UE (in a UE-specific manner). Configuring a common TCRS is similar to configuring the CRS in the LTE system to transmit the reference signal without applying any UE-specific precoding, and configuring a UE-specific TCRS is similar to configuring the DMRS in the LTE system to transmit the reference signal with a UE-specific precoding being applied. Because the two TCRS operation methods have advantages and disadvantages, the present invention proposes both the two methods.

If a common TCRS is configured, all of the UEs located within the cell (sector or TRP) may acquire additional information with the common reference signal, similar to the case of using the LTE CRS, as well as performing channel tracking based on the TCRS. The additional information that can be acquired with the configuration of the common TCRS may vary with the location of the TCRS in the time-frequency domain. For example, assuming that the TCRS occupies one subcarrier every 4 RBs in the frequency domain at every subframe across the whole band as shown in FIG. 5, the UE may perform various measurements (e.g., radio resource measurement (RRM), Doppler spread measurement, and delay spread measurement) based on the TCRS. It may also be possible to the measure a frequency offset as time goes by based on the characteristics of the TCRS being transmitted contiguously on the time axis.

However, the common TCRS proposed in the present invention differs from the legacy LTE CRS in that the TCRS overhead is smaller than the CRS overhead. Unlike the LTE CRS being transmitted on every RB across the whole band as shown in FIG. 3, the TCRS proposed in the present invention with reference to FIG. 5 may be configured not to be transmitted during a predetermined time period via RRC configuration or dynamic signaling. A description in detail is made later of the method for turning OFF the proposed TCRS configuration. However, configuring the common TCRS has a drawback in that the channel tracking performance on the UE-specific beamformed signal is degraded.

In the case of configuring the UE-specific TCRS, it is possible to perform the channel tracking more accurately on the UE-specific beamformed signal in comparison with the case of configuring the common TCRS. However, the UE-specific TCRS configuration has a drawback of degrading the resolution (in this case, the resolution may be interpreted as a ratio of the resources for TCRS to the entire resources) on the time axis if orthogonal transmission layers are allocated to the respective UEs in a multiuser (MU) transmission environment.

Figure 6:
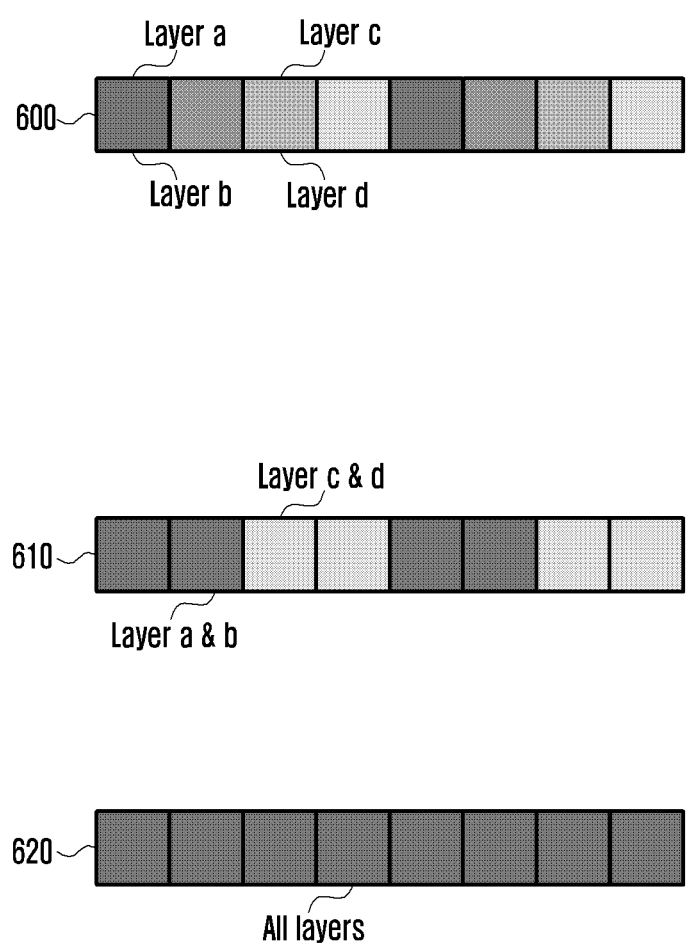
FIG. 6 is a diagram illustrating a method for allocating transmission layers to UEs.

FIG. 6 is a diagram illustrating a method for allocating transmission layers to UEs. The drawing 600 of FIG. 6 shows that the resolution of the TCRS decreases on the time axis in the case of using a time division multiplexing (TDM) as a multiplexing mode (among various multiplexing modes such as CDM and FDM) for allocating 4 transmission layers to the respective UEs. The drawing 610 shows that the resolution of the TCRS decreases on the time axis in the case of using the CDM as a multiplexing mode for allocating 4 transmission layers to the respective UEs. In order to overcome the shortcoming in that the resolution of the TCRS decreases when the orthogonal transmission layers are allocated to the respective UEs, it may be possible to use a method of allocating the TCRS time-contiguously as denoted by reference number 620 under the assumption of same phase drift on all transmission layers. That is, the last method is to configure just one antenna port to the TCRS.

Hereinabove, the advantages and disadvantages of the common TCRS and UE-specific TCRS configurations have been compared with each other. Hereinafter, descriptions are made of the method for configuring multiple TCRSs and the function for turning OFF the TCRS configuration as proposed in the present invention.

Figure 7:
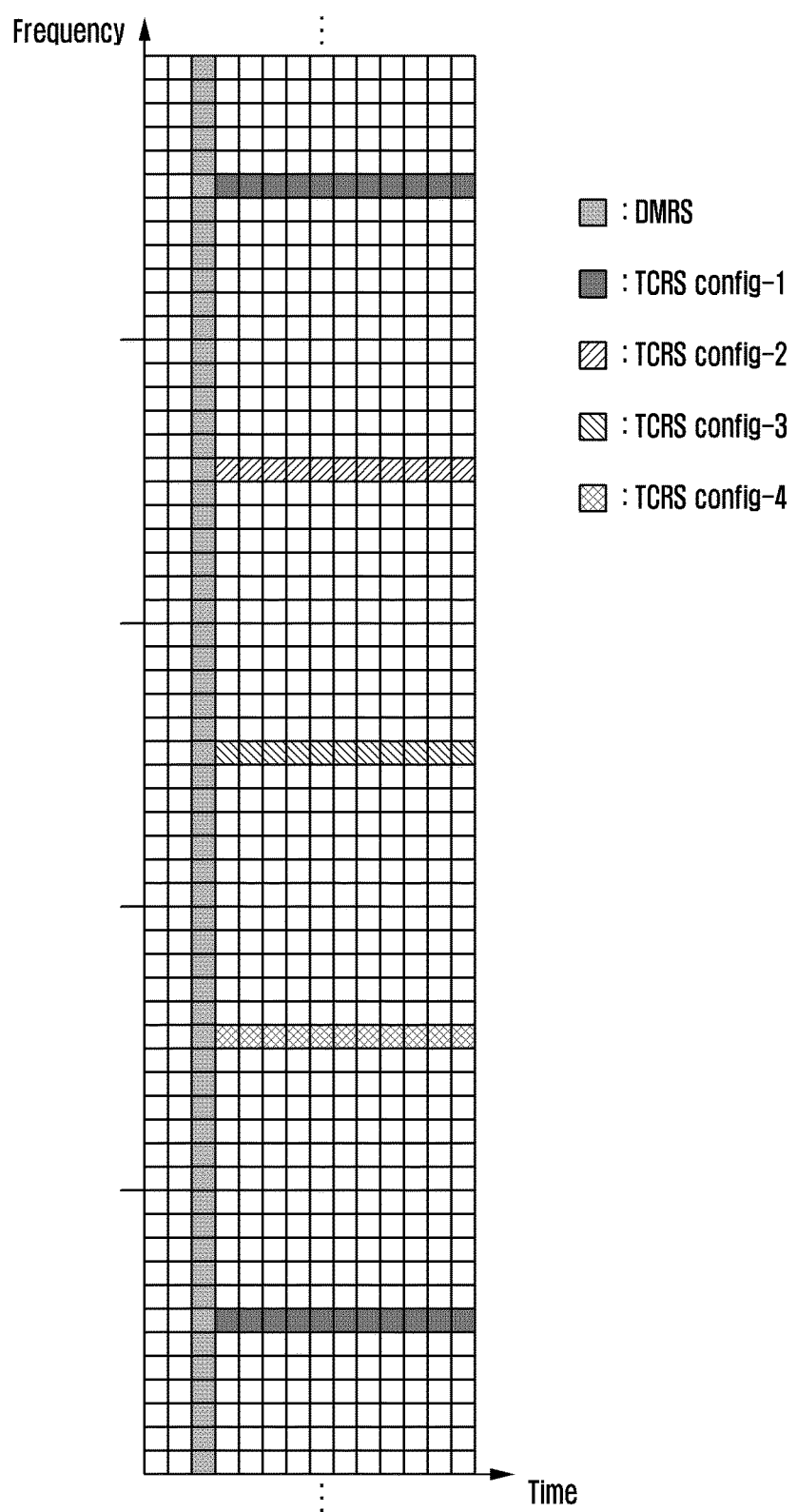
FIG. 7 is a diagram illustrating an exemplary method for configuring 4 different TCRSs.

The multiple TCRS configuration method aims to minimize inter-cell (inter-sector or inter-TRP) interference. It may be possible to configure different TCRSs to the UEs using the multiple TCRSs configuration method. FIG. 7 shows a method for configuring 4 different TCRSs by way of example. However, the multiple TCRSs configuration method of the present invention is not limited to the exemplary case of FIG. 7. In detail, the multiple TCRSs configuration method of the present invention may be performed as follows.

Table 2 shows a method for configuring the TCRSs via higher layer signaling such as RRC signaling. Here, TCRS-ConfigNZPId denotes a configuration value of the TCRS, and it is possible to configure maxTCRS-NZP TCRSs (maxTCRS-NZP≥0). If TCRS-ConfigNZPId=0, no TCRS is transmitted. Here, the UE may assume that data are transmitted in the TCRS region. If TCRS-ConfigNZPId≠0, the TCRS-ConfigNZPId value indicates the transmission location of the TCRS, and the UE may assume that the reference signal is transmitted at the corresponding TCRS locations.

TABLE 2

-- ASN1START
TCRS-ConfigNzPId ::=   INTEGER (0..maxTCRS-NZP)
-- ASN1STOP

Using the TCRS configuration method proposed in embodiment 1-2 of the present invention, it is possible to configure the common TCRS or the UE-specific TCRS. Using the multiple TCRSs configuration method and the function for turning OFF the TCRS configuration, it is possible to minimize interference caused by the reference signals and all-the-time transmission of the reference signals.

Embodiment 1-3

Embodiment 1-3 is directed to a UE operation based on the structure and configuration of the TCRS as a reference signal proposed in the present invention. In embodiment 1-2, the common TCRS and UE-specific TCRS configurations have been described. Hereinafter, a description is made of the respective UE operations with the common TCRS and UE-specific TCRS configurations.

In the case where the UE-specific TCRS is configured, the TCRS may be transmitted only in a resource-allocated band, and the location at which the TCRS is transmitted is determined by the resource-allocated band. In LTE, a PRB bundling size configured for DMRS is determined according to the system bandwidth. In the present invention, it is proposed to determine the bundling size for the TCRS as a multiple of the PRB bundling size configured for the DMRS. It may be possible to assign one or more TCRSs to the PRBs in the bundling size for the TCRS. In the case where the UE-specific TCRS is configured, the TCRS transmission starting locations may be determined in association with the starting point of the RBs allocated to the UE.

Figure 8:
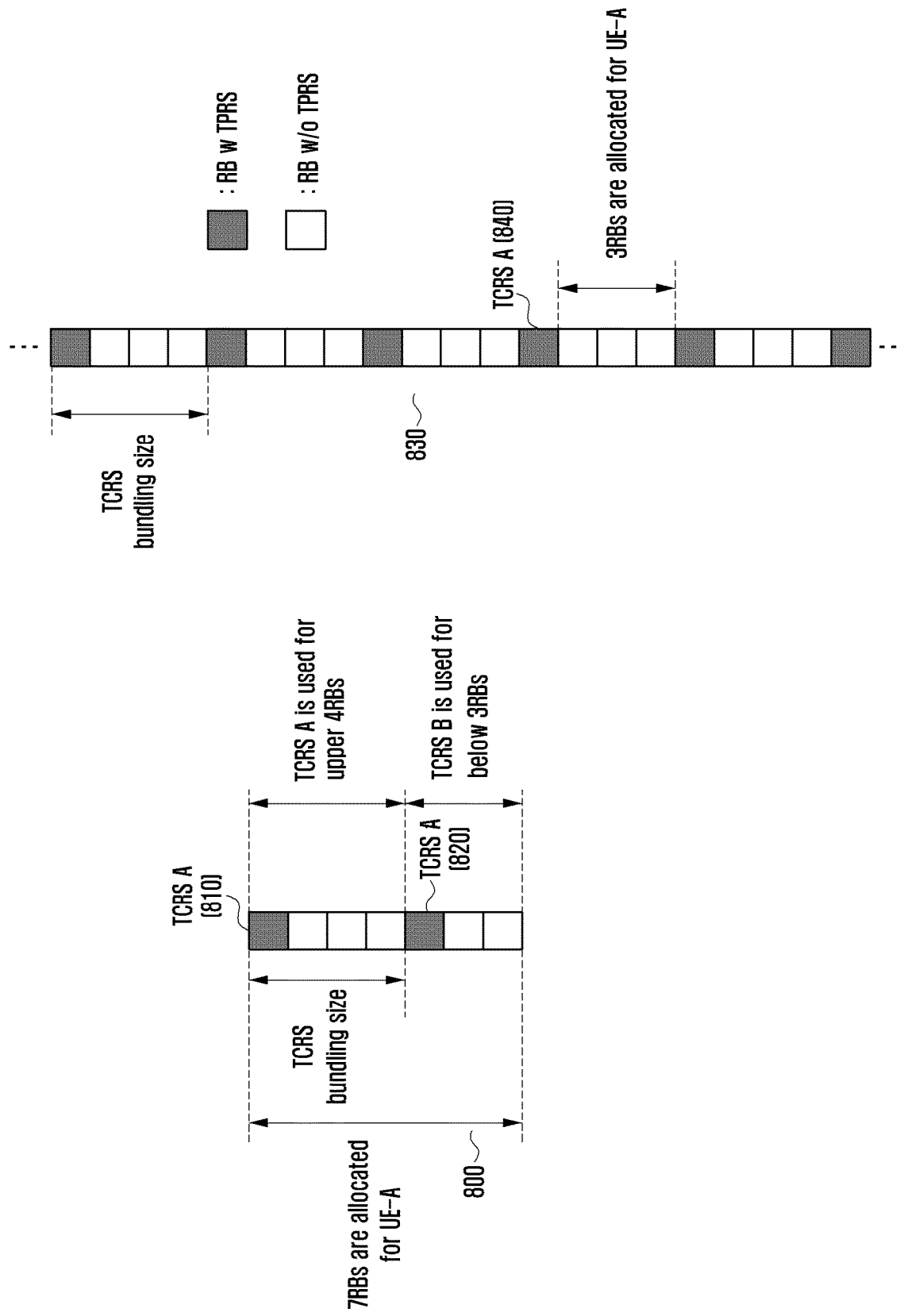
FIG. 8 is a diagram illustrating exemplary TCRS allocation.

FIG. 8 is a diagram illustrating exemplary TCRS allocation. The UE operation for use of the TCRS is described in detail with reference to the drawing 800 of FIG. 8 in the case where the UE-specific TCRS is configured. In the drawing 800, it is assumed that a UE-A is allocated 7 RBs, the PRB bundling size configured for the DMRS is 4, and the bundling size being applied for the TCRS is 4, identical with the PRB bundling size. A channel estimation is performed using the TCRS allocated in the bundling size being applied for the TCRS under the assumption that the TCRS transmission starting location of the UE is configured every 4 RBs, starting from the first one of the allocated RBs. In detail, the UE-A may perform channel estimation using TCRS A 810 included in 4 RBs among the 7 RBs allocated to the UE-A and TCRS B 810 included in the 3 remaining RBs among the 7 RBs allocated to the UE-A.

In the case where the common TCRS is configured, the TCRS may be transmitted across the whole band, and the TCRS transmission location may be determined by the allocated band. In LTE, the PRB bundling size configured for DMRS is determined according to the system bandwidth. In the present invention, it is proposed to determine the bundling size for the TCRS as a multiple of the PRB bundling size configured for the DMRS. It may be possible to assign one or more TCRSs to the PRBs in the bundling size for the TCRS. The UE operation for use of the TCRS is described in detail with reference to the drawing 830 of FIG. 8 in the case where the common TCRS is configured. In the drawing 830, it is assumed that the PRB bundling size configured for the DMRS is 4, the bundling size being applied for the TCRS is 4, identical with the PRB bundling size, and the TCRS is transmitted at every 4 RBs across the whole bandwidth. The UE performs channel estimation using the TCRS allocated by the bundling size being applied for the TCRS. In detail, the UE may perform channel estimation using TCRS A 840 for the 3 RBs allocated to the UE-A.

In embodiment 1-3, it is proposed to determine the bundling size being applied for the TCRS as a multiple of the PRB bundling size configured for the DMRS. It is also proposed to allocate one or more TCRSs to the PRBs in the bundling size for the TCRS. If the bundling size for the TCRS is set to be greater than the PRB bundling size configured for the DMRS, this is advantageous for the UE to perform channel estimation using more TCRSs and disadvantageous in terms of bringing about scheduling restrictions. The UE may perform an operation using the TCRS under the assumption of the method proposed in embodiment 1-3.

Figure 9:
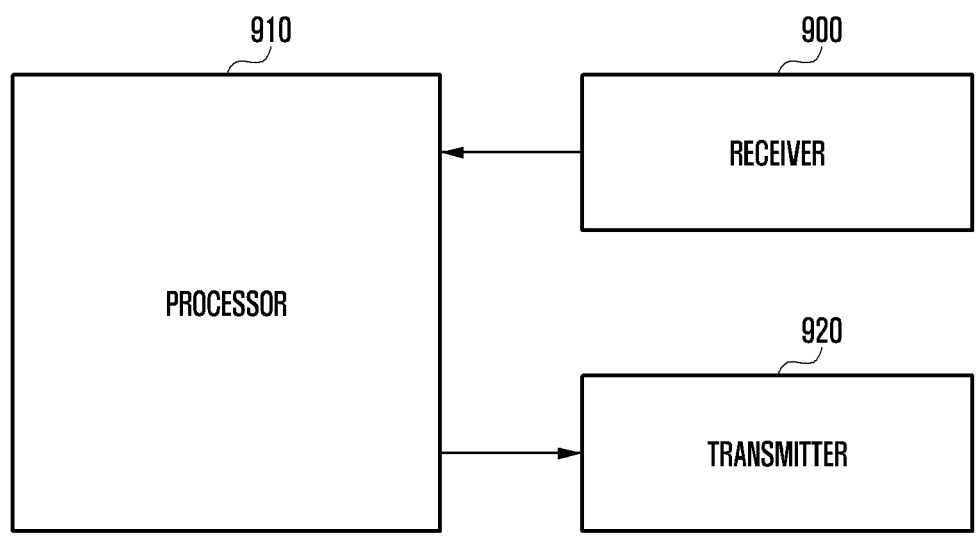
FIGS. 9 and 10 are block diagrams illustrating configurations of a UE and a base station according to an embodiment of the present invention.
Figure 10:
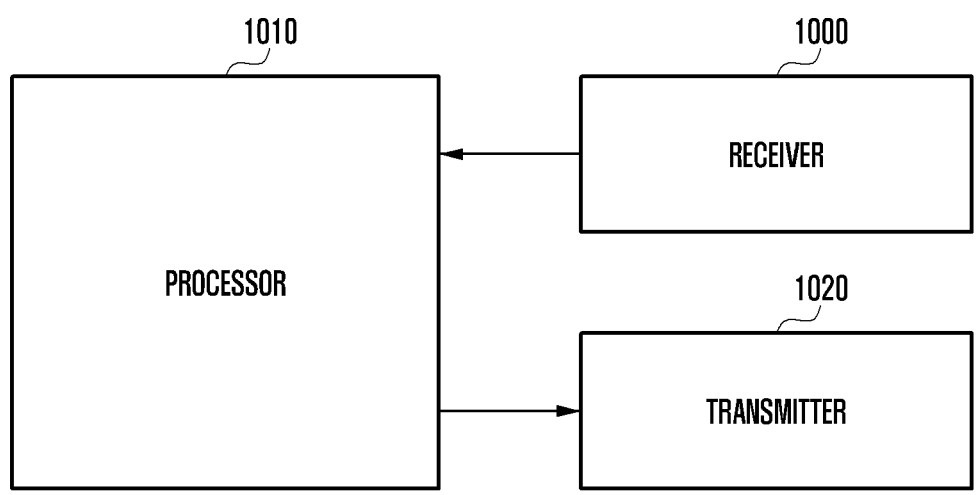

FIGS. 9 and 10 are block diagrams illustrating configurations of a UE and a base station according to an embodiment of the present invention. In order to accomplish the TCRS transmission/reception operations of the base station and the UE that have been described in embodiments 1-1 to 1-3, a receiver, a processor, and a transmitter of each of the base station and the UE should operate according to the respective embodiments.

FIG. 9 is a block diagram illustrating a configuration of a UE according to an embodiment of the present invention. As shown in FIG. 9, the UE may include a processor 910, a receiver 900, and a transmitter 920. According to an embodiment of the present invention, the receiver 900 and the transmitter 920 may be collectively referred to as a transceiver. The transceiver may transmit and receive signals to and from a base station. The signals may include control information and data. The transceiver may include a radio frequency (RF) transmitter for frequency-up-converting and amplifying a signal to be transmitted and an RF receiver for low-noise-amplifying and frequency-down-converting a received signal. The transceiver may output a signal received over a radio channel to the processor 910 and transmit a signal output from the processor 910 over the radio channel.

The processor 910 may control the overall operations of the UE according to the above-described embodiments of the present invention. For example, the processor 910 may control the receiver 900 to receive a TCRS from the base station and interpret the TCR. The transmitter may also transmit the TCRS.

FIG. 10 is a block diagram illustrating a configuration of a base station according to an embodiment of the present invention. The base station may include a receiver 1000, a transmitter 1020, and a processor 1010. According to an embodiment of the present invention, the receiver 1000 and the transmitter 1020 may be collectively referred to as a transceiver. The transceiver may transmit and receive signals to and from a UE. The signals may include control information and data. The transceiver may include an RF transmitter for frequency-up-converting and amplifying a signal to be transmitted and an RF receiver for low-noise-amplifying and frequency-down-converting a received signal. The transceiver may output a signal received over a radio channel to the processor 1010 and transmit a signal output from the processor 1010 over the radio channel.

The processor 1010 may control the overall operations of the base station according to above-described embodiments of the present invention. For example, the processor 1010 may control to determine TCRS transmission locations in the time-frequency domain and generate TCRS configuration information to be transmitted to the UE. Afterward, the transmitter 1020 transmits the TCRS and the configuration information to the UE, and the receiver 1000 receives the TCRS on the resources determined according to the configuration information.

According to an embodiment of the present invention, the processor 1010 may control the base station to generate a radio resource control (RRC) signal including the TCRS configuration information. In this case, the RRC signal may indicate inclusion of the TCRS configuration information.

The embodiments disclosed in the specification and drawings are proposed to help explain and understand the present invention rather than to limit the scope of the present invention. It is obvious to those skilled in the art that modifications and changes can be made thereto without departing from the spirit and scope of the present invention. If necessary, the embodiments may be combined in whole or in part. For example the base station and the UE may operate according to a combination of parts of embodiments 1-1, 1-2, and 1-3 of the present invention. Although the embodiments are directed to the FDD LTE system, the present invention can include alternative embodiments directed to other systems such as TDD LTE and 5G NR systems without departing from the technical sprit of the present invention.

Embodiment 2

In order to meet various user requirements and service qualities in a $5^{th}$ generation (5G) cellular communication system or a new radio (NR) communication system, it is important to design a system that is capable of supporting different transmission/reception schemes and services. It is also important to design the NR system without potential systemic restrictions that may limit the services to be added in the future in consideration of forward compatibility. Also, use of a dynamic time division duplex (TDD) is being considered to improve frequency utilization efficiency of the NR system in comparison with the legacy LTE system. Unlike the legacy LTE TDD system in which uplink and downlink subframes are preconfigured to switch between uplink and downlink transmissions according to the configuration, the NR system is characterized in that a base station determines whether to use a subframe for uplink or downlink transmission through a scheduling based on the distribution of UEs and required transmission/reception data amount within a cell. That is, the switching between uplink and downlink is dynamically performed by unit of subframe in the dynamic TDD mode.

Meanwhile, in order for a base station to control and manage UEs in the IDLE STATE within a cell, the base station has to transmit a broadcast channel including synchronization signals and system information periodically and reserve periodic uplink resources for use in receiving initial access requests from UEs attempting to connect to the system. In the present invention, a signal being transmitted by a UE for initial access request is referred to as a random access preamble, and related operations are described in detail.

However, in the dynamic TDD characterized in that whether to use a subframe for uplink or downlink transmission is determined based on the distribution of UEs and required transmission/reception data amount within a cell to improve the frequency utilization efficiency, if the UE in the idle state has to transmit and receive periodic signals, this reduces the efficiency of the dynamic TDD.

Thus, the present invention proposes a method and apparatus for performing a random access operation without reducing the frequency utilization efficiency of the dynamic TDD in the NR system supporting the dynamic TDD.

The NR system aims to support a data rate higher than that of the legacy LTE system. In the NR system, employment of a method for transmitting a signal in a broad frequency band above 6 GHz is being considered in order to accomplish such a high data rate. That is, improvement of the data rate using a millimeter wave (mmWave) band such as 28 GHz and 60 GHz bands is being considered. However, in order to compensate for a high signal propagation loss in the mmWave frequency band, it is necessary to perform a directional beam-based transmission with multiple antennas. In the case of using the directional beam-based transmission scheme, a problem arises in that it is difficult to transmit or receive a signal at a location where the beam is not formed. Although it may be possible for the base station to form an appropriate directional beam to a UE, for the case where the UE is in the CONNECTED STATE, based on the status information of the UE, if the UE is in the IDLE state, the base station may not form a beam to the UE because it has no status information of the UE. For example, if the base station may not form a beam appropriate for the UE attempting initial access in the IDLE state, it may fail to receive a random access preamble transmitted by the UE.

Thus, the present invention proposes a method and apparatus for performing a directional beam-based random access in a frequency band above 6 GHz.

The NR system aims to support a data rate higher than that of the legacy LTE system. In the NR system, employment of a method for transmitting a signal in a broad frequency band above 6 GHz is being considered in order to accomplish such a high data rate. That is, improvement of the data rate using a millimeter wave (mmWave) band such as 28 GHz and 60 GHz bands is being considered. However, in order to compensate for a high signal attenuation per distance in the mmWave frequency band, it is necessary to perform a directional beam-based transmission with multiple antennas. In the case of using the directional beam-based transmission scheme, a problem is that it is difficult to transmit or receive a signal at a location where the beam is not formed. Although it may be possible for the base station to form an appropriate directional beam to a UE, for the case where the UE is in the CONNECTED STATE, based on the status information of the UE, if the UE is in the IDLE state, the base station may not form a beam to the UE because it has no status information of the UE. For example, if the base station may not form a beam appropriate for the UE attempting initial access in the IDLE state, it may fail to receive a random access preamble transmitted by the UE.

Thus, the present invention proposes a method and apparatus for performing a directional beam-based random access operation in an above-6 GHz frequency band.

The mobile communication system has evolved to a high-speed, high-quality packet data communication system (such as High Speed Packet Access (HSPA), LTE (or evolved universal terrestrial radio access (E-UTRA)), LTE-Advanced (LTE-A), and LTE Pro defined in the $3^{rd}$ Generation Partnership Project (3GPP), High Rate Packet Data (HRPD) and Ultra Mobile Broadband (UMB) defined in the $3^{rd}$ Generation Partnership Project-2 (3GPP2), and 802.16e defined in the IEEE) capable of providing data and multimedia services beyond the early voice-oriented services.

The LTE system as one of the representative broadband wireless communication systems uses orthogonal frequency division multiplexing (OFDM) in the downlink (DL) and single carrier frequency division multiple access (SC-FDMA) in the uplink (UL). The term "uplink" denotes a radio link for transmitting data or control signals from a terminal that is interchangeably referred to as user equipment (UE) and mobile station (MS) to a base station (BS) that is interchangeably referred to as evolved node B (eNB), and the term "downlink" denotes a radio link for transmitting data or control signals from a base station to a terminal. Such multiple access schemes are characterized by allocating the time-frequency resources for transmitting user-specific data and control information without being overlapped with each other, i.e., maintaining orthogonality, so as to distinguish among user-specific data and control information.

The NR system as a next generation communication system has to meet the requirement of data rates higher than those supported by the legacy LTE, LTE-A, and LTE-Pro systems. For example, the NR system aims to increase the peak downlink data rate up to 20 Gbps and the peak uplink data rate up to 10 Gbps. The NR system also aims to increase the user-perceived data rate as well as the peak data rates.

In order to meet such requirements, it is necessary to improve various signal transmission/reception technologies including multi-input multi-output (MIMO) transmission technology. The data rate requirements for the NR systems may be met by use of a frequency bandwidth broader than 20 MHz in the frequency bands of 3 to 6 GHz or above 6 GHz instead of the current LTE band of 2 GHz in comparison with the legacy LTE system in use of up to 20 MHz transmission bandwidth in the 2 GHz band. Finally, in order to improve the frequency utilization efficiency, it may be possible to employ the dynamic TDD for adjusting uplink and downlink transmission/reception time periods in adaptation to the distribution of UEs and required data amount within a cell.

The dynamic TDD is a technology for switching between uplink and downlink transmissions in such a way that the base station determines whether to use a subframe as an uplink subframe or a downlink subframe based on the distribution of the UEs and required transmission/reception data amount within a cell. In the legacy LTE system operating with a semi-static TDD, a subframe pattern specifying the subframes for use in uplink and downlink is preconfigured for switching between the uplink and downlink transmissions. Accordingly, in the legacy LTE TDD system it is difficult to adjust the uplink/downlink occupancy time in adaptation to change of data traffic. Meanwhile, the above-described dynamic TDD is advantageous in terms of maximizing the frequency utilization efficiency by allowing the base station to perform switching between uplink and downlink dynamically in adaptation to the change of the data traffic within the cell.

Meanwhile, in order for a base station to control and manage UEs in the IDLE STATE within a cell, the base station has to transmit a broadcast channel including synchronization signals and system information periodically and receive initial access requests from the UEs attempting to connect to the system. In the case of transmitting a synchronization signal or a broadcast channel and receiving a random access preamble periodically in the dynamic TDD mode, this may weaken the frequency utilization efficiency improvement expected with the dynamic TDD. In the case where the base station transmits synchronization signals and a broadcast channel to the UEs in the idle state periodically, the subframe carrying the synchronization signals and system information should be always fixed as a downlink subframe regardless of the data traffic status; similarly, in order for the base station to periodically receive the random access preambles transmitted by the UEs in the idle state for initial access, it is necessary to fix a subframe arriving at a predetermined interval (period) as an uplink subframe. Like this, if a specific subframe is fixed as an uplink or downlink subframe, this may cause a problem of degrading the frequency utilization efficiency of the base station.

Thus, the present invention aims to provide a method and apparatus for performing a random access procedure efficiently for a UE in the idle state as well as improving the frequency utilization efficiency in a communication system supporting the dynamic TDD.

Figure 11:
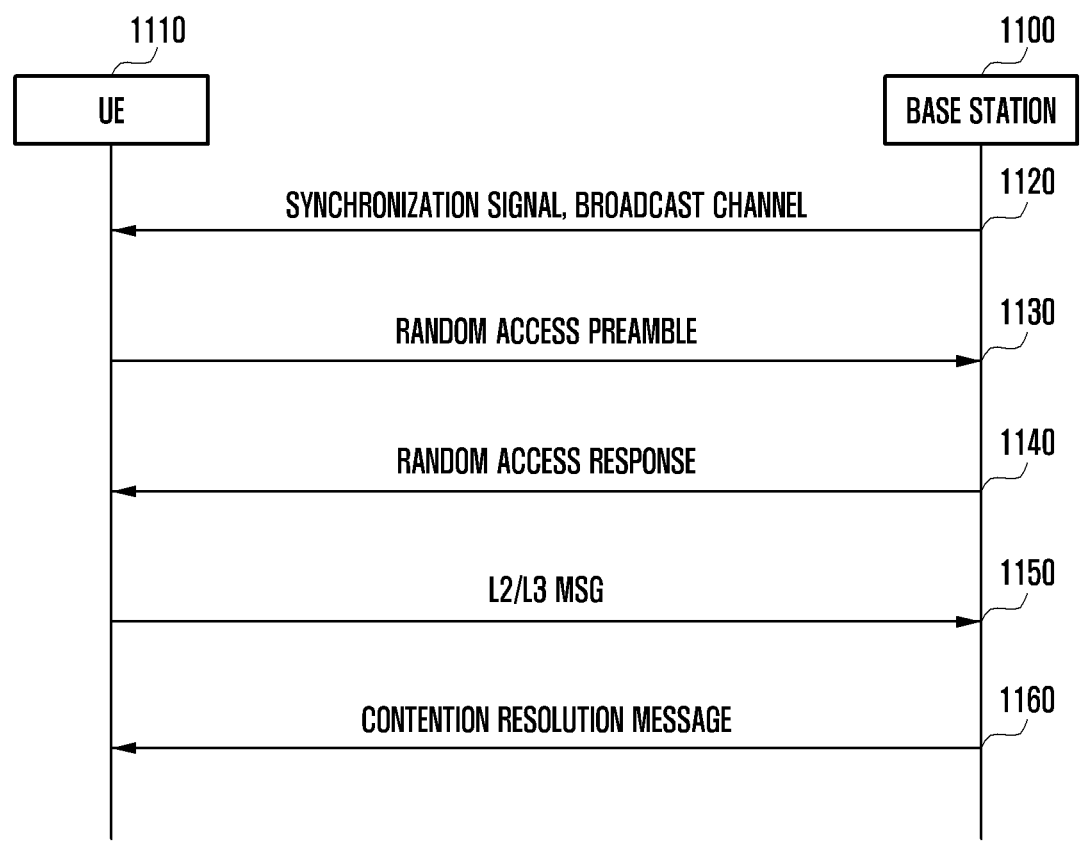
FIG. 11 is a signal flow diagram illustrating a random access procedure between a UE and a base station in a legacy LTE system.

FIG. 11 is a signal flow diagram illustrating a random access procedure between a UE and a base station in a legacy LTE system to provide a basis of understanding a random access considered in the present invention.

In FIG. 11, the base station 1100 transmits a synchronization signal and a broadcast channel, at step 1120, for use by the UE 1110 in the idle or connected state to achieve synchronization and acquire system information within a cell. The UE 1110 may achieve time and frequency synchronization with the base station based on the synchronization signal transmitted by the base station and detects a cell identifier of the base station. The synchronization signal may include a primary synchronization signal (PSS) and a secondary synchronization signal (SSS) for use in LTE or a combination of additional synchronization signals. The broadcast channel may be used for transmitting the system information necessary for connection to the base station and cell. The system information may include information necessary for the random access of the UE.

After the receipt of the synchronization signal and the broadcast channel, the UE 1110 may transmit a random access preamble to the base station 1100 at step 1130. In the legacy LTE system, the UE 1110 may transmit the random access preamble to the base station 1100 based on random access preamble-transmission time and frequency resources information and preamble information acquired from the broadcast channel. The random access preamble-transmission time and frequency resources are allocated at a predetermined interval (period) and, if it is determined to transmit a random access preamble, the UE may transmit the preamble on the random access preamble transmission resources appearing after the determination.

The base station attempts to detect random access preambles transmitted by the UEs on the random access preamble transmission resources it has configured. Typically, the random access preamble may be identified by time, frequency, and code; in the LTE system, it is possible to identify a UE by a UE-specific code sequence. If the base station 1100 detects a random access preamble including a specific code sequence, it transmits to the corresponding UE, at step 1140, a random access response in response to the preamble. The UE 1110 which has transmitted the random access preamble attempts to receive the random access response during a predetermined time period after transmitting the random access preamble. The random access response may include resource allocation information, uplink timing control information, and uplink power control information for use by the terminal that has transmitted the random access preamble to transmit uplink data.

Upon receipt of the random access response, the UE 1110 may transmit layer-2 and/or layer-3 (L2/L3) message information to the base station, at step 1150, according to the uplink resource allocation information included in the random access response. The UE may use the information acquired from the random access response for transmitting the L2/L3 message information to the base station. Upon receipt of the L2/L3 message, the base station may transmit, at step 1160, a contention resolution message in response to the L2/L3 message. The contention resolution message is transmitted for resolving a collision that may occur in the random access procedure. That is, in the case where multiple UEs transmit random access preambles with the same code sequence at step 1130, they transmit the L2/L3 message on the same uplink resources, which causes a collision. Accordingly, the contention resolution message being transmitted at step 1160 is scrambled with a unique identifier included in the preferably received L2/L3 message among the L2/L3 messages transmitted by the multiple UEs such that only the UE selected by the base station receives the contention resolution message.

As described with reference to FIG. 11, the synchronization signal and the broadcast channel are periodically transmitted by the base station, which may configure the random access preamble-transmission resources for a UE at a predetermined interval(period).

Figure 12:
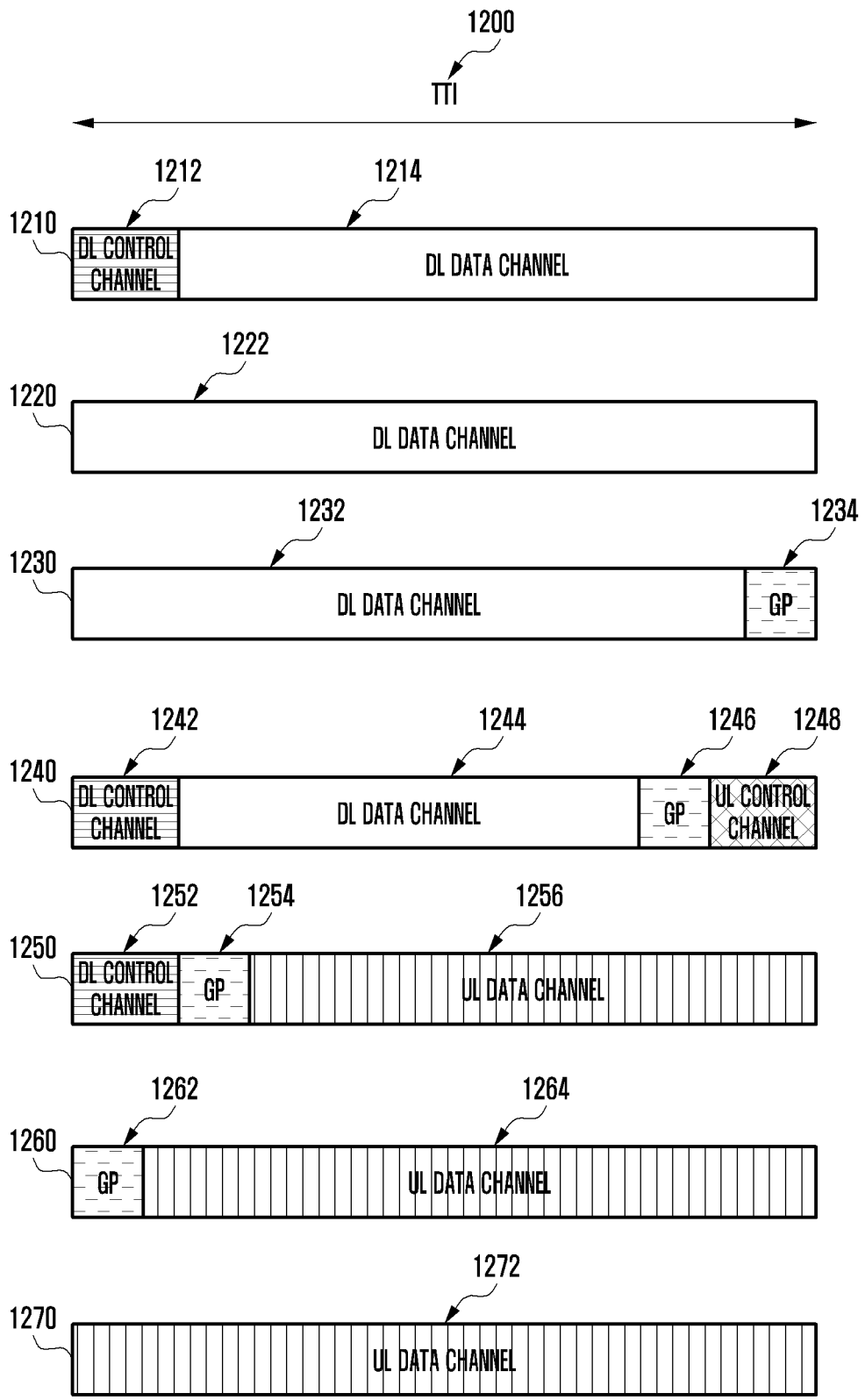
FIG. 12 is a diagram illustrating time domain transmission resource structures being considered in an NR system.

FIG. 12 is a diagram illustrating time domain transmission resource structures being considered in an NR system.

In FIG. 12, the time domain transmission resource structure is made up of a transmit time interval (TTI) 1200. The fixed TTI consists of a plurality of OFDM symbols. The TTI 1200 may include a downlink transmission time period and an uplink transmission time period. In detail, the downlink transmission time period includes a downlink control channel transmission time period 1212, 1242, and 1252 and a downlink data channel transmission time period 1214, 1222, 1232, and 1244; and the uplink transmission time period may include an uplink control channel transmission time period 1248 and an uplink data channel transmission time period 1256, 1264, and 1272. The TTI 1200 may also include a guard period 1246, 1254, and 1262 for switching from downlink to uplink.

As shown in FIG. 12, the NR system may support transmission resource structures 1210, 1220, 1230, 1240, 1250, 1260, and 1270 that differ in lengths of the downlink control channel, downlink data channel, uplink control channel, and uplink data channel; each channel consists of a plurality of OFDM symbols that correspond to a time length.

The transmission resource structure 1210 may consist of the downlink control channel 1212 and the downlink data channel 1214. The transmission resource structure 1220 may consist of only the downlink data channel 1212. The transmission resource structure 1230 may consist of the downlink data channel 1232 and the guard period 1234. The transmission resource structure 1240 may consist of the downlink control channel 1242, the downlink data channel 1244, the guard period 1246, and the uplink control channel 1248. The transmission resource structure 1250 may consist of the downlink control channel 1252, the guard period 1254, and the uplink data channel 1256. The transmission resource structure 1260 may consist of the guard period 1262 and the uplink data channel 1264. Finally, the transmission resource structure 1270 may consist of only the uplink data channel 12.

Although the proposed technology of the present invention is described with the transmission resource structures depicted in FIG. 12, the present invention is not limited to the transmission resource structures of FIG. 12, and it may be applied to various combinations of the uplink and downlink channels.

The NR system may use a combination of the transmission resource structures described with reference to FIG. 12 according to its duplex mode, e.g., FDD and TDD. In an FDD system, it may be possible to use the transmission resource structures 1210 and 1220 of FIG. 12 on the downlink frequency and the transmission resource structures 1260 and 1270 of FIG. 12 on the uplink frequency. Meanwhile, in a TDD system, it may be possible to use all of the transmission resource structures depicted in FIG. 12. In the dynamic TDD being considered in the present invention, it may be possible to determine one of all transmission resource structures by subframe according to the transmission/reception data traffic to transmit or receive data.

Figure 13:
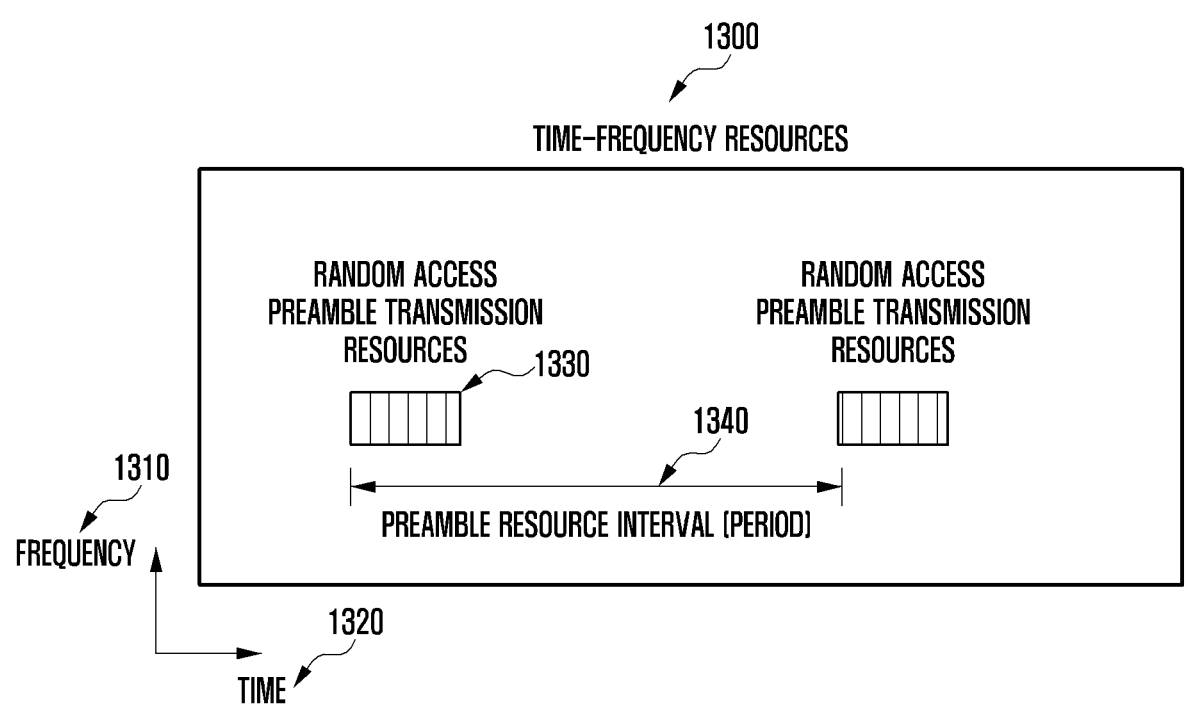
FIG. 13 is a diagram illustrating a random access preamble transmission resources configuration method of a base station for use by a terminal in an LTE system.

FIG. 13 is a diagram illustrating a random access preamble transmission resources configuration method of a base station for use by a terminal in an LTE system.

In FIG. 13, the time-frequency resources 1300 may be uplink frequency resources in an FDD system or uplink time resources in a TDD system. In the time-frequency resources, the horizontal axis 1320 denotes the time, and the vertical axis 1310 denotes the frequency. The base station may configure periodic preamble transmission resources 1330 on the time-frequency resources 1300 for use by the UE to transmit uplink signals. Thus, the preamble transmission resources 1330 may appear at a predetermined interval (period) 1340 on the uplink time-frequency resources 1300. In the case where the random access preamble transmission resources 1330 are configured at the predetermined interval (period) 1340 as shown in FIG. 13 or a predetermined subframe is always configured to include the random access preamble transmission resources, the corresponding subframe should be configured as an uplink subframe.

In the legacy LTE FDD system in which uplink and downlink resources are separated in frequency, no problem arises even though a specific subframe is configured to have the random access preamble transmission resources. Even in the LTE TDD system in which uplink and downlink subframes are predetermined, if the random access preamble transmission resources are configured in an uplink subframe, no problem arises. In the NR system operating with the dynamic TDD allowing a base station to switch between uplink and downlink subframes dynamically according to the uplink/downlink data traffic situation of UEs within a cell, it is difficult to preconfigure a specific subframe for use in random access preamble transmission as aforementioned.

Typically, it is difficult for the base station to know how many idle mode UEs exist in a cell based on the random access preamble as a signal that an idle mode UE located within the cell transmits to the base station for initial access to the system. In this respect, configuring a specific subframe as a random access preamble transmission subframe regardless of the data traffic situation may cause a problem of degrading the frequency utilization efficiency. There is therefore a need of a method for configuring the random access preamble transmission resources efficiently.

It is also necessary to consider a beam for the initial access of the UE in the NR system. As described above, employment of a method for transmitting a signal in a broad frequency band above 6 GHz is being considered to meet the improved data rate requirements in NR. Considering that the signal attenuation per distance in an above-6 GHz frequency band is greater than that in a below-6 GHz frequency band, there is a need of a signal transmission/reception method based on a beam formed with multiple antennas to maintain the coverage.

Figure 14:
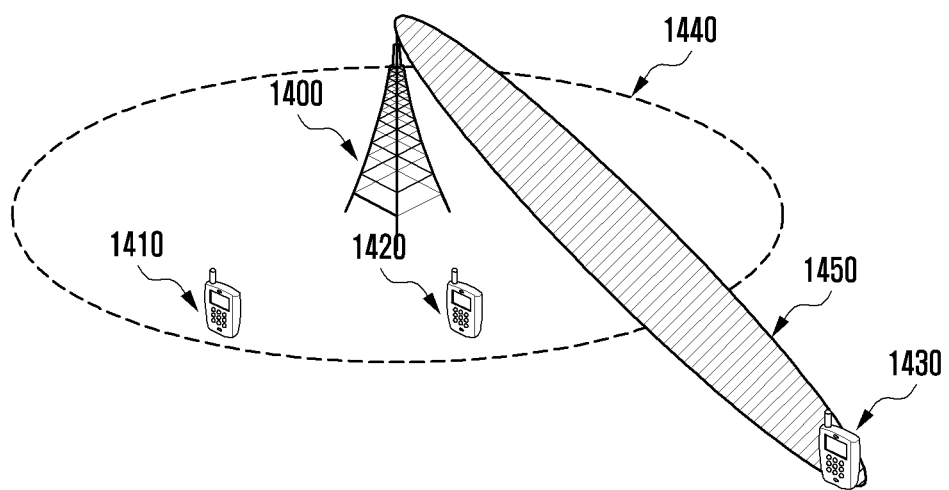
FIG. 14 is a diagram illustrating an exemplary directional beam-based transmission being considered in the NR system.

FIG. 14 is a diagram illustrating an exemplary directional beam-based transmission being considered in the NR system.

In FIG. 14, a base station 1400 hosting a cell may perform communication with UEs 1410, 1420, and 1430 located within the cell. An area 1440 covered by the base station 1400 denotes the maximum coverage in which the base station 1400 can communicate with the UEs using an omni-beam. In the case of using the omni-beam as shown in FIG. 14, the coverage may be reduced because of a propagation attenuation in comparison with the case of using a directional beam. In the example of FIG. 14, the UEs 1410 and 1420 may perform omni-beam-based communication with the base station 1400, but the UE 1430 cannot perform the omni-beam-based communication with the base station 1400 because of a relatively high propagation attenuation. In this case, the base station may use a directional beam 1450 to improve its coverage for communication with the UE 1430.

By nature of its narrow beamwidth in comparison with the omni-beam, although the use of the directional beam can increase the coverage, if the beam directions between the UE and the base station are not matched accurately, this may cause communication failure. In the example of FIG. 14, the beam formed to the UE 1430 is not directed to the UEs 1410 and 1420, and the UEs 1410 and 1420 cannot communicate with the base station 1400 using the beam 1450.

Because a UE in the connected state with the base station for beam-based signal communication is capable of transmitting channel state information measured based on a reference signal transmitted by the base station to the base station, the base station may form a proper beam to the corresponding UE for transmitting a signal. In the case of a UE in the idle state with no connection to the base station within the cell, however, it is difficult for the UE to transmit channel status information to the base station and thus the base station cannot form a beam to the idle UE. In the above exemplary case, problems may arise in that the coverage of the synchronization signal and broadcast channel for use by the idle UE to achieve synchronization and initial access to the system and the coverage of the random access preamble being transmitted by the UE for initial access are reduced.

In order to solve the above problems, in the legacy systems employment has been considered of a beam sweeping technique characterized in that the base station forms a beam, for transmitting the synchronization signal and broadcast channel, that varies in direction according to time to overcome the beam direction mismatch. Recently, employment has also been considered of a method for the base station to form a beam that varies in direction at predetermined preamble transmission time intervals for receiving preambles being transmitted by UEs.

Figure 15:
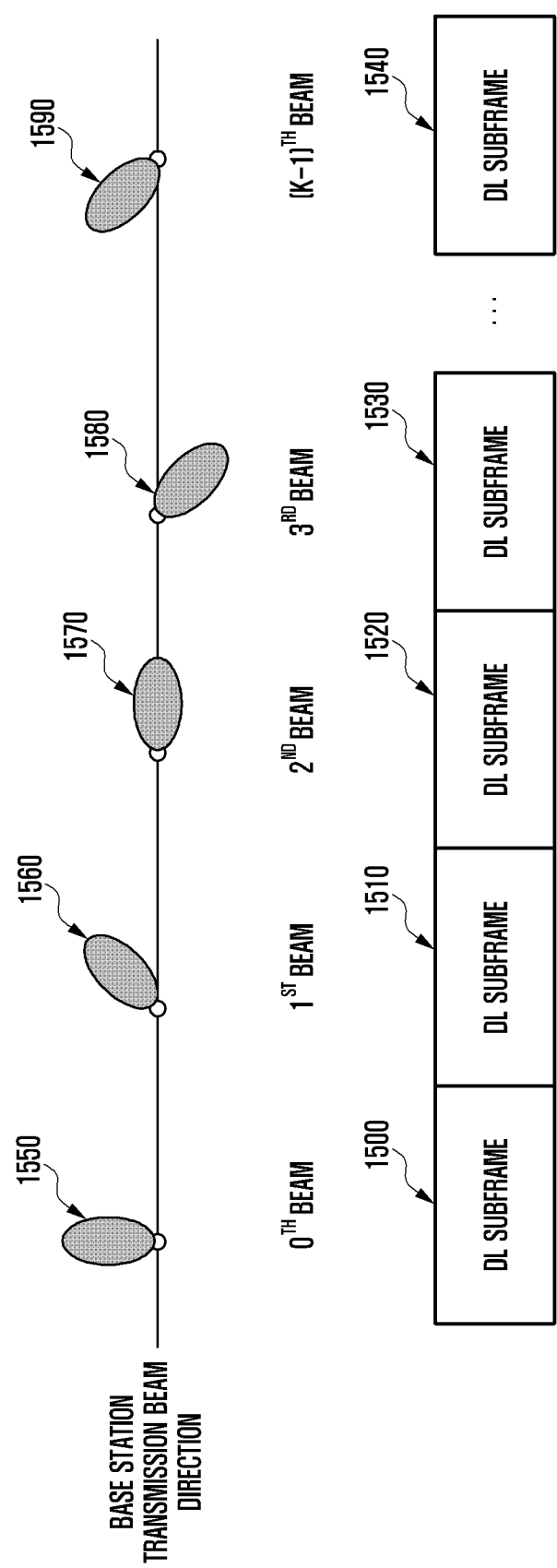
FIG. 15 is a diagram illustrating an exemplary beam sweeping scheme for a base station to sweep a transmission beam for transmitting a synchronization and a broadcast channel in downlink subframes.

FIG. 15 is a diagram illustrating an exemplary beam sweeping scheme for a base station to sweep a transmission beam for transmitting a synchronization and a broadcast channel in downlink subframes.

As shown in FIG. 15, it may be possible to transmit a signal across multiple downlink subframes 1500 to 1540 using a beam 1550 to 1590. Here, the beams 1550 to 1590 are directional beams formed in predetermined directions. In order to solve the problem in that the UE located in a direction that does not match the beam direction cannot receive a signal as described above in the case of using the direction beam, the base station may form a beam varying in direction according to the subframe to cover all directions within the cell during the multiple downlink subframes 1550 to 1590 to transmit the signal. FIG. 15 depicts an exemplary case where the base station forms a beam rotating by subframe in the clockwise direction during a plurality of consecutive downlink subframes to transmit the synchronization signal and broadcast channel in all directions.

Figure 16:
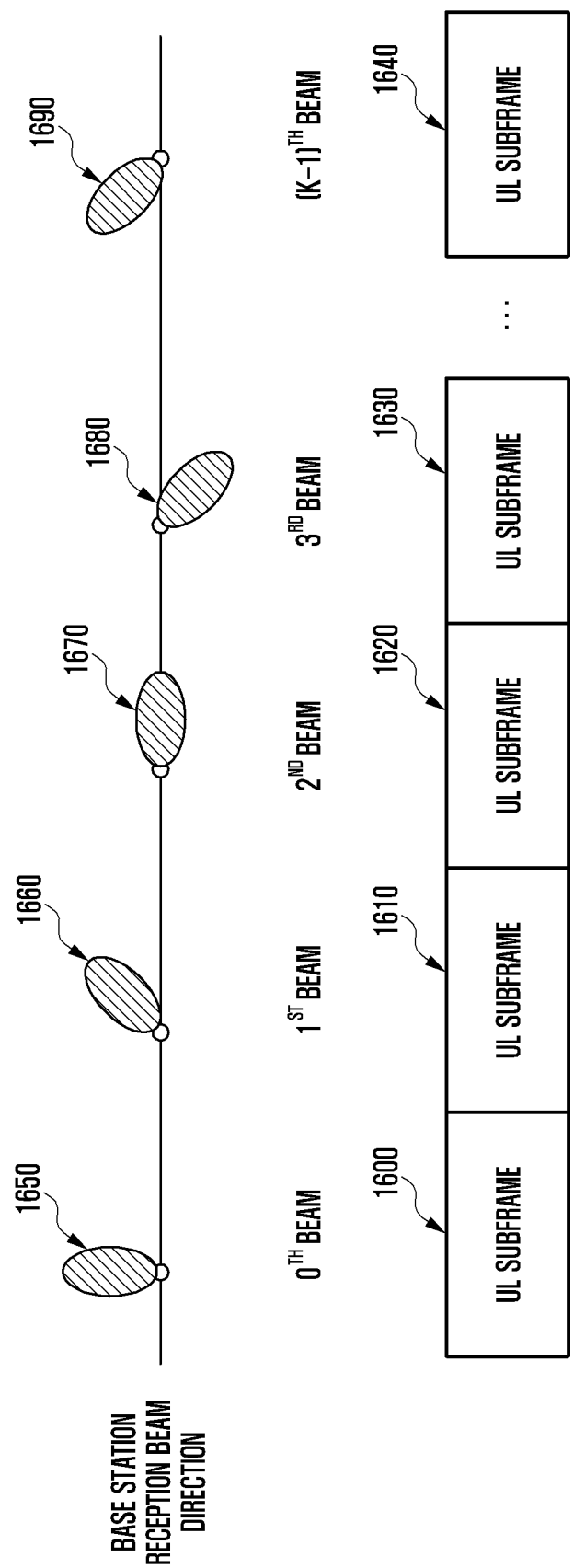
FIG. 16 is a diagram illustrating an exemplary beam sweeping scheme for a base station to sweep a reception beam for receiving a random access preamble being transmitted by a UE in uplink subframes.

FIG. 16 is a diagram illustrating an exemplary beam sweeping scheme for a base station to sweep a reception beam for receiving a random access preamble being transmitted by a UE in uplink subframes.

As shown in FIG. 16, it may be possible to receive a signal across multiple uplink subframes 1600 to 1640 using a beam 1650 to 1690. Here, the beams 1650 to 1690 are directional beams formed in predetermined directions. In order to solve the problem that the base station cannot receive a signal transmitted by a UE located in a direction that does not match the beam direction as described above in the case of using the direction beam, the base station may form a beam varying in direction according to the subframe to cover all directions within the cell during the multiple uplink subframes 1650 to 1690 to receive the signal. FIG. 16 depicts an exemplary case where the base station forms a beam rotating by subframe in the clockwise direction during a plurality of consecutive uplink subframes to receive the random access preamble in all directions.

The above description has been made of the method for a base station to transmit the synchronization signal and broadcast channel for the idle UEs and receive random access preambles in all directions. However, in the case of forming a reception beam in a specific direction for receiving a random access preamble in a specific subframe as described above, a problem may arise in that the frequency utilization is degraded. Considering complexity and implementation of the UE operating in an above-6 GHz frequency band, only one beam may be formed in a specific direction during a time period. That is, it is preferable to have a transmission beam or reception beam in one direction at a subframe because, if the base station forms two beams for transmitting to or receiving from UEs located in different directions, this may increase the implementation complexity. In the case where the base station forms a beam in a specific direction to receive a random access preamble, if there is no user present in the corresponding direction, a problem arises in that it is difficult to schedule data for another UE on resources other than those for receiving the random access preamble. This means a waste of the uplink frequency resource, resulting in degradation of frequency utilization efficiency.

Thus, the present invention proposes an efficient random access preamble transmission resources configuration method that is capable of minimizing a frequency utilization efficiency degradation caused by always fixing a specific subframe as an uplink subframe for receiving a random access preamble being transmitted by an idle state UE in the dynamic TDD mode.

The present invention also proposes an efficient random access preamble transmission resources configuration method that is capable of minimizing a frequency utilization efficiency degradation caused by always forming a specific reception beam at a specific subframe in the case where the base station performs a reception beam sweeping to receive a random access preamble being transmitted by a UE for supporting initial access of the idle state UE in a directional beam-based transmission/reception system.

An embodiment of the present invention proposes an efficient random access preamble transmission resources configuration method that is capable of minimizing a frequency utilization efficiency degradation caused by always fixing a specific subframe as an uplink subframe for receiving a random access preamble being transmitted by an idle state UE in the dynamic TDD mode.

The present invention also proposes an efficient random access preamble transmission resources configuration method that is capable of minimizing a frequency utilization efficiency degradation caused by always forming a specific reception beam at a specific subframe in the case where the base station performs a reception beam sweeping to receive a random access preamble being transmitted by a UE for supporting initial access of the idle state UE in a directional beam-based transmission/reception system.

Figure 17:
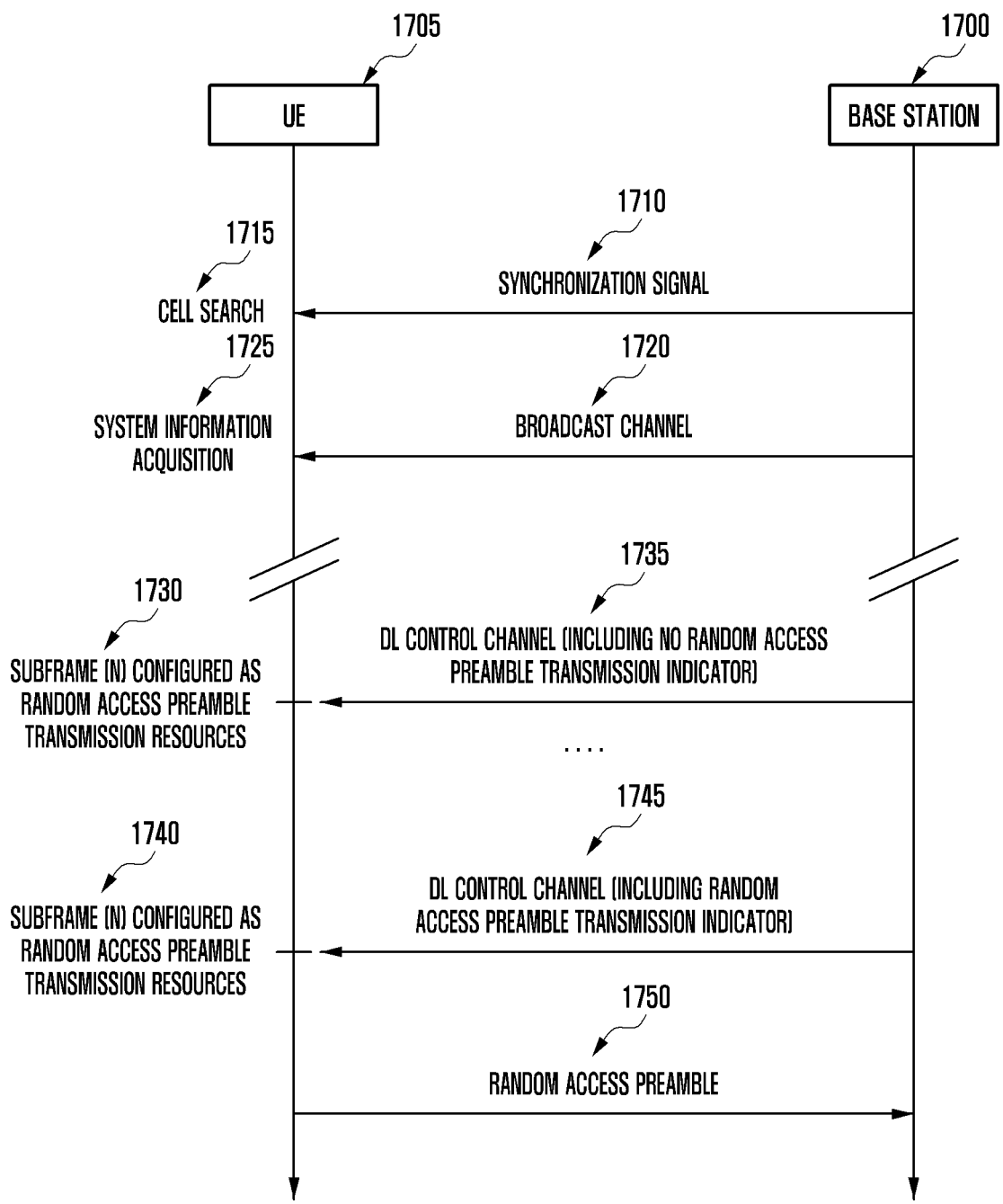
FIG. 17 is a signal flow diagram illustrating a random access preamble transmission procedure of a terminal in an NR system according to an embodiment of the present invention.

FIG. 17 is a signal flow diagram illustrating a random access preamble transmission procedure of a terminal in an NR system according to an embodiment of the present invention.

In FIG. 17, the base station 1700 may transmit a synchronization signal periodically, at step 1710, for a UE 1705 located within a cell. The base station 1700 may transmit the synchronization signal using an omni-beam or a directional beam. Although it is typically preferable for the base station to transmit the synchronization beam with the omni-beam in a below-6 GHz frequency band and the directional beam in an above-6 GHz frequency band, the present invention may be embodied regardless of the types of beams in use for a specific frequency band. Considering the synchronization signal detection complexity of the UE and base station operations, it is assumed that the base station transmits the synchronization signal in a fixed downlink subframe. In the case of transmitting the synchronization signal using a directional beam, it is assumed that the synchronization signal is transmitted using a directional beam formed in a specific direction at a specific downlink subframe. Considering that it is typical that downlink data traffic amount is greater than uplink data traffic amount, it may be assumed that frequency utilization efficiency degradation is small for the case of transmitting the downlink synchronization signal using a fixed beam in a fixed subframe. The UE 1705 achieves time and frequency synchronization based on the synchronization signal transmitted by the base station 1700 and performs cell search to acquire a cell identifier at step 1715.

The base station 1700 transmits a broadcast signal to the UE 1705 located within the cell periodically at step 1720 as the second step. The base station 1700 may transmit the broadcast channel using an omni-beam or a directional beam. Similar to the synchronization signal, it is typically preferable for the base station to transmit the broadcast signal with the omni-beam in a below-6 GHz frequency band and the directional beam in an above-6 GHz frequency band. However, the present invention may be embodied regardless of the types of beams in use for a specific frequency band. Because it is preferable to transmit the broadcast channel in the same way as the synchronization signal, it is assumed that the base station transmits the broadcast channel in a fixed downlink subframe. In the case of transmitting the broadcast channel using a directional beam, it is also assumed that the broadcast channel is transmitted using a directional beam formed in a specific direction at a specific downlink subframe. The UE 1705 may receive the broadcast channel transmitted by the base station 1700 to acquire system information related to the NR system at step 1725.

The system information acquired by the UE 1705 may include information related to the random access operation of the UE. The random access-related system information may include information as follows.
  Random access preamble sequence information
  Random access preamble format
  Random access power control information
  Random access preamble transmission time and frequency resources information Afterward, the UE 1705 that wants to perform an initial access determines a subframe and a random access preamble to be transmitted in the subframe based on the time and frequency resources information for random access preamble transmission in the random access-related information acquired from the broadcast information. At step 1735, the UE 1705 receives control information on the downlink control channel in the subframe 1730 configured to indicate the random access preamble transmission resources.

If the control information received on the downlink control channel includes no random access preamble transmission indicator (or no instruction for transmission), the UE 1705 may transmit no random access preamble, even though the corresponding subframe is configured as a subframe for a predetermined random access preamble transmission, in the corresponding subframe. Afterward, the UE 1705 receives the control information, at step 1745, on the downlink control channel in the next subframe 1740 configured for the random access preamble transmission. If the control information received on the downlink control channel includes the random access preamble transmission indicator or the corresponding indicator instructs to transmit a preamble, the UE 1705 may transmit the random access preamble in the corresponding subframe at step 1750. Here, the frequency resources for use by the UE to transmit the random access preamble may be the frequency resource preconfigured via the system information.

The embodiment of FIG. 17 can be elaborated in more detailed methods as follows.

A description is made hereinafter of method 1 according to FIG. 17. In the case where a subframe preconfigured for a random access preamble transmission has the transmission resource structure capable of transmitting a downlink control channel (transmission resource structures 1240 and 1250 of FIG. 12), the base station may transmit an indicator, which instructs the UE to transmit a random access preamble, on the downlink control channel for random access preamble transmission operation. The UE attempts to detect the indicator instructing to transmit a random access preamble in the subframe preconfigured for random access preamble transmission. If the UE detects the corresponding indicator, which instructs to transmit a preamble, on the downlink control channel, it may transmit the random access preamble according to a format configured on the resources 1248 for the uplink control channel or the resources 1256 for the uplink data channel that are included in the corresponding subframe.

In the case where the time period of the uplink control channel resources 1248 or the uplink data channel resources 1256 is too short to transmit the random access preamble in a predetermined format, the UE may not transmit the random access preamble. In the case where the uplink period is longer than one TTI 1200 according a combination of the transmission resource structures of FIG. 12, it may be possible to transmit the random access preamble in a much longer format.

If the corresponding indicator is not detected on the downlink control channel or if the detected indicator instructs not to transmit a preamble, the UE may transmit no preamble in the corresponding subframe.

For method 1, the downlink control channel may include a random access preamble transmission indicator and, in this case, the indicator may be transmitted using a downlink control channel with a separate structure or a downlink control information transmission format in a common search space of the current LTE system.

A description is made hereinafter of method 2 according to FIG. 17. In the case where a subframe preconfigured for a random access preamble transmission has the transmission resource structure capable of transmitting a downlink control channel (transmission resource structures 1240 and 1250 of FIG. 12), the base station may transmit an indicator, which instructs the UE to transmit a random access preamble, on the downlink control channel for random access preamble transmission operation. Here, the base station may additionally transmit a transmission timing field instructing the UE to transmit a random access preamble after a predetermined number of subframes after the current subframe. The UE attempts to detect the indicator instructing the UE to transmit a random access preamble in the subframe preconfigured for random access preamble transmission and the transmission timing field. If the random access preamble transmission indicator instructs to transmit a preamble, the UE waits until the number of subframes counted from the ending point of the corresponding subframe, which is indicated by the transmission timing field, expires to transmit the random access preamble. For example, if the transmission timing field is set to a value indicating two subframes, the UE may transmit the random access preamble after two subframes after the ending point of the subframe in which the corresponding downlink control channel has been received.

If the time period of the uplink control channel resources 1248 or the uplink data channel resources 1256 is too short to transmit the random access preamble in a predetermined format, the UE may not transmit the random access preamble. In the case where the uplink period is longer than one TTI 1200 according to a combination of the transmission resource structures of FIG. 12, it may be possible to transmit the random access preamble in a much longer format.

If the corresponding indicator is not detected on the downlink control channel or if the detected indicator instructs not to transmit a preamble, the UE may transmit no preamble in the corresponding subframe.

For method 2, the downlink control channel may include an indicator instructing to transmit a random access preamble and a transmission timing field indicating a subframe available for transmitting the random access preamble and, in this case, the indicator and transmission timing field may be transmitted using a downlink control channel with a separate structure or a downlink control information transmission format in a common search space of the current LTE system.

A description is made hereinafter of method 3 according to FIG. 17. In the case where a subframe preconfigured for a random access preamble transmission has the transmission resource structure capable of transmitting a downlink control channel (transmission resource structures 1240 and 1250 of FIG. 12), the base station may transmit a transmission resource structure indicator for notifying the UE of the transmission resource structure of the current subframe on the corresponding downlink control channel. The UE attempts to detect the transmission resource structure indicator indicating the transmission resource structure of the current subframe in a subframe preconfigured for random access preamble transmission. The transmission resource structure indicator may be an indicator indicating one of the transmission resource structures depicted in FIG. 12, which is in use for the current subframe. In the case where the UE detects the corresponding indicator on the downlink control channel, if it is determined that the corresponding subframe includes the uplink control channel resources 1248 or the uplink data channel resources 1256 based on the corresponding indicator, the UE may transmit a random access preamble in a format configured on the corresponding resources. In the case where the time period of the uplink control channel resources 1248 or the uplink data channel resources 1256 is too short to transmit the random access preamble in a predetermined format, the UE may not transmit the random access preamble.

If the corresponding indicator is not detected on the downlink control channel or if the detected indicator indicating that neither the uplink control channel resources 1248 nor the uplink data channel 1256 is included in the corresponding subframe, the UE may transmit no preamble in the corresponding subframe.

For method 3, the downlink control channel may include a transmission resource structure indicator for the corresponding subframe and, in this case, the indicator may be transmitted using a downlink control channel with a separate structure or a downlink control information transmission format in the common search of the current LTE system.

A description is made hereinafter of method 4 according to FIG. 17. In the case where a subframe preconfigured for a random access preamble transmission has the transmission resource structure capable of transmitting only an uplink channel (transmission resource structures 1260 and 1270 of FIG. 12), the UE may transmit a random access preamble in the corresponding subframe regardless of the receipt of a downlink control channel. In the case where the uplink period is longer than one TTI 1200 according a combination of the transmission resource structures of FIG. 12, it may be possible to transmit the random access preamble in a much longer format.

Methods 1, 2, 3, and 4 of the present embodiment operate based on the fact that the system information for use in a random access is transmitted in advance through a broadcast channel. That is, the present invention proposes a method for a UE to transmit a random access preamble based on the indicator received on the downlink control channel in a subframe or the transmission resource structure of the corresponding subframe under the assumption that time and frequency resources for transmitting a random access preamble are preconfigured in the system information for use in a random access.

In the following embodiment, a description is made of the UE operation method without the random access preamble transmission time and frequency resources configuration included in the system information for use in a random access.

Figure 18:
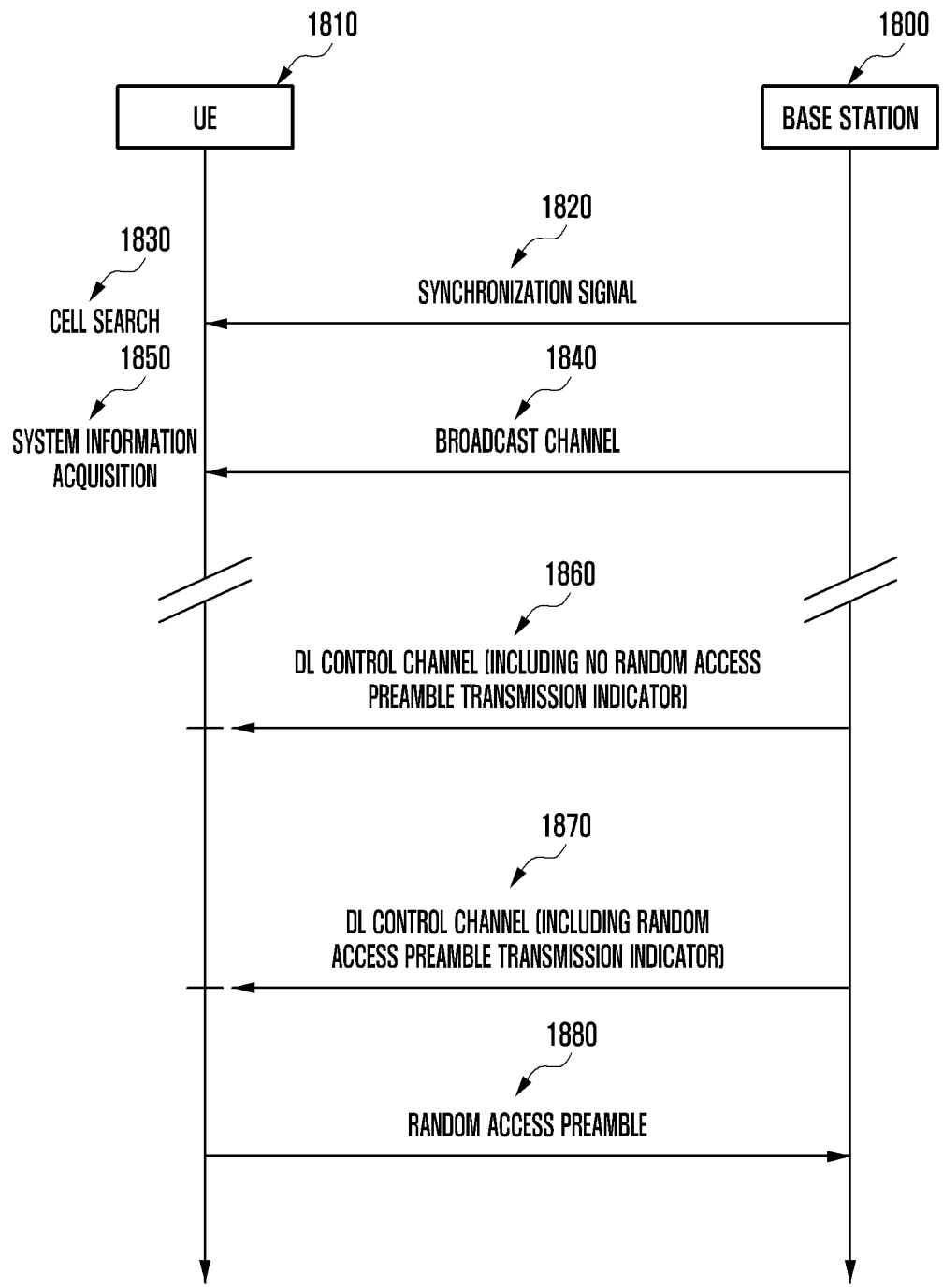
FIG. 18 is a signal flow diagram illustrating a random access preamble transmission procedure of a terminal in an NR system according to another embodiment of the present invention.

FIG. 18 is a signal flow diagram illustrating a random access preamble transmission procedure of a terminal in an NR system according to another embodiment of the present invention.

In FIG. 18, the base station 1800 may transmit a synchronization signal periodically, at step 1820, for a UE 1810 located within a cell. The base station 1800 may transmit the synchronization signal using an omni-beam or a directional beam. Although it is typically preferable for the base station to transmit the synchronization beam with the omni-beam in a below-6 GHz frequency band and the directional beam in an above-6 GHz frequency band, the present invention may be embodied regardless of the types of beams in use for a specific frequency band. Considering the synchronization signal detection complexity of the UE and base station operations, it is assumed that the base station transmits the synchronization signal in a fixed downlink subframe. In the case of transmitting the synchronization signal using a directional beam, it is assumed that the synchronization signal is transmitted using a directional beam formed in a specific direction at a specific downlink subframe. Considering that it is typical that the downlink data traffic amount is greater than the uplink data traffic amount, it may be assumed that frequency utilization efficiency degradation is small for the case of transmitting the downlink synchronization signal using a fixed beam in a fixed subframe. The UE 1810 achieves time and frequency synchronization based on the synchronization signal transmitted by the base station 1800 and performs cell search to acquire a cell identifier at step 1830.

The base station 1800 transmits a broadcast signal to the UE 1810 located within the cell periodically at step 1840 as the second step. The base station 1800 may transmit the broadcast channel using an omni-beam or a directional beam. Similar to the synchronization signal, it is typically preferable for the base station to transmit the broadcast signal with the omni-beam in a below-6 GHz frequency band and the directional beam in an above-6 GHz frequency band. However, the present invention may be embodied regardless of the types of beams in use for a specific frequency band. Because it is preferable to transmit the broadcast channel in the same way as the synchronization signal, it is assumed that the base station transmits the broadcast channel in a fixed downlink subframe. In the case of transmitting the broadcast channel using a directional beam, it is also assumed that the broadcast channel is transmitted using a directional beam formed in a specific direction at a specific downlink subframe. The UE 1810 may receive the broadcast channel transmitted by the base station 1800 to acquire system information related to the NR system at step 1850. The system information acquired by the UE 1810 may include information related to the random access operation of the UE. The random access-related system information may include information as follows.

Random access preamble sequence information
Random access preamble format
Random access power control information Unlike the embodiment of FIG. 17, no time and frequency resources information for random access preamble transmission is included in the random access-related system information. That is, no configuration of a subframe for transmitting a random access preamble is made. Afterward, the UE 1810 that wants to perform an initial access receives control information on the downlink control channel at step 1860.

If the control information received on the downlink control channel includes no random access preamble transmission indicator or if the received indicator instructs not to transmit a preamble, the UE 1810 transmits no random access preamble. Afterward, the UE 1810 receives the control information on the downlink control channel in another subframe 1870. If the control information received on the downlink control channel includes the random access preamble transmission indicator or the corresponding indicator instructs to transmit a preamble, the UE 1810 may transmit the random access preamble in the corresponding subframe at step 1880.

Here, the frequency resources for use by the UE to transmit the random access preamble may be the frequency resources preconfigured via the system information. In the case where the frequency resources for use in transmitting a random access preamble are not configured in the system information, the base station may transmit the random access preamble transmission frequency resource region information along with the random access preamble transmission indicator on the downlink control channel. If the received downlink control channel includes the random access preamble transmission indicator or the corresponding indicator instructs to transmit a preamble, the UE receives the corresponding frequency resource information to transmit the random access preamble on the corresponding frequency resources.

The embodiment of FIG. 18 may be elaborated in more detailed methods as follows.

A description is made hereinafter of method 5 according to FIG. 18. The base station may transmit an indicator instructing the UE to transmit a random access preamble on all downlink control channels for a random access preamble transmission operation. The UE may detect the corresponding indicator on the downlink control channel and, if the corresponding indicator instructs to transmit a random access preamble, transmit the random access preamble according to a format configured on the uplink control channel resources 1248 or the uplink data channel resources 1256 included in the corresponding subframe. In this case, if the random access preamble transmission frequency resources are configured via the downlink control channel, the UE may transmit a random access preamble according to the configuration.

In the case where the time period of the uplink control channel resources 1248 or the uplink data channel resources 1256 is too short to transmit the random access preamble in a predetermined format, the UE may not transmit the random access preamble. In the case where the uplink period is longer than one TTI 1200 according a combination of the transmission resource structures of FIG. 12, it may be possible to transmit the random access preamble in a much longer format.

If the corresponding indicator is not detected on the downlink control channel or if the detected indicator instructs not to transmit a preamble, the UE may transmit no preamble in the corresponding subframe.

For method 5, the downlink control channel may include a random access preamble transmission indicator and, in this case, the indicator may be transmitted using a downlink control channel with a separate structure or a downlink control information transmission format in a common search space of the current LTE system.

A description is made hereinafter of method 6 according to FIG. 18. The base station may transmit an indicator instructing the UE to transmit a random access preamble on all downlink control channels for a random access preamble transmission operation. Here, the base station may additionally transmit a transmission timing field instructing the UE to transmit a random access preamble after a predetermined number of subframes after the current subframe. If the random access preamble transmission indicator instructs to transmit a preamble, the UE waits until the number of subframes counted from the ending point of the corresponding subframe, which is indicated by the transmission timing field, expires to transmit the random access preamble. For example, if the transmission timing field is set to a value indicating two subframes, the UE may transmit the random access preamble after two subframes after the ending point of the subframe in which the corresponding downlink control channel has been received. If the frequency resources for transmitting a random access preamble are configured via the downlink control channel, the UE transmits the random access preamble according to the configuration.

If the time period of the uplink control channel resources 1248 or the uplink data channel resources 1256 is too short to transmit the random access preamble in a predetermined format, the UE may not transmit the random access preamble. In the case where the uplink period is longer than one TTI 1200 according to a combination of the transmission resource structures of FIG. 12, it may be possible to transmit the random access preamble in a much longer format.

If the corresponding indicator is not detected on the downlink control channel or if the detected indicator instructs not to transmit a preamble, the UE may transmit no preamble in the corresponding subframe.

For method 6, the downlink control channel may include an indicator instructing to transmit a random access preamble and a transmission timing field indicating a subframe available for transmitting the random access preamble and, in this case, the indicator and transmission timing field may be transmitted using a downlink control channel with a separate structure or a downlink control information transmission format in a common search space of the current LTE system.

A description is made hereinafter of method 7 according to FIG. 18. The base station may transmit a transmission resource structure indicator notifying an idle UE of the transmission resource structure of the current subframe on all downlink control channels for a random access preamble operation. The transmission resource structure indicator may be an indicator indicating one of the transmission resource structures depicted in FIG. 12, which is in use for the current subframe. In the case where the UE detects the corresponding indicator on the downlink control channel, if it is determined that the corresponding subframe includes the uplink control channel resources 1248 or the uplink data channel resources 1256 based on the corresponding indicator, the UE may transmit a random access preamble in a format configured on the uplink control channel resources 1248 or the uplink data channel resources 1256. In this case, if the random access preamble transmission frequency resources are configured via the downlink control channel, the UE transmits the random access preamble according to the corresponding configuration.

In the case where the time period of the uplink control channel resources 1248 or the uplink data channel resources 1256 is too short to transmit the random access preamble in a predetermined format, the UE may not transmit the random access preamble. If the corresponding indicator is not detected on the downlink control channel or if the detected indicator indicating that neither the uplink control channel resources 1248 nor the uplink data channel 1256 is included in the corresponding subframe, the UE may transmit no preamble in the corresponding subframe.

For method 7, the downlink control channel may include a transmission resource structure indicator for the corresponding subframe and, in this case, the indicator may be transmitted using a downlink control channel with a separate structure or a downlink control information transmission format in the common search of the current LTE system.

According to an embodiment of the present invention, it may be considered for the base station to communicate signals with the terminal using a directional beam for the above described methods 1 to 7. In this embodiment of the present invention, it may be possible for the base station to further transmit, on the downlink channel, directional beam information for use in receiving an uplink signal in the corresponding subframe. In the present invention, this information is referred to as uplink reception beam information, and the corresponding beam information may be indicated in the form of a specific number matching a beam direction. The uplink reception beam information indicates a direction of a beam for use by the base station in receiving a signal in an arbitrary subframe. The beams formed in the respective directions have unique indices, and the uplink reception beam information may indicate one of the indices.

The UE may ascertain a beam suitable for communication with the base station in the cell search procedure based on the downlink synchronization signal. That is, the UE already has the information on the uplink reception beam suitable for use by the base station in receiving a signal transmitted by the UE. Thus, the UE may determine that the corresponding subframe is a subframe available for transmitting a random access preamble according to one of methods 1 to 7 and, if the base station's uplink reception beam being formed at the corresponding subframe matches the uplink reception beam predicted by the UE, transmit the random access preamble in the corresponding preamble.

Figure 19:
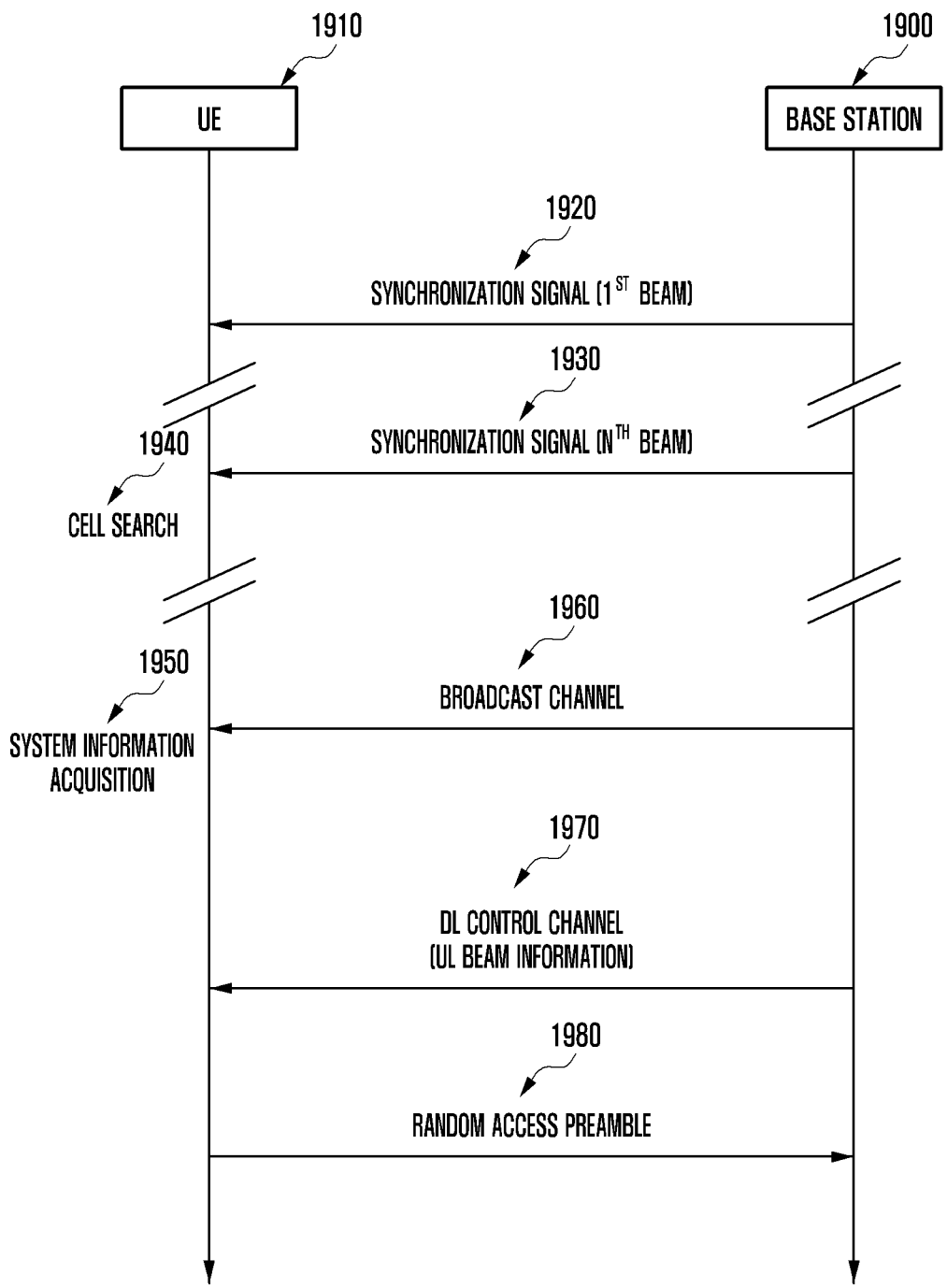
FIG. 19 is signal flow diagram illustrating a random access preamble transmission procedure between a base station and a UE that communicate with each other using a directional beam in a NR system according to an embodiment of the present invention.

FIG. 19 is signal flow diagram illustrating a random access preamble transmission procedure between a base station and a UE that communicate with each other using a directional beam in an NR system according to an embodiment of the present invention.

In FIG. 19, the base station 1900 may transmit multiple synchronization signals, at steps 1920 and 1930, for a UE 1910 located within a cell. The multiple synchronization signals may be transmitted using different directional beams. For example, the synchronization signal 1920 is transmitted with a directional beam designated as a first beam while the synchronization signal 1930 is transmitted using a directional beam designated as an $n^{th}$ beam. The UE may complete cell search, at step 1940, with a desired synchronization signal transmitted among the multiple synchronization signals. After completing the cell search, the UE 1910 may extract information on the transmission beam and information on the reception beam of the base station that are suitable for communication with the base station. That is, the UE may estimate the downlink transmission beam information and uplink reception beam information that are suitable for communication with the base station.

The UE receives a broadcast channel transmitted by the base station at step 1960 and acquires system information from the broadcast channel at step 1950. As described above, the system information may include random access-related information as follows.

Random access preamble sequence information
Random access preamble format
Random access power control information
Random access preamble transmission time and frequency resources information Afterward, the UE 1910 may receive the uplink reception beam information of the base station in addition to the random access preamble transmission indicator, transmission resource structure of the corresponding subframe, or transmission timing field according to one of the above described methods 1 to 7 via the downlink control channels transmitted by the base station at steps 1970 and 1980. The uplink reception beam information of the base station means the information on the directional beam configured for use by the base station in receiving an uplink signal in the corresponding subframe.

If the information on the uplink reception beam of the base station that is configured via the downlink control channel matches the information on the reception beam of the base station that is estimated by the UE based on the synchronization signal, the UE may transmit the random access preamble in the corresponding subframe. If the uplink beam information received on the downlink control channel in the corresponding subframe does not match the estimated reception beam information of the base station, the UE may transmit no random access preamble in the corresponding subframe.

The operations in which the NR system being considered in the present invention configures random access resources for a UE and the UE transmits a random access preamble according to the configuration may be performed according to one of the above described methods 1 to 7. Although not described in detail, the above operations may be performed according to any combination of the methods 1 to 7 without departing from the scope of the preset invention.

Although the embodiments and methods of the present inventions are described mainly in association with the dynamic TDD, the detailed description of the present invention can be applied identically to other TDD and FDD systems.

Figure 20:
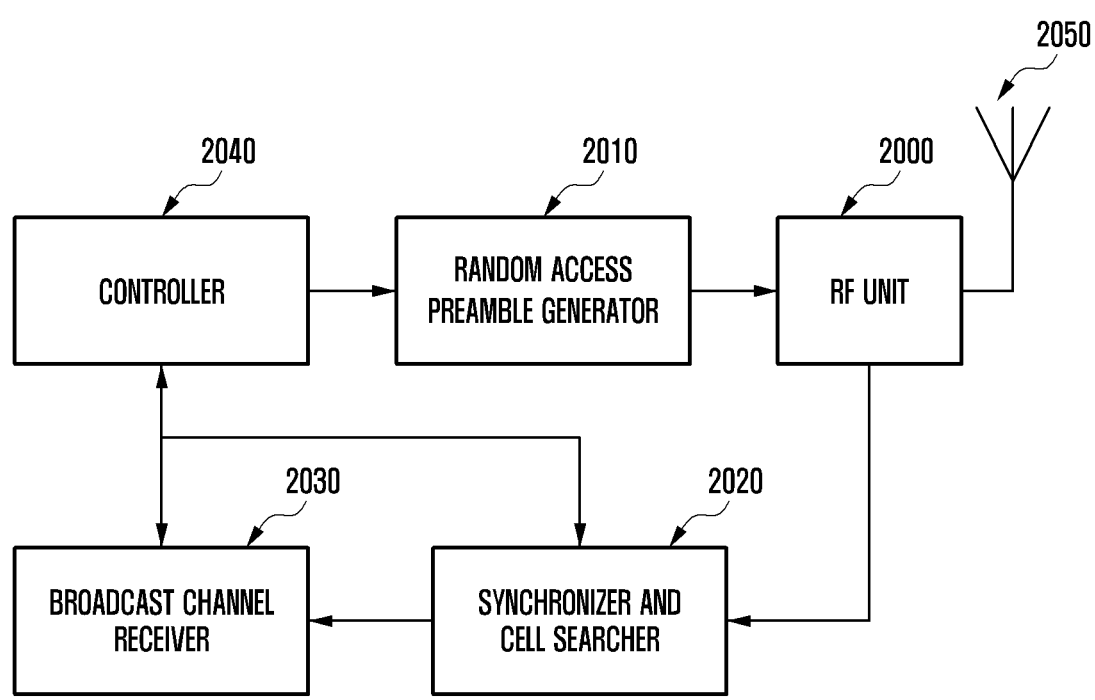
FIGS. 20 and 21 are diagrams illustrating a UE and a base station configured for accomplishing the embodiments of the present invention.
Figure 21:
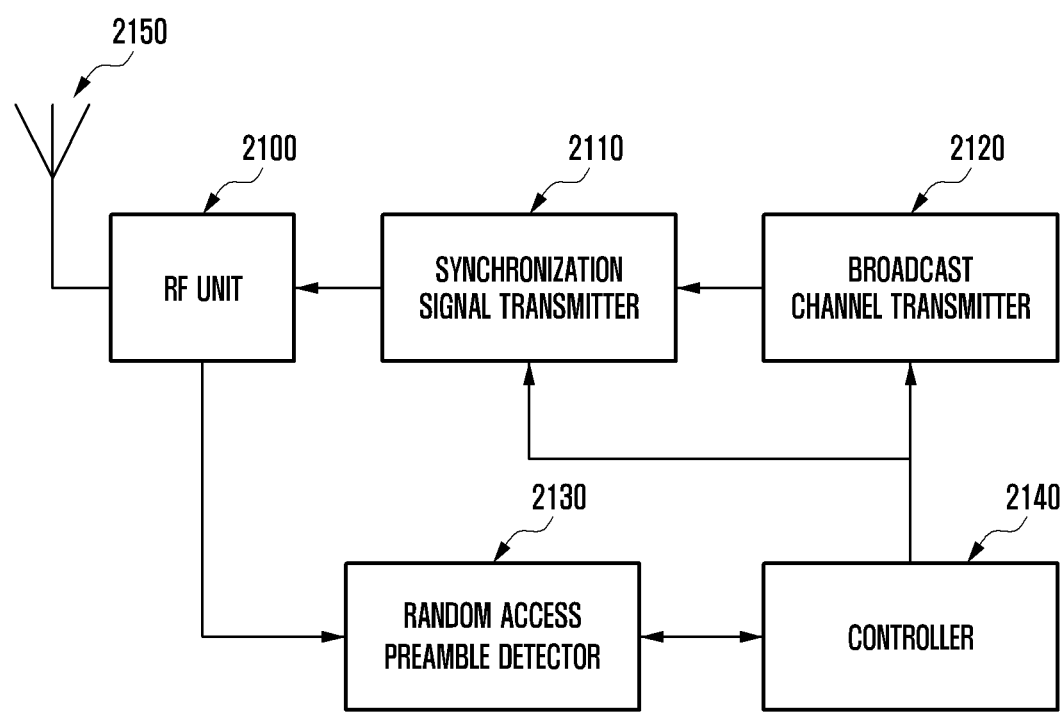

FIGS. 20 and 21 are diagrams illustrating a UE and a base station configured for accomplishing the embodiments of the present invention. The UE and the base station may operate according to the random access preamble transmission/reception methods of the NR system that have been proposed in the above embodiments.

FIG. 20 is a block diagram illustrating a configuration of a UE according to an embodiment of the present invention. As shown in FIG. 20, the UE of the present invention may include an RF unit 2000, a random access preamble generator 2010, a synchronizer and cell searcher 2020, a broadcast channel receiver 2030, a controller 2040, and an antenna 2050.

The RF unit 2000 converts a baseband signal to a transition band signal and sends the transition band signal to an antenna for transmitting the corresponding signal via the antenna or converts a received signal received by the antenna to a baseband signal and sends the base station signal to the synchronizer and cell searcher 2020. The synchronizer and cell searcher 2020 achieves frequency and time synchronizations based on the synchronization signal transmitted by the base station and performs a cell search. The broadcast channel receiver 2030 receives a broadcast channel transmitted by the base station to acquire system information necessary for performing random access. If it becomes necessary for the UE to access a cell, the random access preamble generator 2010 generates and transmits a random access preamble. The controller 2040 may control the RF unit 2000, the random access preamble generator 2010, the synchronizer and cell searcher 2020, the broadcast channel receiver 2030, the controller 2040, and the antenna 2050 such that the UE performs synchronization and cell search, system information acquisition, and random access preamble transmission.

FIG. 21 is a block diagram illustrating a configuration of a base station according to an embodiment of the present invention. As show in FIG. 21, the base station may include an RF unit 2100, a synchronization signal transmitter 2110, a broadcast channel transmitter 2120, a random access preamble detector 2130, a controller 2140, and an antenna 2150. The RF unit 2100 converts a baseband signal to a transition band signal and sends the transition band signal to an antenna for transmitting the corresponding signal via the antenna or converts a received signal received by the antenna to a baseband signal and sends the baseband signal to the random access preamble detector 2130. The synchronization signal transmitter 2100 transmits a synchronization signal for use by a UE to achieve frequency and time synchronizations based on the synchronization signal. The broadcast channel transmitter 2130 transmits a broadcast channel for use by a UE to acquire system information. The random access preamble detector 2130 performs an operation for detecting a random access preamble transmitted by a UE. The controller 2140 may control the RF unit 2100, the synchronization signal transmitter 2110, the broadcast channel transmitter 2120, the random access preamble detector 2130, and the antenna 2150 such that the UE performs synchronization and cell search, system information acquisition, and random access preamble transmission.

The embodiments disclosed in the specification and drawings are proposed to help explain and understand the present invention rather than limit the scope of the present invention. It is obvious to those skilled in the art that changes can be made thereto without departing from the spirit and scope of the present invention. If necessary, the embodiments may be combined in whole or in part.

Embodiment 3

The present invention relates to a wireless communication system and, in particular, to a data transmission/reception method and apparatus of a terminal supporting communication with at least one of different communication systems operating coincidentally on one or more carrier frequencies that is capable communicating data with respective communication systems.

Mobile communication systems were developed to provide subscribers with voice communication services on the move. Recently, mobile communication systems have evolved to the level of supporting high speed data communication services beyond the early voice-oriented services. However, the resource shortage and growing user demand for higher speed services are spurring evolution towards more advanced mobile communication systems.

As one of the next-generation mobile communication standards to meet such requirements, long term evolution (LTE) is underway in the $3^{rd}$ generation partnership project (3GPP). The LTE is a technology designed to provide high-speed packet-based communication of up to 100 Mbps. In order to accomplish this aim, a discussion is being held on various schemes: one scheme for reducing the number of nodes located in a communication path by simplifying a configuration of the network, and another scheme for maximally approximating wireless protocols to wireless channels.

The LTE system adopts a Hybrid Automatic Repeat Request (HARQ) scheme for physical layer retransmission when decoding failure occurs in initial data transmission. An HARQ scheme is designed to operate in such a way that a receiver, when it fails in decoding data, sends a transmitter a negative acknowledgement (NACK) indicative of the decoding failure in order for the transmitter to retransmit the corresponding data on the physical layer. The receiver combines the retransmitted data with the decoding-failed data to improve data reception performance. The HARQ scheme may also be designed to operate in such a way that the receiver, when it succeeds in decoding data, sends the transmitter an Acknowledgement (ACK) indicative of successful decoding in order for the transmitter to transmit new data.

Figure 22:
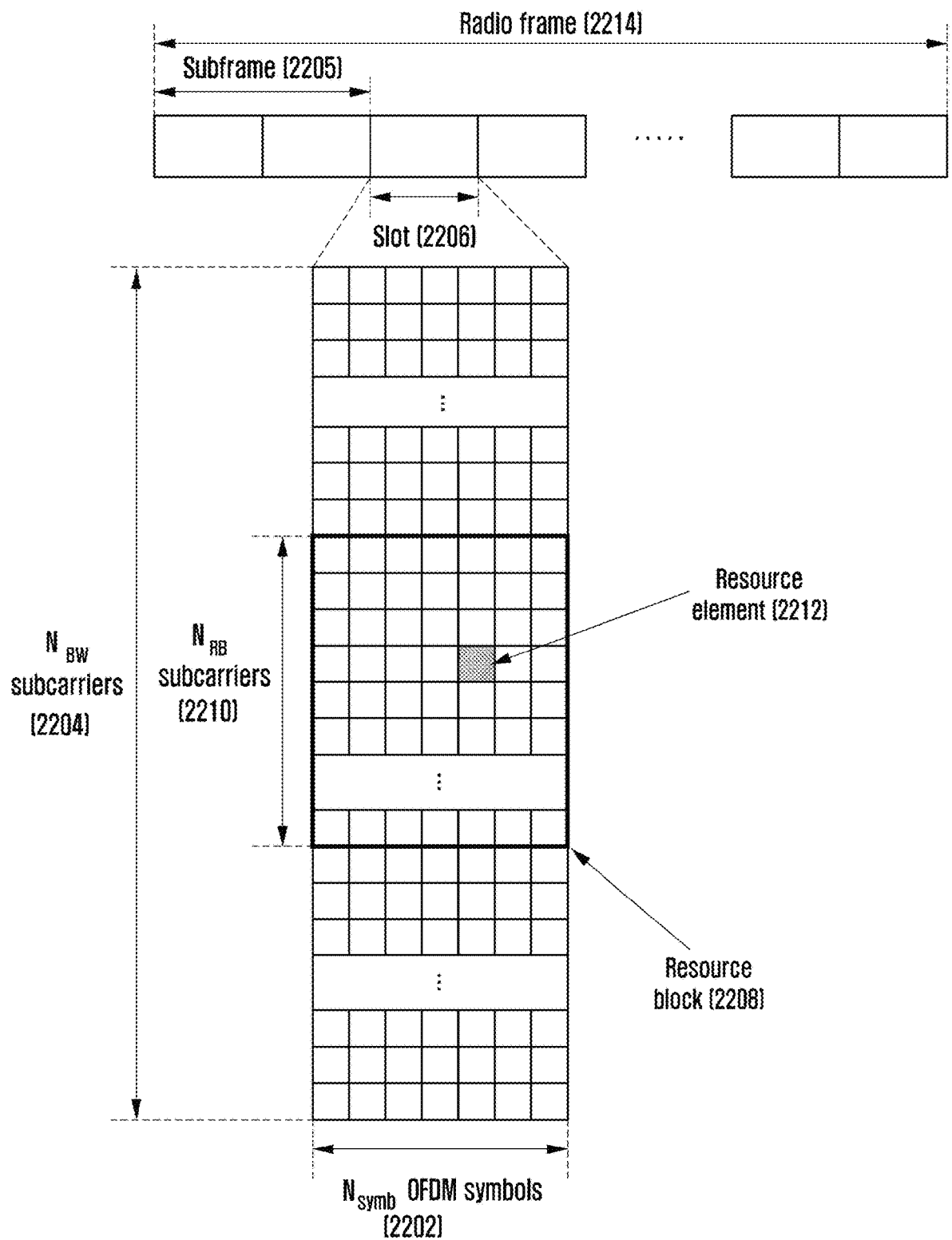
FIG. 22 is a basic time-frequency resource structure for transmitting downlink data or control channels in an LTE system.

FIG. 22 is a basic time-frequency resource structure for transmitting downlink data or control channels in an LTE system.

In FIG. 22, the horizontal axis denotes the time, and the vertical axis denotes the frequency. The smallest transmission unit in the time domain is an OFDM symbol, and $N_{symb}$ OFDM symbols 2202 form a slot 2206, and 2 slots form a subframe 2205. Each slot spans 0.5 ms, and each subframe spans 1.0 ms. A radio frame 2214 is a time unit consisted of 10 subframes. In the frequency domain, the smallest transmission unit is a subcarrier, and the total system transmission bandwidth consists of $N_{BW}$ subcarriers 2204.

In the time-frequency resource structure, the basic resource unit is a Resource Element (RE) 2212 indicated by an OFDM symbol index and a subcarrier index. A Resource Block (RB) (or Physical Resource Block (PRB)) 2208 is defined by $N_{symb}$ consecutive OFDM symbols 2202 in the time domain and $N_{RB}$ consecutive subcarriers 2210 in the frequency domain. That is, one RB 2208 consists of $N_{symb} \times N_{RB}$ REs 2212. Typically, the RB is the smallest data transmission unit. Typically, in the LTE system, $N_{symb}=7$, $N_{RB}=12$, and $N_{BW}$ and $N_{RB}$ are proportional to the system transmission bandwidth. The data rate increases in proportion to the number of RBs scheduled for the terminal.

For the LTE system, 6 transmission bandwidths are defined. In the case of an FDD system in which downlink and uplink are separated in frequency, the downlink transmission bandwidth and uplink transmission bandwidth may differ from each other. The channel bandwidth denotes an RF bandwidth in comparison with the system transmission bandwidth. Table 3 shows the relationship between the system transmission bandwidth and channel bandwidth defined in the LTE standard. For example, an LTE system having 10 MHz channel bandwidth uses the transmission bandwidth of 50 RBs.

TABLE 3

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The downlink control information is transmitted in N OFDM symbols at the beginning of the subframe. Typically, N={1, 2, 3}. Accordingly, N value varies, at every subframe, with the control information amount to be transmitted. The control information includes a control channel transmission period indicator for indicating a number of OFDM symbols for conveying the control information, scheduling information for downlink or uplink data transmission, and an HARQ ACK/NACK signal.

In the LTE system, the downlink or uplink data scheduling information is transmitted from the base station to the terminal using Downlink Control Information (DCI). The uplink (UL) denotes a radio link for transmitting data or control signals from the terminal to the base station, and the downlink (DL) denotes a radio link for transmitting data or control signals from the base station to the terminal. The DCI is categorized into different DCI formats depending on the purpose, e.g., indicating UL grant for UL data scheduling or DL grant for DL data scheduling, indicating usage for control information that is small in size, indicating whether multiple antenna-based spatial multiplexing is applied, and indicating usage for power control. For example, the DCI format 1 for DL grant is configured to include at least one of the informations as follows.

Resource allocation type 0/1 flag: Resource allocation type 0/1 flag indicates whether the resource allocation scheme is Type 0 or Type 1. A Type-0 is to allocate resources in units of Resource Block Group (RBG) by applying a bitmap scheme. In the LTE system, the basic unit of scheduling may be a Resource Block (RB) that is expressed by time-frequency domain resources, and the RBG may include multiple RBs and may be the basic unit of scheduling in the Type-0 scheme. A Type-1 is to allocate a particular RB in an RBG.

Resource block assignment: Resource block assignment indicates an RB allocated for data transmission. The resources may be determined depending on the system bandwidth and the resource allocation scheme.

Modulation and coding scheme (MCS): MCS indicates a modulation scheme used for data transmission and a size of a transport block to be transmitted.

HARQ process number: HARQ process number indicates a process number of HARQ.

New data indicator: New data indicator indicates whether the HARQ transmission is an initial transmission or a retransmission.

Redundancy version: Redundancy version indicates a redundancy version of HARQ.

TPC command for PUCCH: Transmit Power Control (TPC) command for Physical Uplink Control Channel (PUCCH) indicates a power control command for a PUCCH that is an uplink control channel.

The DCI may be transmitted over a Physical Downlink Control Channel (PDCCH) or Enhanced PDCCH (EPDCCH) after undergoing a channel coding and modulation process.

Typically, the DCI may undergo channel coding for each terminal independently, and then the channel-coded DCI may be configured with its dependent PDCCH and transmitted. In the time domain, a PDCCH may be mapped and transmitted during the control channel transmission period. The frequency-domain mapping location of the PDCCH may be determined by an ID of each terminal, and it may be spread throughout the entire system transmission band.

Downlink data may be transmitted over a Physical Downlink Shared Channel (PDSCH) that is a physical channel for downlink data transmission. A PDSCH may be transmitted after the control channel transmission period, and the scheduling information such as the detailed mapping location in the frequency domain and the modulation scheme may be indicated by the DCI that is transmitted over the PDCCH.

Using a 5-bit MCS in the control information constituting the DCI, the base station notifies the terminal of the modulation scheme applied to the PDSCH to be transmitted and the size of data (e.g., Transport Block Size (TBS)) to be transmitted. The TBS corresponds to the size given before channel coding for error correction is applied to the data (e.g., Transport Block (TB)) to be transmitted by the base station.

The modulation schemes supported by the LTE system may include Quadrature Phase Shift Keying (QPSK), 16 Quadrature Amplitude Modulation (QAM), and 64 QAM, and they have modulation orders ($Q_m$) 2, 4, and 6, respectively. That is, the QPSK modulation transmits 2 bits per symbol, the 16 QAM transmits 4 bits per symbol, and the 64 QAM transmits 6 bits per symbol.

In this embodiment, a PDCCH transmission may be understood as a control information transmission on a PDCCH, a PUCCH transmission as a control information transmission on a PUCCH, a PDSCH transmission as a data transmission on a PDSCH, and a PUSCH transmission as a data transmission on a PUSCH.

The 3GPP LTE Rel-10 adopts a Bandwidth extension to accommodate more data traffic in comparison with LTE Rel-8. This technology called Bandwidth extension or Carrier Aggregation (CA) is capable of increasing a data rate as much as the extended band in comparison with the LTE Rel-8 in which the data are transmitted in a signal band. Each band is referred to as Component Carrier (CC), and the LTE Rel-8 terminal is configured to have a DL CC and UL CC. The DL CC and the UL CC having an SIB-2 connection relationship are paired to be referred to as a cell. The SIB-2 connection relationship between the DL CC and UL CC is informed by a terminal-specific signal. A CA-enabled UE may receive DL data and transmit UL data through a plurality of serving cells.

In Rel-10, when it is difficult for the base station to transmit a physical downlink control channel (PDCCH) in a specific serving cell, the base station may transmit the PDCCH in another serving cell and configure a Carrier Indicator Field (CIF) as a field notifying that the PDCCH indicates a physical downlink shared channel (PDSCH) or a physical uplink shared channel (PUSCH) of the another serving cell. The CIF may be configured to the terminal supporting CA. The CIF is configured to indicate a serving cell by adding 3 bits to the PDCCH information in a specific serving cell and included in the information only when cross carrier scheduling is performed; if no CIF is included, the cross carrier scheduling is not performed. The CIF is included in the DL assignment to indicate the serving cell in which the PDSCH scheduled by the DL assignment is transmitted or in the UL grant to indicate the serving cell in which the PUSCH scheduled by the UL grant is transmitted.

As described above, LTE Rel-10 supports CA as a bandwidth extension technique, which makes it possible to configure multiple serving cells to a UE. The UE transmits channel information of the multiple serving cells for use by the eNB in scheduling data transmission periodically or aperiodically. The eNB schedules data transmission per carrier, and the UE transmits ACK/NACK feedback corresponding to the per-carrier data transmission. In LTE Rel-10, it is designed that the UE transmits the ACK/NACK with up to 21 bits and, if the ACK/NACK feedback and channel information transmission are overlapped in one subframe, the UE transmits the ACK/NACK feedback preferentially and discards the channel information. In LTE Rel-11, it is designed that the UE transmits the ACK/NACK feedback and channel information of one cell multiplexed with up to 22 bits and in PUCCH format 3 on the PUCCH format 3 resources.

In LTE Rel-13 assuming a scenario for configuring up to 32 serving cells, the number of serving cells is increased up to 32 using an unlicensed band in addition to a licensed ban. The technology introduced for providing the LTE service in the unlicensed band such as a 5 GHz band in consideration of the limit of the number of licensed bands such as LTE frequency is referred to as Licensed Assisted Access (LAA). The LAA makes it possible to use an LTE cell operating in the licensed band as a primary cell (PCell) and an LAA cell operating in the unlicensed band as a secondary cell (SCell). As in LTE, the feedback information occurring in the LAA cell, i.e., SCell, should be transmitted in the PCell, and the LAA cell may use flexibly uplink and downlink subframes. In the following description, unless otherwise stated, the term "LTE" is intended to include all of the advanced LTE technologies such as LTE-A and LAA.

As a next generation communication system after LTE, the new radio access technology (NR), i.e. 5G wireless cellular communication system (hereinafter, referred to as 5G system) should be designed to meet various requirements of services demanded by users and service providers.

Accordingly, it is necessary to categorize various 5G-oriented services into a few types of services such as enhanced mobile broadband (eMBB), massive machine type communications (mMTC), and ultra-reliable and low-latency communications (URLLC) having various requirements such as per-UE maximum data rate of 30 Gbps, per-UE maximum mobility of 500 km/h, maximum latency of 0.5 ms, and maximum UE density of 1,000,000 UEs/km$^2$).

For example, in the 5G system, the eMBB aims to increase the peak data rate up to 20 Gbps in DL and 10 Gbps in UL per base station. Simultaneously, it aims to increase the user-perceived data rate. In order to meet such requirements, it is necessary to improve signal transmission/reception technologies including the multi-input multi-output (MIMO) technique.

Meanwhile, the mMTC is being considered to support application services for Internet of Things (IoT). In order to provide mMTC-based IoT application services effectively, it is necessary to secure massive access resources for terminals within a cell, improve terminal coverage and battery life span, and reduce device manufacturing cost. The IoT services should be designed to support a large amount of terminals (e.g., 1,000,000 terminals/km$^2$) within a cell in consideration of the nature of the IoT terminals that are attached to various sensors and devices for providing a communication function. By the nature of the IoT services, the mMTC terminals are likely to be located in coverage holes such as a basement of a building, which requires broader coverage in comparison with other services being supported in the 5G communication system. The mMTC terminals that are characterized by their low prices and battery replacement difficulty should be designed to have a very long battery lifetime.

Finally, the URLLC is targeted for mission-critical cellular-based communication services such as remote robot and machinery control, industrial automation, unmanned aerial vehicle, remote health care, and emergency alert services that require ultra-low latency and ultra-high reliability. For example, a URLLC service needs to meet the requirements of air-interface latency lower than 0.5 ms and packet error rate equal to or less than $10^{-5}$. In this respect, in order to support the URLLC services, the 5G system has to support transmit time intervals (TTI) shorter than those of other services and assign broad resources in the frequency band.

The aforementioned services under consideration to be supported in the 5G communication system should be provided on one framework in a mixed manner. That is, it is preferable to administrate and control the services in an integrated manner rather than individually in terms of efficient resource management and control.

Figure 23:
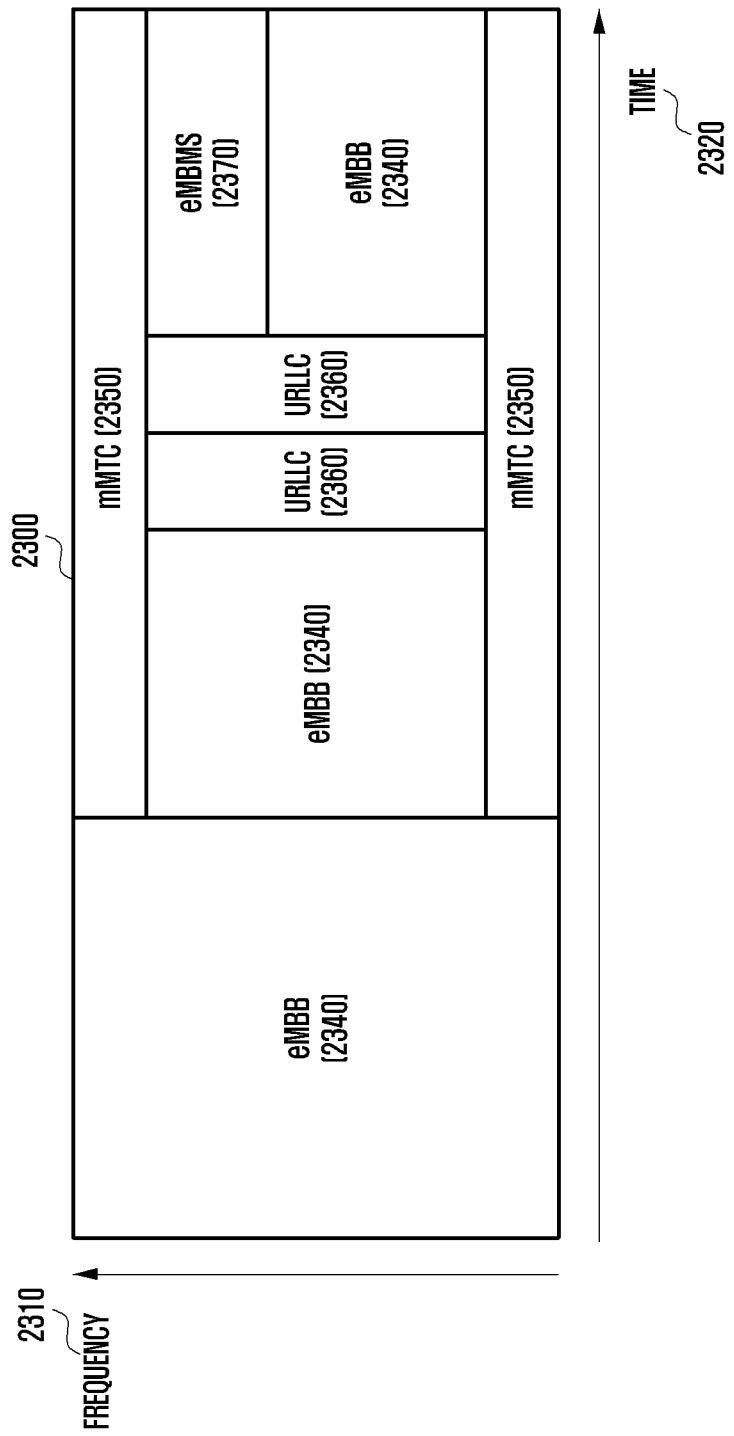
FIG. 23 is a diagram illustrating an example of multiplexing services under consideration to be supported in a 5G system into a system.

FIG. 23 is a diagram illustrating an example of multiplexing services under consideration to be supported in a 5G system into a system.

In FIG. 23, the frequency-time resources 2300 for use in the 5G system are defined by the frequency axis 2310 and the time axis 2320. In the depiction of FIG. 23, the eMBB 2340, mMTC 2350, and URLLC 2360 are administrated by way of example on one frame in the 5G system. As an additional type of service under consideration to be supported in the 5G system, enhanced mobile broadcast/multicast service (eMBMS) is for providing cellular-based broadcast services. The eMBB 2340, mMTC 2350, URLLC 2360, and eMBMS 2370 under consideration to be supported in the 5G system may be time-division-multiplexed (TDMed) and/or frequency-division-multiplexed (FDMed) in the system frequency bandwidth, and/or spatial-division-multiplexed.

For the eMBB 2340, it is preferable to occupy the frequency bandwidth as broadly as possible during an arbitrary time period to secure an increased data rate as described above. Accordingly, although it is preferable for the eMBB service 2340 to be TDMed with other services in the system frequency-time resources 2300, it may also be possible, if necessary, that the eMBB service is FDMed with other services in the system frequency-time resources 2300.

For the mMTC 2350, it is necessary to increase the transmission period to secure a broad coverage, unlike other services, and it is possible transmit the same packet repetitively in the same transmission period to secure the coverage. The low complexity and manufacturing price of the terminal contribute to transmission bandwidth restriction. In consideration of such requirements, it is preferable for the mMTC service 2350 to be FDMed with other services in the 5G system frequency-time resources 2300.

For the URLLC 2360, it is preferable to use a TTI shorter than those for other services to meet the ultra-low latency requirement. Also, in order to meet the ultra-high reliability requirement, it is preferable to secure a broad bandwidth in the frequency domain to achieve a low coding rate. In consideration of such requirements, it is preferable for the URLLC service 2360 to be TDMed with other services in the 5G system time-frequency resources 2300.

The aforementioned services may be provided with different transmission/reception schemes and transmission/reception parameters to meet the service-specific requirements. For example, the individual services may be provided with different numerologies to meet the service-specific requirements. The term "numerology" is intended to include cyclic prefix (CP) length, subcarrier spacing, OFDM symbol length, and TTI in the OFDM-based or OFMDA-based communication systems.

As an example of using service-specific numerologies, the eMBMS 2370 may be provided with a CP length longer than that for other services. The eMBMS 2370 is characterized in that the same data are transmitted within all cells because it is provided in such a way of broadcasting higher layer traffic. From the view of the terminal, if the signals transmitted via multiple cells are received with a delay shorter than the CP length, the terminal is capable of decoding all of the signals so as to achieve single frequency network (SFN) diversity, and this means that even the cell edge terminals may receive the broadcast information without coverage restriction. However, the CP overhead caused by using the CP length longer that for other services to support the eMBMS 2370 in the 5G system brings about resource waste, and this may be interpreted as a situation that requires an OFDM symbol length longer than that for other services and, simultaneously, a subcarrier spacing narrower than that for other services.

As another example of using service-specific numerologies, the URLLC service 2360 may be provided with a TTI shorter than that for other services, which require a very short OFDM symbol length and broad subcarrier spacing.

Hereinabove, descriptions have been made of the services that are under consideration to be supported and the requirements for supporting the services in the 5G system.

Meanwhile, in the 5G system, one slot may be defined as a slot, which is composed of 14 or 7 OFDM symbols. Accordingly, in the case of using the subcarrier spacing of 15 KHz, a slot spans 1 ms or 0.5 ms. In the 5G system, a TTI may also be defined as a mini-slot or sub-slot, which is composed of one or (number of OFDM symbols constituting a slot—1) slots for emergency transmission in an unlicensed frequency band. In the case of the slot composed of 14 OFDM symbols, the length of a mini-slot may be determined as one of 1 to 13 OFDM symbols. The length of a slot or a mini-slot may be configured as defined in the standard or notified to the UE via higher layer signaling or system information. Instead of the mini-slot or sub-slot, the length of a slot may be determined as one of 1 to 14 OFDM symbols and notified to the UE via higher layer signaling or system information.

A slot or a mini-slot may be defined to have one of various transmission formats as follows.

DL only slot or full DL slot: A DL only slot consists of only a DL period and is used only for downlink transmission.

DL centric slot: A DL centric slot consists of a DL period, a GP, and a UL period and is characterized in that the DL period is larger than the UL period in number of OFDM symbols.

UL centric slot: A UL centric slot consists of a DL period, a GP, and a UL period and is characterized in that the UL period is longer than the DL period in number of OFDM symbols.

UL only slot or full UL slot: A UL only slot consists of only a UL period and is used only for uplink transmission.

Although the above categorization has been made of the slot formats, it may also be possible to make a categorization of the mini-slot formats. That is, a mini-slot may fall into one of the following categories: DL only mini-slot, DL centric mini-slot, UL centric mini-slot, and UL only mini-slot.

It is considered that the 5G system operates on a frequency of a few to a few dozen GHz and that FDD is preferred over TDD in a relatively low frequency band of a few GHz and TDD is preferred over FDD in a relatively high frequency band of a few dozen GHz. However, unlike the FDD characterized in that the UL and DL resources are constant because of the UL and DL frequency separation, the TDD is characterized in that the UL and DL share the same frequency such that the UL or DL resources become available at a time. Assuming the necessity of URLLC transmission in UL or DL, it may be difficult to satisfy the low latency requirement for URLLC because there is a time delay until the UL or DL resources become available. Thus, in order to meet the low latency requirement for URLLC in the TDD mode, there is a need of a method for switching between UL and DL dynamically depending on the transmission direction (i.e., UL or DL) of the URLLC data.

An important requirement of the 5G system is to be designed to support 5G phase 2 or beyond 5G services and technologies without causing a backward compatibility problem with the legacy 5G technologies even when the 5G phase 2 or beyond 5G services and technologies are multiplexed in the 5G operation frequency band. Such a requirement is referred to as forward compatibility, which should be considered in designing the 5G system initially for technologies that may be offered in the future.

The lack of consideration on the forward compatibility in the initial LTE standardization stage has brought about restrictions on supporting new services within the LTE framework. For example, the eMTC introduced LTE release-13 is limited in that the terminal is able to operate only in a 1.4 MHz frequency band regardless of the system bandwidth of the serving cell in order to reduce complexity and terminal manufacturing cost. This means that the eMTC-enabled terminal may not receive a physical downlink control channel (PDCCH) that is transmitted across the whole system bandwidth of the legacy system, resulting in restriction in signal reception during a PDCCH transmission time interval.

In this respect, the 5G communication system should be designed in consideration of coexistence of the operations of services that are under consideration to be offered beyond 5G with the services supported in the 5G communication system. It may also be necessary to design the 5G communication system to support forward compatibility such that the services under consideration to be offered in the future are freely allocated transmission resources in the time-frequency resources domain supported by the 5G communication system. Thus, there is a need of a method for freely allocating time-frequency resources to support the forward compatibility in the 5G system.

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Although the descriptions and embodiments of the present invention are directed to the LTE and 5G system, it will be understood by those skilled in the art that the present invention can be applied even to other communication systems having a similar technical background and channel format, with a slight modification, without departing from the spirit and scope of the present invention.

Hereinafter, descriptions are made of the 5G communication system in which 5G cells are operating in standalone mode and of the 5G communication system in which the 5G cells are operating in non-standalone mode in combination with other standalone 5G cells via dual connectivity or carrier aggregation.

FIGS. 24 and 25 are diagrams illustrating communication systems according to embodiments 3-1 and 3-2 of the present invention. The methods proposed in the present invention may be applicable to both the systems of FIGS. 24 and 25.

Part (a) of FIG. 24 depicts a scenario where a 5G cell 2410 operating in a standalone mode is hosted by a base station 2400 in a network. The UE 2420 is a 5G-capable UE with a 5G communication module. The UE 2420 achieves synchronization based on a synchronization signal transmitted by the standalone cell 2410, receives system information, and attempts random access to the 5G base station 2400. The UE 2420 establishes an RRC connection with the 5G base station 2400 and communicates data with the base station via the 5G cell 2410. In this case, duplex mode of the 5G cell 2410 is not limited, and the 5G cell may be provided with a plurality of serving cell.

Part (b) of FIG. 24 depicts a scenario where a 5G standalone base station 2430 and a 5G non-standalone base station 2440 for improving a data rate are deployed. The UE 2460 is a 5G-capable UE with a 5G communication module for performing 5G communication with multiple base stations. The UE 2460 achieves synchronization based on a synchronization signal transmitted via the 5G standalone base station 2430, receives system information, and attempts random access to the 5G standalone base station 2430. The UE 2460 establishes an RRC connection with the 5G standalone base station 2430, configures the 5G non-standalone cell 2470 additionally, and communicates data with the 5G standalone base station 2430 or the 5G non-standalone base station 2440.

In this case, duplex modes of the 5G standalone base station 2430 and the 5G non-standalone base station 2440 are not limited, and it is assumed that the 5G standalone base station 2430 and the 5G non-standalone base station 2440 are connected to each other through an ideal or non-ideal backhaul network. The ideal backhaul network 2450 supports fast X2 communication between base stations. It may be possible to configure a plurality of 5G cells.

Part (a) of FIG. 25 depicts a scenario where an LTE cell 2510 and a 5G cell 2520 are hosted by a base station 2500 in a network. The UE 2530 may be an LTE-capable UE with an LTE communication module or a 5G-capable UE with a 5G communication module. The UE 2530 achieves synchronization based on a synchronization signal transmitted via the LTE cell 2510 or the 5G cell 2520, receives system information, and communicates data with the base station 2500 via the LTE cell 2510 or the 5G cell 2520. In this case, duplex modes of the LTE cell 2510 and the 5G cell 2520 are not limited. If the LTE cell is a PCell, uplink control information is transmitted via the LTE cell 2510; if the 5G cell is the PCell, the uplink control information is transmitted via the 5G cell 2520. It may be possible to configure up to 32 LTE and 5G cells in total.

In the above-exemplary network, it is assumed that the base station 2500 is provided with an LTE communication module (system) and a 5G communication module (system) to support both the LTE and 5G systems in real time. In the case of dividing time resources for LTE and 5G systems, the base station may allocate the time resources of the LTE and 5G systems dynamically. The UE 2530 may receive a signal indicating allocation of resources (time resources, frequency resources, antenna resources, spatial resources, etc.) for the LTE and 5G cells so as to recognize the resources for use in transmitting data via the LTE cell 2510 and the 5G cell 2520 based on the received signal.

Part (b) of FIG. 25 depicts a scenario where an LTE macro base station 2540 for securing a broad coverage and a 5G small base station 2550 for increasing data transmission amount are deployed. The UE 2570 may be an LTE-capable UE with an LTE communication module, a 5G-capable UE with a 5G communication module, or a UE equipped with both the LTE communication module and the 5G communication module. The UE 2570 achieves synchronization based on a synchronization signal transmitted by the LTE base station 2540 or the 5G base station 2550, receives system information, and communicates data via the LTE base station 2540 and the 5G base station 2550. In this case, duplex modes of the LTE macro base station 2540 and the 5G small base station 2550 are not limited. If the LTE cell is a PCell, uplink control information is transmitted via the LTE cell 2590; if the 5G cell is the PCell, the uplink control information in transmitted via the 5G cell 2580. Here, it is assumed that the LTE and 5G base stations 2540 and 2550 are connected to each other through an ideal or a non-ideal backhaul network. In the case of being connected through the ideal backhaul network 2560 supporting fast X2 communication, although an uplink transmission is performed only to the LTE base station 2540, the 5G base station 2550 can receive related control information from the LTE base station 2540 in real time via X2 communication. It may be possible to configure up to 32 LTE and 5G serving cells in total.

The base station 2540 or 2550 may support the LTE system and the 5G system in real time. For example, if one (e.g., base station 2540) of the base stations divides time resources into LTE system time resources and 5G system time resources, it may configure the LTE system time resources and the 5G system time resources dynamically and transmit a signal indicating the configuration to the other base station (e.g., base station 2550) via X2 communication. The UE 2570 may receive a signal indicating allocation of the resources (time resources, frequency resources, antenna resources, spatial resources, etc.) for the LTE and 5G cells from the LTE base station 2540 or the 5G base station 2550 so as to recognize the resources for use in transmitting data via the LTE cell 2590 and the 5G cell 2580.

Meanwhile, in the case of being connected through the non-ideal back haul network 2560, it is impossible for the base stations to communicate via X2 communication. In this case, the base station 2540 or 2550 may support the LTE and 5G systems semi-statically. For example, if one (e.g., base station 2540) of the base stations divides time resources into LTE system time resources and 5G system time resources, it may configure the LTE system time resources and the 5G system time resources dynamically and transmit a signal indication the configuration to the other base station (e.g., base station 2550) in advance via X2 communication for distinguishing between the resources for the LTE and 5G systems. The terminal 2570 may receive a signal indicating allocation of the resources (time resources, frequency resources, antenna resources, spatial resources, etc.) for the LTE and 5G cells from the LTE base station 2540 or the 5G base station 2550 so as to recognize the resources for use in transmitting data via the LTE cell 2590 and the 5G cell 2580.

Figure 26:
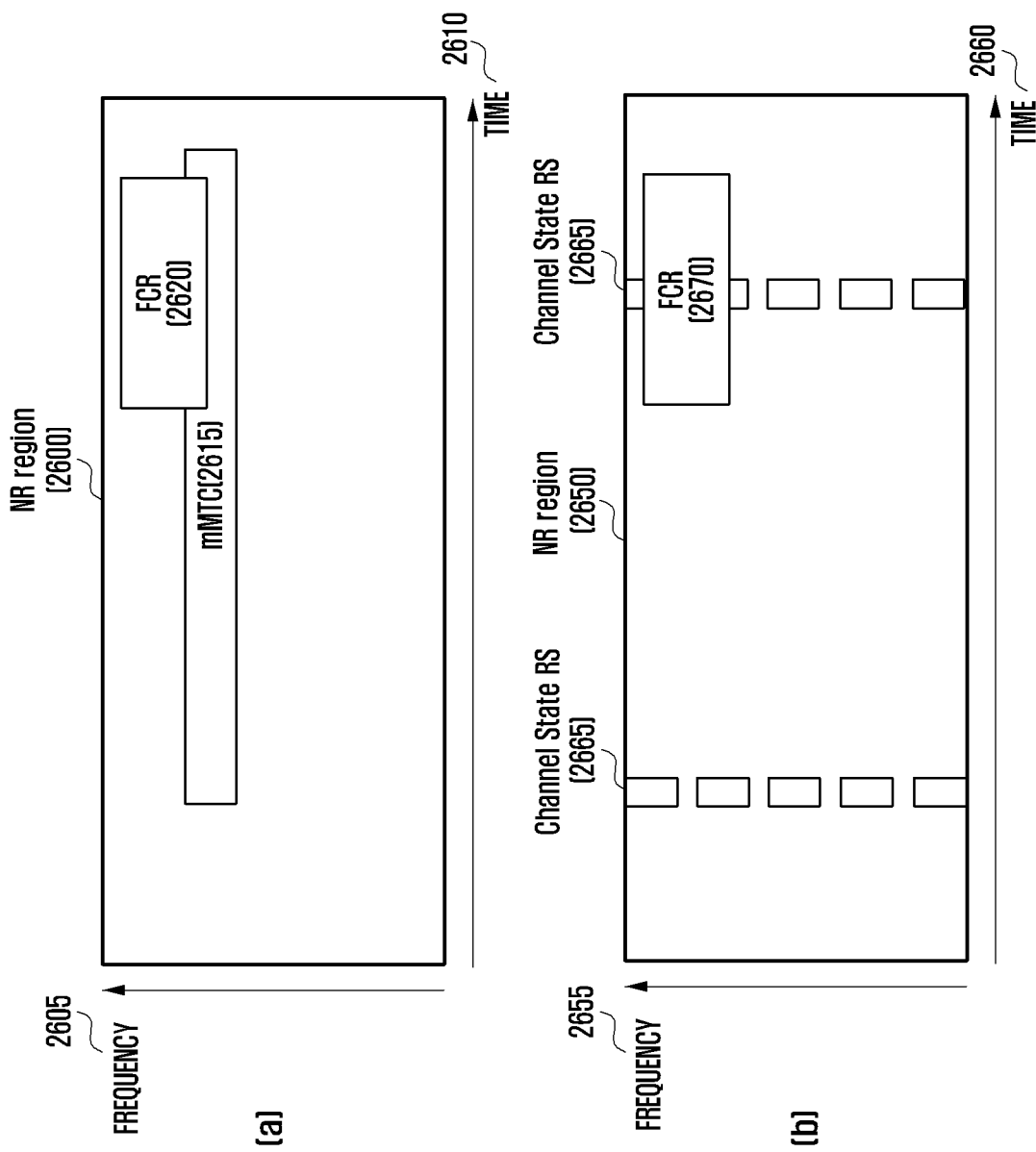
FIG. 26 is a diagram illustrating a problematic situation to be solved by the present invention.

FIG. 26 is a diagram illustrating a problematic situation to be solved by the present invention. A description is made with reference to parts (a) and (b) of FIG. 26 of the problem arising when the time-frequency resources that are freely allocated for supporting the forward compatibility in a 5G communication are configured via base station implementation without awareness by the UE.

In part (a) of FIG. 26, the frequency-time resources 2600 for use by the 5G system are depicted along the frequency axis 2605 and the time axis 2610. Part (a) depicts a scenario where mMTC resources 2615 and forward compatibility resources (FCR) 2620 are managed by a 5G base station in a framework of the 5G system. The FCR 2620 may be referred to by a different name such as compatibility-guaranteeing resources and compatibility-secure resources. The FCR may also referred to by another name such as blank resources, reserved resources, and unknown resources. The FCR means the resources secured in advance in the frequency-time resources in use by the 5G system for forward compatibility, LTE-5G system coexistence, and other purposes (e.g., configuring URLLC resources with the FCR when URLLC is multiplexed because there is no need for an eMBB to know the multiplexing of the URLLC). In the present invention, all of the resources being used for the above purposes are referred to as FCR.

As described above, the mMTC 2620 differs from other services in requiring a long TTI to secure a broad coverage and securing the coverage by transmitting the same packet repetitively during the TTI. Accordingly, in the case where the FCR 2620 is configured via the base station implementation without awareness by the UE, the FCR 2620 and mMTC resources 2615 may collide with each other and thus the UE cannot receive the data being repetitively transmitted. There is therefore a need of defining a signaling operation for notifying the UE of the FCR region 2620 in order for the UE to properly operate even when the FCR region collides with other 5G service resource regions.

In the above case, the UE may perform a rate matching or puncturing operation on the 5G service transmission resources that collide with the FCR region. The rate matching is an operation of mapping data, at the transmitter (in this case, the transmitter may be the base station), to the 5G service transmission resources remaining after excluding part of the 5G service transmission resources that collide with the FCR region and performing transmission and reception of the mapped data at the transmitter and the receiver (in this case, the receiver may be the UE); and the puncturing is an operation of performing data demodulation at the receiver (in this case, the receiver may be the UE), although it is assumed that the 5G service data are mapped even to the 5G service transmission resources part that collides with the FCR region, in consideration of the reception value at the 5G service resources that do not collide with the FCR region (or processing the reception value on the 5G service transmission resources part that does not collide with the FCR region as 0).

The base station may transmit a signal instructing the rate matching or puncturing operation to be performed via a higher layer or physical signal, and the UE may perform the rate matching or puncturing operation for the 5G service data on the resource region that collides with the FCR. The UE may perform the rate matching or puncturing operation as predetermined per 5G transmission signal. That is, in the case where the FCR and reference signal resources collide with each other, the reference signal in the region of collision may be punctured; in the case where the FCR and a 5G downlink control channel transmission region collide with each other, the rate matching operation may be performed on the 5G downlink control channel transmission in the region of collision.

In part (b) of FIG. 26, the frequency-time resources 2650 for use by the 5G system are depicted along the frequency axis 2655 and the time axis 2660. Part (b) depicts a scenario where channel state reference signal resources 2665 for channel state information measurement and FCR 2670 are managed by a 5G base station in a framework of the 5G system.

The channel state reference signal may be transmitted on the channel state reference signal resources 2665 by the base station across a broad frequency band. The frequency band of the channel state reference signal may be preconfigured via higher layer signaling, and the UE performs measurement on the channel state reference signal 2665 to generate channel state information, which is fed back to the base station. Accordingly, if the FCR 2670 is configured via the base station implementation without awareness by the UE, the FCR 2670 and the channel state reference signal resources 2665 may collide with each other, and the UE performs measurement on the channel state reference signal 2665 without awareness that the channel state reference signal resources 2665 are occupied by the FCR and generates incorrect channel state information, which is fed back to the base station. There is therefore a need to define a signaling operation for notifying the UE of the region of the FCR 2760 in order for the UE to operate properly even when the reference signal for another 5G service and the FCR 2670 collide with each other.

Next, a description is made of the signaling for indicating a region of FCR proposed in the present invention.

The signaling for indicating the FCR region may include at least time region information or frequency region information. In particular, it may be possible to define a downlink frequency region and time region and uplink frequency region and time region separately. The time region of the FCR may be composed of one or more slots, one slot being a time unit in use by an eMBB UE to transmit/receive data. A slot may consist of 7 or 14 OFDM symbols for the case of using a subcarrier spacing equal to or less than 60 KHz and may be configured via higher layer signaling during the 7 or 14 OFDM symbols. A slot may consist of 14 OFDM symbols for the case of using a subcarrier spacing greater than 60 KHz. The time region of the FCR may be composed of one or more mini-slots or sub-slots, one mini-slot being a time unit in use by an URLLC UE to transmit/receive data. A mini-slot or sub-slot may consist of a number of OFDM symbols less than 7. The time region of the FCR may be composed of a number of OFDM symbols less than the number of OFDM symbols constituting a slot or a mini-slot. An uplink or downlink frequency region of the FCR may correspond to a unit of a physical resource block (PRB) composed of 12 subcarriers or a unit of a subband composed of at least one PRB. The frequency region of the FRC may also be composed of a number of subcarriers less than the number of subcarriers constituting a PRB.

The FCR region indication signaling may mean the actual use of FCR by the base station, and the FCR region indication signaling and the signaling for indicating whether the base station actually uses the FCR may be made separately. The FCR region indicating signaling and the signaling for indicating whether the FCR is actually used by the base station may be made with a UE-specific signal, a service-specific signal (e.g., signal for UEs receiving an eMBB, URLLC, or mMTC service), a cell-common signal (master information block (MIB) as system information), a system information block (SIB), or a 5G release-specific signal. In the case, where the UE collides with the 5G service region or a 5G signal collides with the FCR, the FCR region indication signaling may be made with a signal instructing a rate matching or puncturing operation to be performed.

The FCR region indication signaling or the signaling for indicating whether the FCR is actually used by the base station may be made from the base station to the UE using a higher layer signal or a physical signal, and the UE may acquire the signals to determine the FCR region and whether the FCR region is actually used by the base station and, if the FCR region collides with a 5G service region or a 5G signal, perform a proper predefined procedure.

In more detail, in the case where the base station configures multiple FCRs, the configuration information may be transmitted to the UE via a higher layer signal, and the base station may notify the UE of the FCR recommended to be actually used in the current situation among the multiple FCRs via a physical signal. The UE may receive the multiple FCRs configuration information (a bit signal indicating frequency region or time region, FCR repetition interval (period) information or offset, and a priority) via a higher layer signal and the information on the FCR activated among the multiple FCRs via a physical signal (common downlink control channel or dedicated downlink control channel). The UE may determine that the FCR is activated simultaneously upon being configured via a higher layer signal. If the FCRs notified to the UE have different priorities, the UE may stop transmitting/receiving all 5G channels and signals on the FCR with the highest priority and perform transmission/reception of a specific 5G channel or signal predetermined in the standard or indicated via a higher layer signal on the FCR with the lowest priority. For example, the base station may instruct the UE to transmit/receive a specific 5G channel or signal that causes interference on the FCR with a low priority via the aforementioned signal, and the UE may transmit/receive the 5G channel or signal upon receipt of the aforementioned signal. The UE assumes the deactivation of other FCRs based on the information on the FCR to be activated and, if the activated FCR collides with data reception or reference signal reception of the UE, operates according to the method proposed in the present invention. If a deactivated FCR collides with data reception or reference signal reception of the UE, the UE ignores the deactivated FCR to receive the data and reference signal normally (under the assumption that the FCR is not configured), although the deactivated FCR is overlapped with the data resources or reference signal resources.

The higher layer signal for configuring multiple FCRs may include bit information indicating whether each FCR is activated or deactivated, the base station transmits to the UE the activation/deactivation information along with the FCR configuration information via a higher layer signal; and the UE receives the higher layer signal and, if the activated FCR collides with the data reception or reference signal reception of the UE, operates according to the method proposed in the present invention. If a deactivated FCR and the data reception or reference signal reception of the UE collide with each other, the UE ignores the deactivated FCR to receive the data and reference signal normally (under the assumption that the FCR is not configured), although the deactivated FCR is overlapped with the data resources or reference signal resources.

It may be possible to transmit bit information indicating whether an FCR including one or more time regions (subframe, slot, or mini-slot or sub-slot) and frequency regions (subband, PRB, or subcarrier) is configured/unconfigured or activated/deactivated via a physical signal (common downlink control channel or dedicated downlink control channel) or a higher layer signal. In particular, the FCR may be selected among the time and frequency resources for use by the UE to receive the downlink control channel. The base station may transmit information indicating a specific timer or frequency region or a combination of the time and frequency regions is activated/deactivated to the UE via the physical signal or higher layer signal, and the UE receives the corresponding signal to attempt to decode the downlink control channel only on the unconfigured or deactivated FCR and not on the configured or activated FCR, thereby conserving the transmit power of the UE.

It may also be possible to transmit bit information indicating whether an FCR including one or more time regions (subframe, slot, or mini-slot or sub-slot) and frequency regions (subband, PRB, or subcarrier) is configured/unconfigured or activated/deactivated via a physical layer signal (common downlink control channel or dedicated downlink control channel). In particular, the FCR may be selected among the time and frequency resources for use by the UE to perform a downlink control channel measurement. The base station may transmit information indicating whether a specific frequency region is configured or activated/deactivated to the UE via the physical signal or higher layer signal. The UE receives the FCR signal to verify the validity of the time or frequency region included in the unconfigured or deactivated FCR for use in downlink channel measurement and then attempts the downlink channel measurement. The UE receives the FCR signal to verify the invalidity of the time or frequency region included in the unconfigured or deactivated FCR for use in downlink channel measurement and then skips downlink channel measurement on the corresponding region, thereby conserving the transmit power of the UE.

Figure 27:
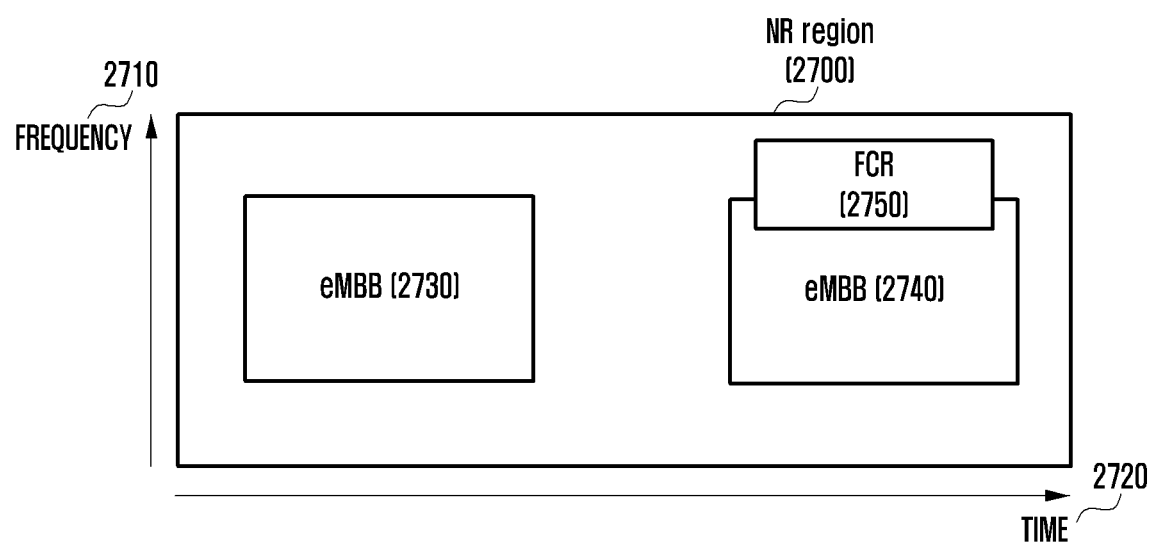
FIG. 27 is a diagram illustrating embodiment 2-1 of the present invention.

Next, a description is made of the proposed method for resolving the situation where an FCR region and a 5G service region collide with each other according to embodiment 3-1 of the present invention with reference to FIG. 27.

FIG. 27 is a diagram illustrating embodiment 2-1 of the present invention.

In FIG. 27, the frequency-time resources 2700 for use by the 5G system are depicted along the frequency axis 2710 and the time axis 2720. FIG. 27 depicts a scenario where eMBB 2730 and 2740 and FCR 2750 are managed by a 5G base station in a framework of the 5G system. Although the drawing depicts an exemplary case where the FCR and the eMBB resources 2740 collide with each other, the present embodiment is also applicable to the cases where the FCR collides with other 5G service resources such as mMTC, URLLC, and eMBMS resources in addition to eMBB.

The FCR region indication signaling may include a signal instructing the UE to perform a rate matching or puncturing operation in the case where the FCR collides with a 5G service region or a 5G signal.

As described above, the rate matching or puncturing operation may be performed as predetermined per 5G transmission signal. In the case where the FCR region and whether the FCR is actually used are signaled to the UE, if the FCR 2750 and a resources region on which the eMBB data transmission/reception is scheduled collide with each other, the UE prioritizes the transmission on the FCR 2750 and thus does not map eMBB data to the resources colliding with the region of the FCR 2750 in the region on which the eMBB data transmission/reception is scheduled. That is, if the UE determines to perform rate matching for eMBB data and reference signals for demodulation of the data are overlapped with the FCR region, it attempts data transmission/reception under the assumption that the eMBB data are transmitted/received on the eMBB data resources without being overlapped with the resource elements corresponding to the overlapped region. The UE may not perform the rate matching or puncturing of the eMBB data and reference signal for demodulating data on the resources overlapped with the region of the FCR 2750 in the resource region on which eMBB data transmission is scheduled according to the signal instructing the rate matching or puncturing operation to be performed.

Figure 28A:
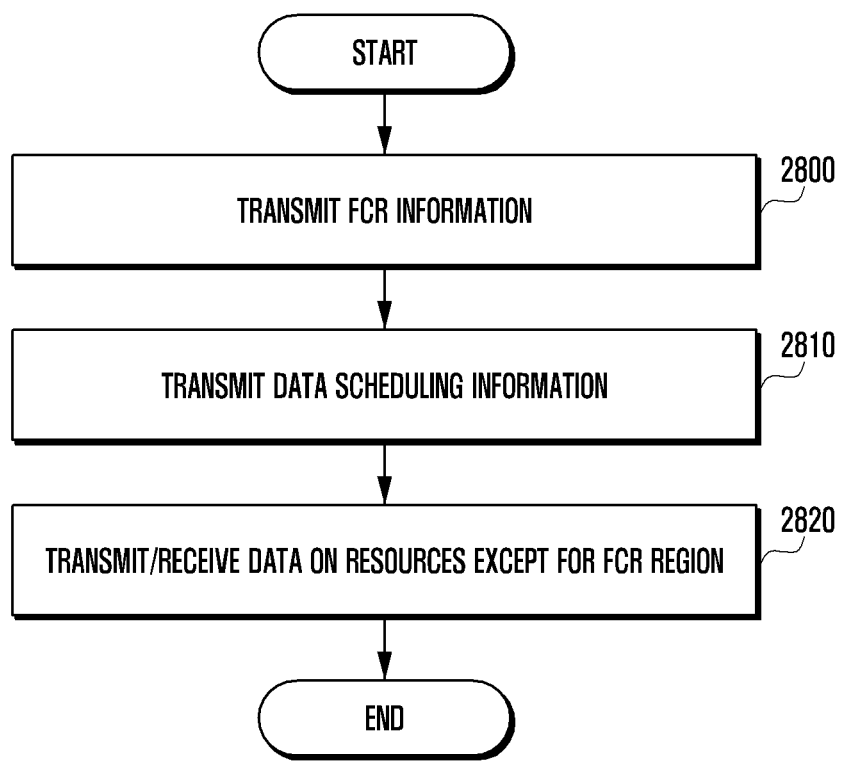
FIGS. 28A and 28B are flowcharts illustrating operations of a base station and a UE according to embodiment 3-1 of the present invention.
Figure 28B:
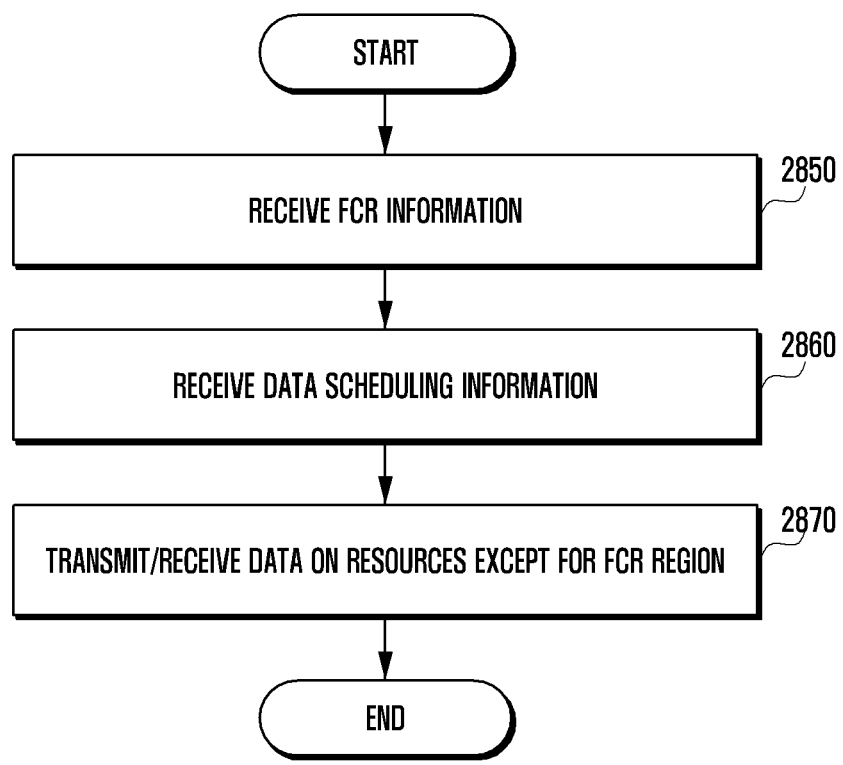

Next, a description is made with reference to FIGS. 28A and 28B of the operations of a base station and UE for the case where an FCR region collides with a 5G service region.

FIGS. 28A and 28B are flowcharts illustrating operations of a base station and a UE according to embodiment 3-1 of the present invention.

First, the operation of the base station according to embodiment 3-1 is described with reference to FIG. 28A.

At step 2800, the base station transmits FCR-related information to the UE. The FCR-related information is transmitted via signaling for indicating the FCR region as described above according to a method proposed in the present invention. The FCR region indication signaling may include a signal instructing the UE to perform a rate matching or puncturing operation in the case where the FCR collides with a 5G service region or a 5G signal.

At step 2810, the base station transmits data scheduling information for a 5G service to the UE. The data scheduling information includes information on the frequency or time resources for transmission of data of the 5G services including services being considered for the 5G system as described above. The data scheduling information may be transmitted via a higher layer signal or a physical signal.

At step 2820, the base station transmits/receives data on the 5G service resources with the exception of the FCR region based on the data scheduling information for the 5G services. For downlink transmission, the base station maps the downlink data to the resources on which the downlink data transmission is scheduled with the exception of the FCR region to transmit. For uplink transmission, the base station receives data on the resources on which the uplink data transmission is scheduled with the exception of the FCR region.

Next, the operation of the UE according to embodiment 3-1 is described with reference to FIG. 28B.

At step 2850, the UE receives FCR-related information from the base station. The FCR-related information is transmitted via signaling for indicating the FCR region as described above according to a method proposed in the present invention. The FCR region indication signaling may include a signal instructing the UE to perform a rate matching or puncturing operation in the case where the FCR collides with a 5G service region or a 5G signal.

At step 2860, the UE may receive data scheduling information for a 5G service from the base station. The data scheduling information includes information on the frequency or time resources for transmission of data of the 5G services including services being considered for the 5G system as described above. The data scheduling information may be transmitted via a higher layer signal or a physical signal.

At step 2870, the UE transmits/receives data on the 5G service resources with the exception of the FCR region based on the data scheduling information for the 5G services. For downlink transmission, the UE receives the data on the resources on which the downlink data transmission is scheduled with the exception of the FCR region. For uplink transmission, the UE maps and transmits the data on the resources on which the uplink data are scheduled by the base station with the exception of the FCR region.

Figure 29:
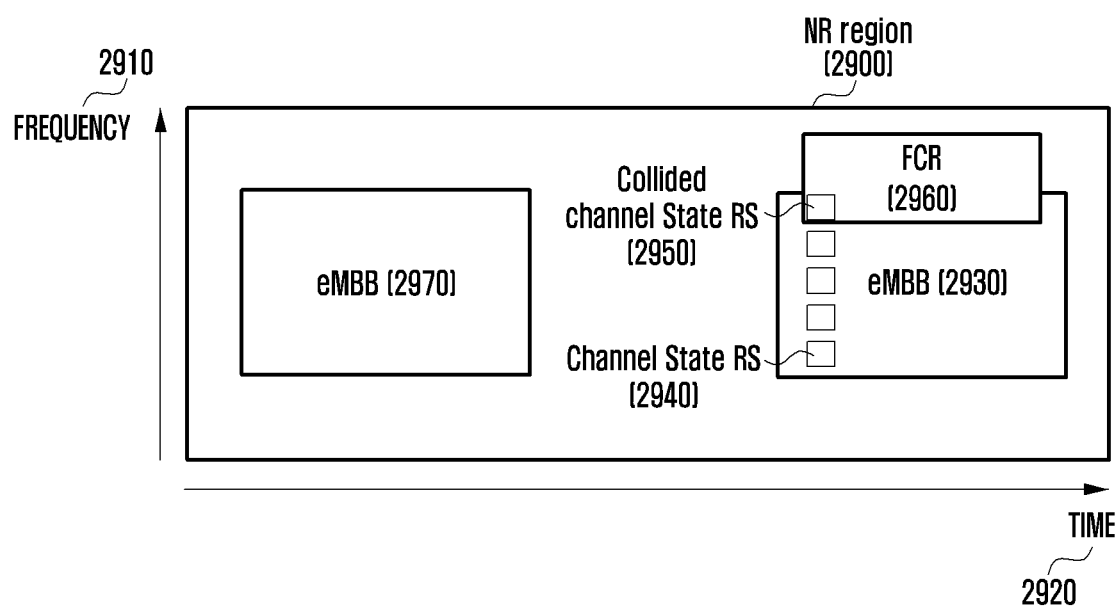
FIG. 29 is a diagram illustrating embodiment 3-2 of the present invention.

A description is made with reference to FIG. 29 of the proposed method for resolving the situation where an FCR region and a signal for a 5G service region collide with each other according to embodiment 3-2 of the present invention.

FIG. 29 is a diagram illustrating embodiment 3-2 of the present invention.

In FIG. 29, the frequency-time resources 2900 for use by the 5G system are depicted along the frequency axis 2910 and the time axis 2920. FIG. 29 depicts a scenario where eMBB 2930 and 2970 and FCR 2960 are managed by a 5G base station in a framework of the 5G system and channel state reference signals 2940 and 2950 are transmitted for receiving channel state information required for scheduling eMBB data transmission. Although the drawing depicts an exemplary case where the FCR and the channel state reference signal for the eMBB service collide with each other, the present embodiment is also applicable to the cases where other 5G services such as mMTC, URLLC, and eMBMS as well as the eMBB or another reference signal (e.g., data modulation reference signal and reference signal for phase difference) collide with the FCR.

The FCR region indication signaling may include a signal instructing the UE to perform a rate matching or puncturing operation in the case where the FCR collides with a 5G service region or a 5G signal.

As described above, the rate matching or puncturing operation may be performed as predetermined per 5G transmission signal. In the case where the FCR region and whether the FCR is actually used are signaled to the UE, if the FCR 2960 collides with the channel state reference signal 2950 for channel state measurement, the UE prioritizes the transmission on the FCR 2960 and assumes that there is no channel state reference signal on the resources 2950 overlapped with the region of the FCR 2960 among the channel state reference signal transmission resources 2940 and 2950. That is, if it is predetermined to perform puncturing in the case where the reference signal transmission region for channel state measurement and the FCR region are overlapped, the UE performs measurement on the channel state reference signal mapped to the resources without being overlapped with the resource elements corresponding to the overlapped region to generate and transmit the channel station information to the base station. The UE may not perform the rate matching or puncturing of the channel state reference signal on the resources 2950 colliding with the FCR 2960 in the channel state reference signal transmission resources 2940 and 2950 according to the signal instructing the rate matching or puncturing operation to be performed.

Figure 30A:
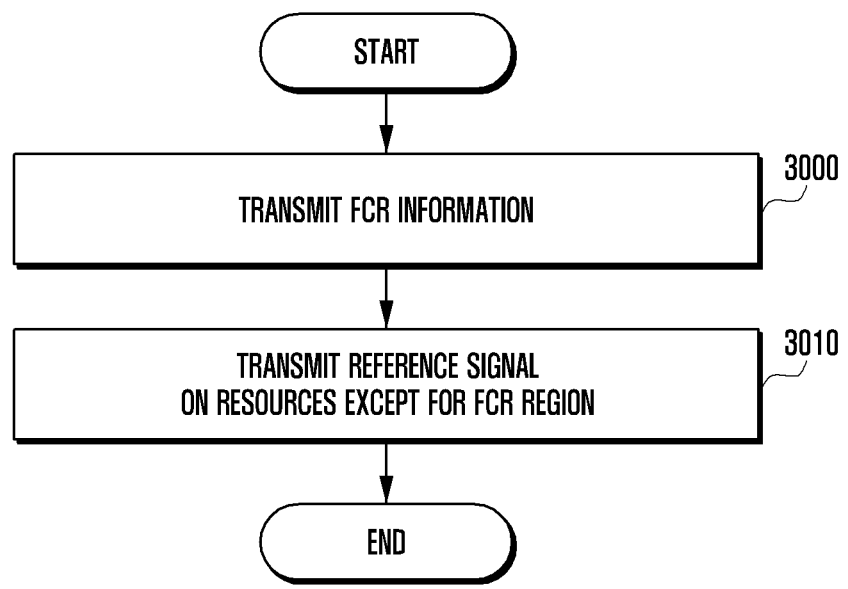
FIGS. 30A and 30B are flowcharts illustrating operations of a base station and a UE according to embodiment 3-2 of the present invention.
Figure 30B:
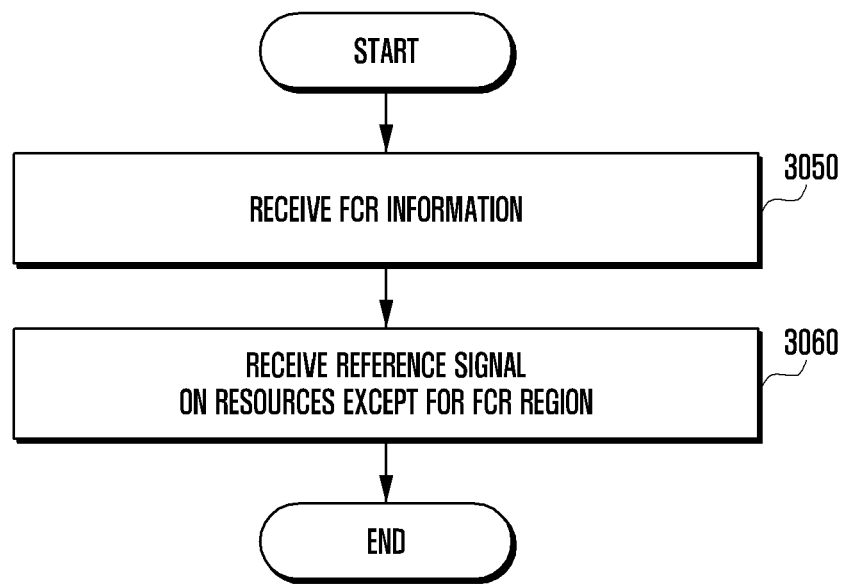

FIGS. 30A and 30B are flowcharts illustrating operations of a base station and a UE according to embodiment 3-2 of the present invention.

First, the operation of the base station according to embodiment 3-2 is described with reference to FIG. 30A.

At step 3000, the base station transmits FCR-related information to the UE. The FCR-related information is transmitted via signaling for indicating the FCR region as described above according to a method proposed in the present invention.

The FCR region indication signaling may include a signal instructing the UE to perform a rate matching or puncturing operation in the case where the FCR collides with a 5G service region or a 5G signal.

At step 3010, the base station transmits the reference signal to the UE on the reference signal transmission resources with the exception of the FCR region. As described above, the reference signals include all reference signals for the services under consideration to be supported in the 5G system.

Next, the operation of the UE according to embodiment 3-2 is described with reference to FIG. 30B.

At step 3050, the UE receives FCR-related information from the base station. The FCR-related information is transmitted via signaling for indicating the FCR region as described above according to a method proposed in the present invention.

At step 3060, the UE receives the reference signal from the base station on the reference signal transmission resources with the exception of the FCR region. As described above, the reference signals include all reference signals for the services under consideration to be supported in the 5G system. The UE performs the operation that is supposed to follow the receipt of the reference signal at step 3060. For example, if the received reference signal is a channel state reference signal, the UE generates channel state information based on the channel state reference signal and feeds back the generated channel state information to the base station.

Next, a description is made of the proposed method for resolving the situation where an FCR region and a signal for a 5G service region collide with each other and there are 5G phase 2 or beyond 5G UEs capable of transmitting/receiving data on the FCR according to embodiment 3-3 of the present invention.

In the case where the FCR region and whether the FCR is actually used are signaled to the UE, if the FCR collides with the channel state reference signal for channel state measurement, a 5G phase 2 or beyond-5G UE that is capable of receiving data on the FCR may operate with an understanding of the data and reference signals being transmitted on the FCR. In this case, the 5G phase 2 or beyond-5G UE may receive the reference signals being transmitted both inside and outside the FCR region, generate channel state information based on the received reference signals, and transmit the generated channel state information to the base station. In this case, because the channel estimation information being transmitted to the base station is generated based on many more channel state reference signals, the base station may perform more accurate data scheduling based on the channel state information.

Figure 31A:
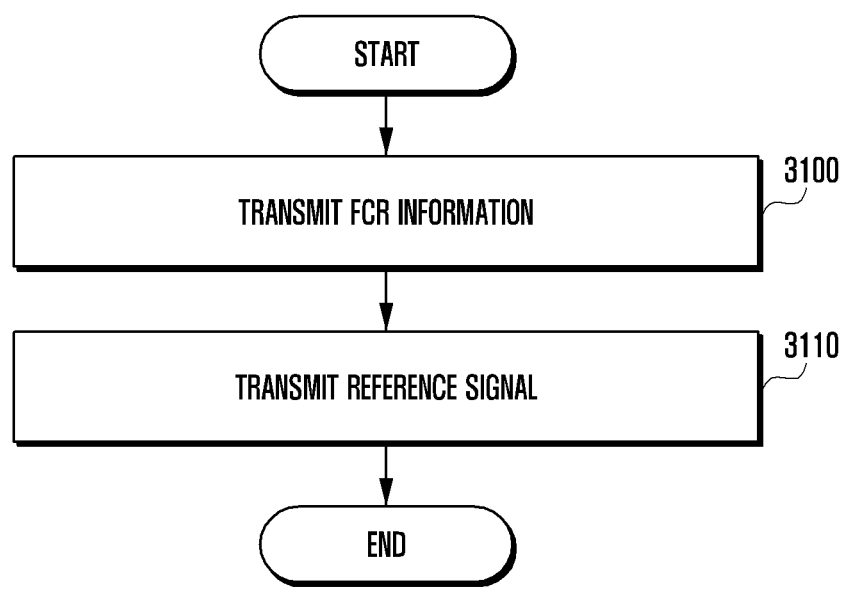
FIGS. 31A and 31B are flowcharts illustrating operations of a base station and a UE according to embodiment 3-3 of the present invention.
Figure 31B:
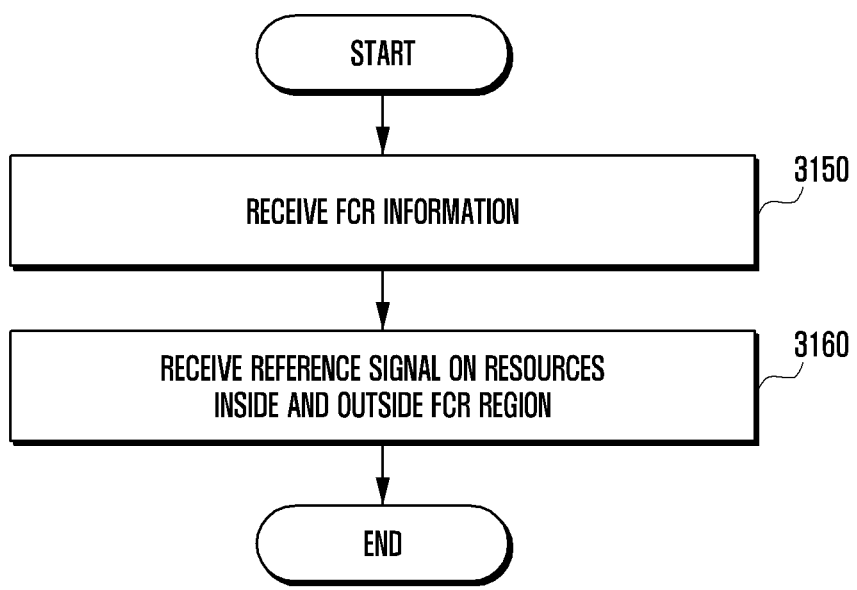

FIGS. 31A and 31B are flowcharts illustrating operations of a base station and a UE according to embodiment 3-3 of the present invention.

First, the operation of the base station according to embodiment 3-3 is described with reference to FIG. 31A.

At step 3100, the base station transmits FCR-related information to the UE. The FCR-related information is transmitted via signaling for indicating the FCR region as described above according to a method proposed in the present invention. The FCR region indication signaling may include a signal instructing the UE to perform a rate matching or puncturing operation in the case where the FCR collides with a 5G service region or a 5G signal.

At step 3110, the base station transmits reference signals to the UE both inside and outside the FCR region. As described above, the reference signals include all reference signals for the services under consideration to be supported in the 5G system. Reference signal configuration information may be transmitted via a higher layer signal or a physical signal.

Next, the operation of the UE according to embodiment 3-3 is described with reference to FIG. 31B.

The UE receives FCR-related information from the base station. The FCR-related information is transmitted via signaling for indicating the FCR region as described above according to a method proposed in the present invention.

At step 3160, the UE receives reference signals from base stations inside and outside the FCR region. As described above, the reference signals include all reference signals for the services under consideration to be supported in the 5G system. Reference signal configuration information may be transmitted via a higher layer signal or a physical signal. The UE performs the operation that is supposed to follow the receipt of the reference signals at step 3160. For example, if the received reference signal is a channel state reference signal, the UE generates channel state information based on the channel state reference signal and feeds back the generated channel state information to the base station.

Figure 32:
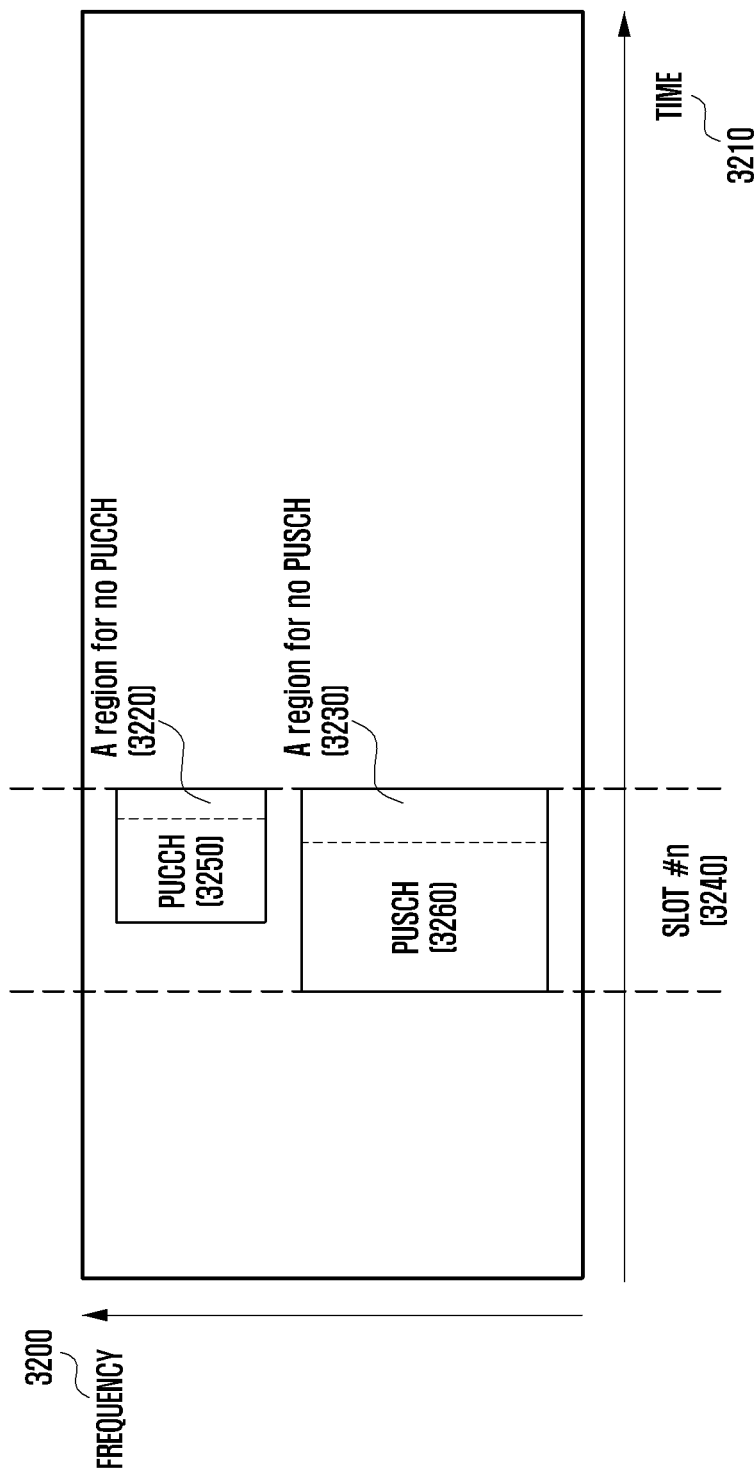
FIG. 32 is a diagram illustrating embodiment 3-4 of the present invention.

FIG. 32 is a diagram illustrating embodiment 3-4 of the present invention.

FIG. 32 depicts an FDD uplink carrier or a TDD carrier along the frequency axis 3200 and the time axis 3210.

In the case where an uplink control channel (PUCCH) 3250 or an uplink data channel (PUSCH) 3260 that is scheduled or configured, in slot #n 3240, by a base station for a UE is transmitted by the UE, the base station may notify the UE of PUCCH transmission-barred resources 3220 or PUSCH transmission-barred resources 3230 in advance via a higher layer signal or a physical signal. The PUCCH transmission-barred resources 3220 and the PUSCH transmission-barred resources 3230 may be configured via FCR. That is, the time and frequency resources of the PUCCH transmission-barred resources 3220 and the PUSCH transmission-barred resources 3230 may be indicated via the FCR.

It may be possible that information on the location of the slots in which the PUCCH transmission-barred resources 3220 and the PUSCH transmission-barred resources 3230 are configured (i.e., information on whether the PUCCH transmission-barred resources 3220 and the PUSCH transmission-barred resources 3230 are configured only in the slot #n, multiple slots, or specific slots being determined by an interval (period) and offsets) is included in the signal indicating the FCR.

The UE may transmit PUCCH or PUSCH on the PUCCH resources 3250 or PUSCH resources 3260 with the exception of the PUCCH transmission-barred resources 3220 or the PUSCH transmission-barred resources 3230 as notified by the base station. That is, the UE may perform rate matching or puncturing. Whether to perform the rate matching or puncturing may be determined per channel as specified in the standard or indicated by bit fields indicative of the operation to be taken by the UE in the signal indicating the FCR.

Figure 33:
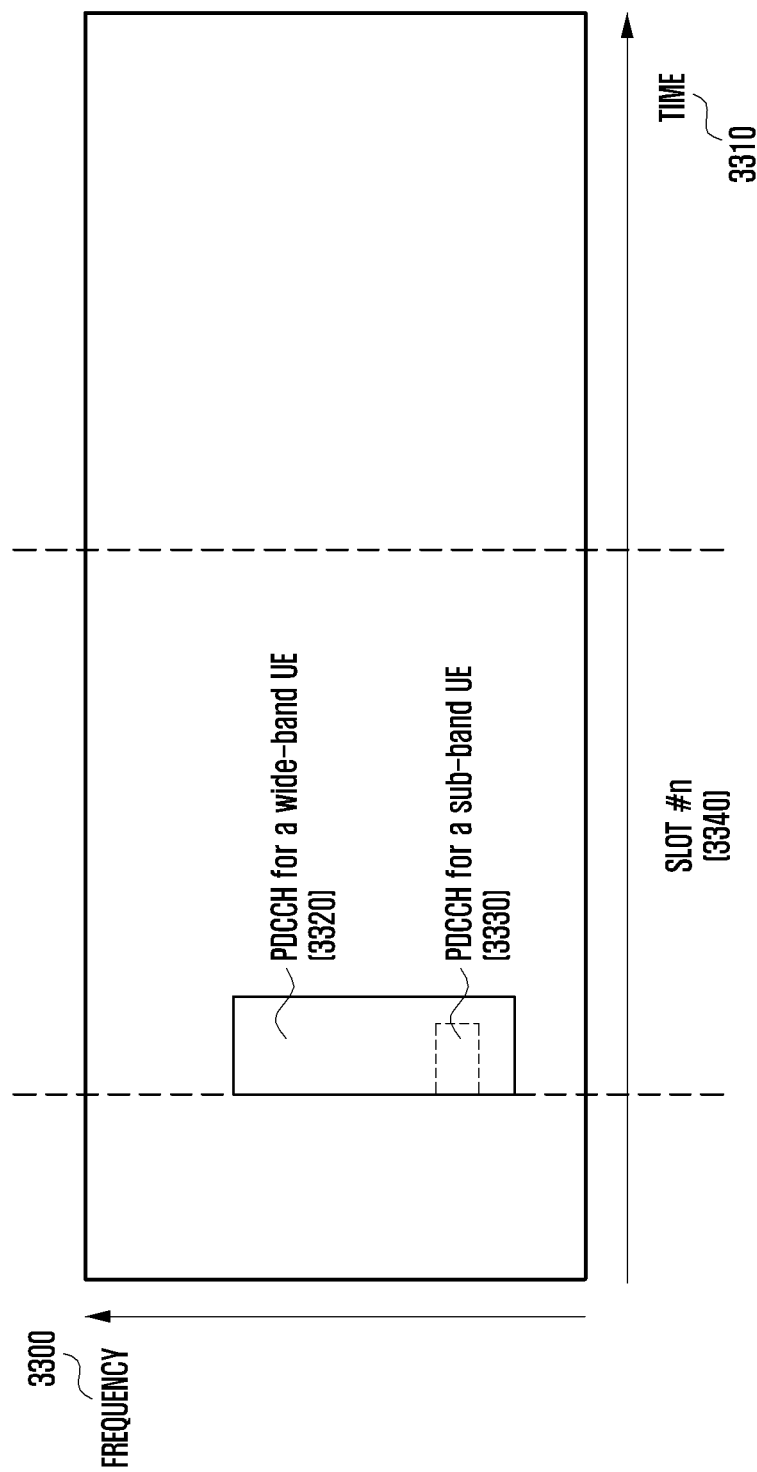
FIG. 33 is a diagram illustrating embodiment 3-5 of the present invention.

FIG. 33 is a diagram illustrating embodiment 3-5 of the present invention.

FIG. 33 depicts an FDD uplink carrier or a TDD carrier along the frequency axis 3300 and the time axis 3310.

Reference number 3320 denotes a downlink control channel configured to UE A with a capability of data communication in a wide frequency band, and reference number 3330 denotes a downlink control channel configured to UE B with a capability of data communication in a narrow frequency band. Each UE may transmit capability information to the base station to report whether it has the wide frequency band data communication capability or the narrow frequency band data communication capability, and the base station may configure per-UE frequency bands available for communication, on the basis of the per-UE capability information, via a higher layer signal.

In the case where the base station intends to configure the narrow band downlink control channel 3330 in the wide band downlink control channel 3320, it may notify the UE A of the resources for transmitting the narrowband downlink control channel 3330 as FCR in advance via a higher layer signal or a physical signal. That is, it is possible to notify the UE A of the time and frequency resources of the downlink control channel 3330 of the UE B via FCR. It may be possible that the information on the locations of the slots in which the FCR is configured (i.e., information on whether the FCR is configured only in the slot #n, multiple slots, or specific slots being determined by an interval (period) and offsets) is included in the signal indicating the FCR. The UE A may decode the downlink control channel on the resources 3320 with the exception of the resources 3330. That is, the UE may perform rate matching or puncturing. Whether to perform the rate matching or puncturing may be determined per channel as specified in the standard or indicated by bit fields indicative of the operation to be taken by the UE in the signal indicating the FCR.

Figure 34:
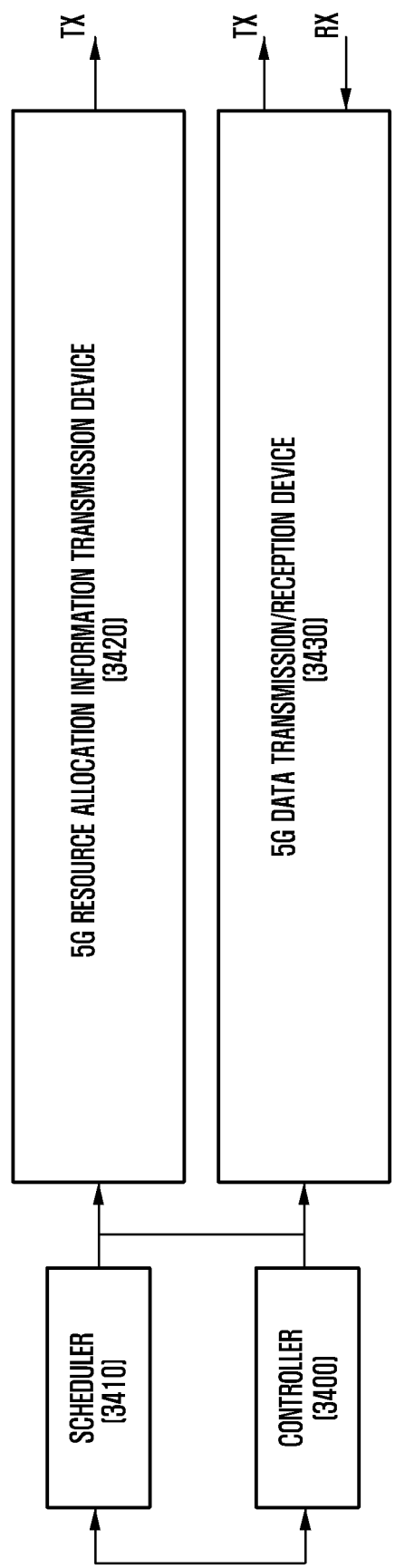
FIG. 34 is a block diagram illustrating a base station according to an embodiment of the present invention.

FIG. 34 is a block diagram illustrating a base station according to an embodiment of the present invention.

A controller 3400 controls the base station for 5G resource allocation (i.e., FCR and 5G service region and 5G signal configuration) in association with the operations of the base station and the UE that have been disclosed with reference to FIGS. 28A, 28B, 30, 31, and 33 and the management scheme of the cases where the FCR collides with the data and/or reference signals related to 5G service that have been disclosed with reference to FIGS. 27 and 29 such that the base station transmits 5G resource allocation information to the UE by means of a 5G resource allocation information transmission device 3420, schedules 5G data on the 5G resources by means of a scheduler 3410, and communicates the 5G data with a 5G UE by means of a 5G data transmission/reception (communication) device 3430.

Figure 35:
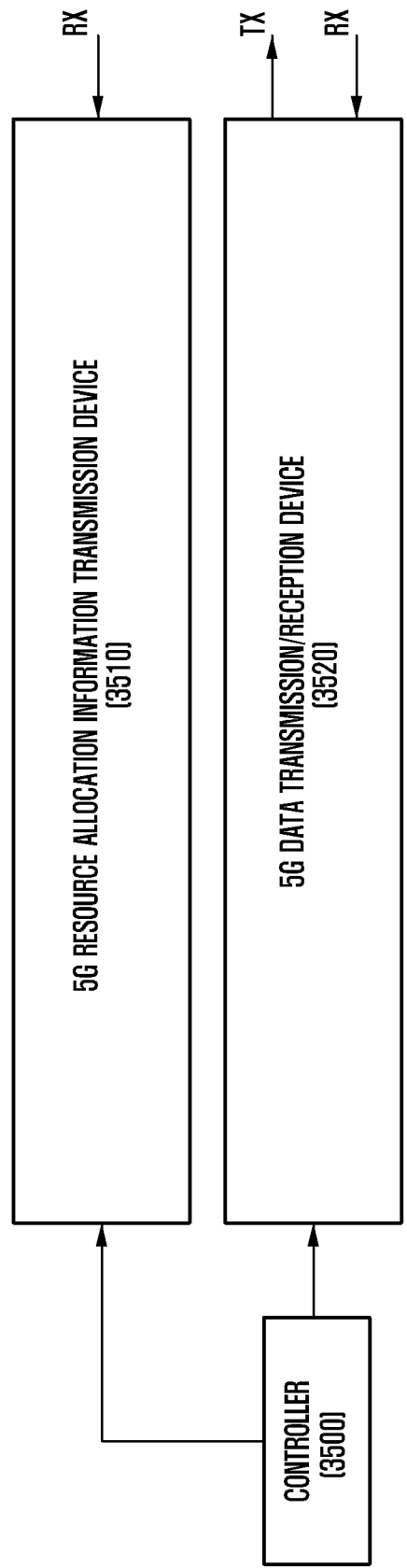
FIG. 35 is a block diagram illustrating a UE according to an embodiment of the present invention.

FIG. 35 is a block diagram illustrating a UE according to an embodiment of the present invention.

A controller 3500 controls the UE in association with the operations of the base station and the UE that have been disclosed with reference to FIGS. 28A, 28B, 30, 31, and 33 and the management scheme of the cases where the FCR collides with the data and/or reference signals related to 5G service that have been disclosed with reference to FIGS. 27 and 29 such that the UE receives 5G resource allocation information (i.e., FCR and 5G service region and 5G signal configuration information) from a base station by means of a 5G resource allocation information reception device 3510 and communicates 5G data scheduled on the allocated 5G resources with the 5G base station by means of the 5G data transmission/reception device 3520.

What is claimed is:

1. A method performed by a terminal in a wireless communication system, the method comprising:
   receiving, from a base station, a radio resource control (RRC) message including configuration information on resources for rate matching, the resources for the rate matching including a first resource set and a second resource set;
   receiving, from the base station, downlink control information (DCI) scheduling a physical data shared channel (PDSCH); and
   receiving, from the base station, a data on the PDSCH based on the DCI,
   wherein at least part of the first resource set is not available for the PDSCH based on the DCI including activation information indicating the at least part of the first resource set configured based on the configuration information included in the RRC message,
   wherein the second resource set is not available for the PDSCH based on the configuration information included in the RRC message, and
   wherein the resources for the rate matching are configured by resource block level in frequency domain.

2. The method of claim 1, wherein the resources for the rate matching are configured by symbol level in time domain.

3. The method of claim 2, wherein the resources for the rate matching are configured by repetition pattern of the resources for the rate matching.

4. The method of claim 3, wherein the resources for the rate matching are configured by bit information included in the configuration information, the bit information indicating at least one resource block in the frequency domain, at least one symbol in the time domain, and the repetition pattern of the resources for the rate matching.

5. A method performed by a base station in a wireless communication system, the method comprising:
   transmitting, to a terminal, a radio resource control (RRC) message including configuration information on resources for rate matching, the resources for the rate matching including a first resource set and a second resource set;
   transmitting, to the terminal, downlink control information (DCI) scheduling a physical data shared channel (PDSCH); and
   transmitting, to the terminal, a data on the PDSCH based on the DCI,
   wherein at least part of the first resource set is not available for the PDSCH based on the DCI including activation information indicating the at least part of the first resource set configured based on the configuration information included in the RRC message,
   wherein the second resource set is not available for the PDSCH based on the configuration information included in the RRC message, and
   wherein the resources for the rate matching are configured by resource block level in frequency domain.

6. The method of claim 5, wherein the resources for the rate matching are configured by symbol level in time domain.

7. The method of claim 6, wherein the resources for the rate matching are configured by repetition pattern of the resources for the rate matching.

8. The method of claim 7, wherein the resources for the rate matching are configured by bit information included in the configuration information, the bit information indicating at least one resource block in the frequency domain, at least one symbol in the time domain, and the repetition pattern of the resources for the rate matching.

9. A terminal for a wireless communication system, the terminal comprising:
 a transceiver; and
 a controller coupled with the transceiver and configured to:
  receive, from a base station, a radio resource control (RRC) message including configuration information on resources for rate matching, the resources for the rate matching including a first resource set and a second resource set,
  receive, from the base station, downlink control information (DCI) scheduling a physical data shared channel (PDSCH), and
  receive, from the base station, a data on the PDSCH based on the DCI,
 wherein at least part of the first resource set is not available for the PDSCH based on the DCI including activation information indicating the at least part of the first resource set configured based on the configuration information included in the RRC message,
 wherein the second resource set is not available for the PDSCH, and
 wherein the resources for the rate matching are configured by resource block level in frequency domain.

10. The terminal of claim 9, wherein the resources for the rate matching are configured by symbol level in time domain.

11. The terminal of claim 10, wherein the resources for the rate matching are configured by repetition pattern of the resources for the rate matching.

12. The terminal of claim 11, wherein the resources for the rate matching are configured by bit information included in the configuration information, the bit information indicating at least one resource block in the frequency domain, at least one symbol in the time domain, and the repetition pattern of the resources for the rate matching.

13. A base station for a wireless communication system, the base station comprising:
 a transceiver; and
 a controller coupled with the transceiver and configured to:
  transmit, to a terminal, a radio resource control (RRC) message including configuration information on resources for rate matching, the resources for the rate matching including a first resource set and a second resource set,
  transmit, to the terminal, downlink control information (DCI) scheduling a physical data shared channel (PDSCH), and
  transmit, to the terminal, a data on the PDSCH based on the DCI,
 wherein at least part of the first resource set is not available for the PDSCH based on the DCI including activation information indicating the at least part of the first resource set configured based on the configuration information included in the RRC message,
 wherein the second resource set is not available for the PDSCH based on the configuration information included in the RRC message, and
 wherein the resources for the rate matching are configured by resource block level in frequency domain.

14. The base station of claim 13, wherein the resources for the rate matching are configured by symbol level in at least one slot of time domain.

15. The base station of claim 14, wherein the resources for the rate matching are configured by repetition pattern of the resources for the rate matching.

16. The base station of claim 15, wherein the resources for the rate matching are configured by bit information included in the configuration information, the bit information indicating at least one resource block in the frequency domain, at least one symbol in the time domain, and the repetition pattern of the resources for the rate matching.

* * * * *